(12) United States Patent
 Kawakami et al.

(10) Patent No.: US 9,053,168 B2
(45) Date of Patent: Jun. 9, 2015

(54) DATABASE SYSTEM AND PROGRAM

(75) Inventors: Youichi Kawakami, Osaka (JP);
 Kosuke Sasai, Kobe (JP)

(73) Assignee: KONICA MINOLTA MEDICAL & GRAPHIC, INC., Hino-Shi, Tokyo (JP)

( * ) Notice: Subject to any disclaimer, the term of this patent is extended or adjusted under 35 U.S.C. 154(b) by 48 days.

(21) Appl. No.: 12/680,090

(22) PCT Filed: Sep. 17, 2008

(86) PCT No.: PCT/JP2008/066728
 § 371 (c)(1),
 (2), (4) Date: Mar. 25, 2010

(87) PCT Pub. No.: WO2009/044632
 PCT Pub. Date: Apr. 9, 2009

(65) Prior Publication Data
 US 2010/0211615 A1  Aug. 19, 2010

(30) Foreign Application Priority Data
 Oct. 4, 2007 (JP) .................................. 2007-260976

(51) Int. Cl.
 *G06F 17/30* (2006.01)
 *G06Q 10/10* (2012.01)

(52) U.S. Cl.
 CPC .......... *G06F 17/30595* (2013.01); *G06Q 10/10* (2013.01)

(58) Field of Classification Search
 CPC ................................................ G06F 17/30595
 USPC ....................................................... 707/805
 See application file for complete search history.

(56) References Cited

U.S. PATENT DOCUMENTS

| 6,901,284 B1* | 5/2005 | Maki et al. ..................... 600/476 |
| 2005/0038804 A1* | 2/2005 | Shimizu ........................ 707/100 |

(Continued)

FOREIGN PATENT DOCUMENTS

| JP | H11-85579 A | 3/1999 |
| JP | 2002-157162 A | 5/2002 |

(Continued)

OTHER PUBLICATIONS

Mark Dodge et al, "Microsoft Office Excel 2003 Official Manual", 1st Edition, Nikkei BP Soft Press, Jul. 12, 2004, information page, pp. 20, 21.

(Continued)

*Primary Examiner* — Sheree N. Brown
(74) *Attorney, Agent, or Firm* — Buchanan Ingersoll & Rooney PC

(57) ABSTRACT

The present invention aims to provide a technique enabling an information added by another user to be referenced and enabling the range of the information the user references from a database to be customized. A related information database in which a plurality of elements are accumulated is prepared, and an output setting information in which an information relating to the output of an additional information is associated with each other, in response to the additional writing of the additional information by a certain user to the related information database is stored. The output setting information of the certain user can be changed by the user. A portion of information is extracted from the related information database in accordance with an input of an extraction condition by the user, and the portion of information is visually output according to information relating to the output of the user.

57 Claims, 40 Drawing Sheets

(56) References Cited

U.S. PATENT DOCUMENTS

2005/0268220 A1  12/2005  Tanaka .......................... 715/512
2007/0143150 A1   6/2007  Sasai et al. ........................ 705/3

FOREIGN PATENT DOCUMENTS

| | | |
|---|---|---|
| JP | 2003-108417 A | 4/2003 |
| JP | 2004-199406 A | 7/2004 |
| JP | 2005-339005 A | 12/2005 |
| JP | 2007-140859 A | 6/2007 |
| WO | WO 2009/044632 A1 | 4/2009 |

OTHER PUBLICATIONS

Japanese Office Action dated Nov. 14, 2012 issued in the corresponding Japanese Patent Application No. 2009-536011 and partial English language translation (8 pages).

Mark Dodge et al., "Microsoft Office Excel 2003 Manual", Nikkeibp Softpress, First Edition, Jul. 12, 2004, pp. 20-21.

Japanese Office Action dated Jun. 21, 2013 issued in the corresponding Japanese Patent Application No. 2009-536011 and partial English language translation (6 pages).

Mark Dodge et al., "Microsoft Office Excel 2003 Manual", Nikkeibp Softpress, First Edition, Jul. 12, 2004, pp. 64-65.

* cited by examiner

F I G . 1
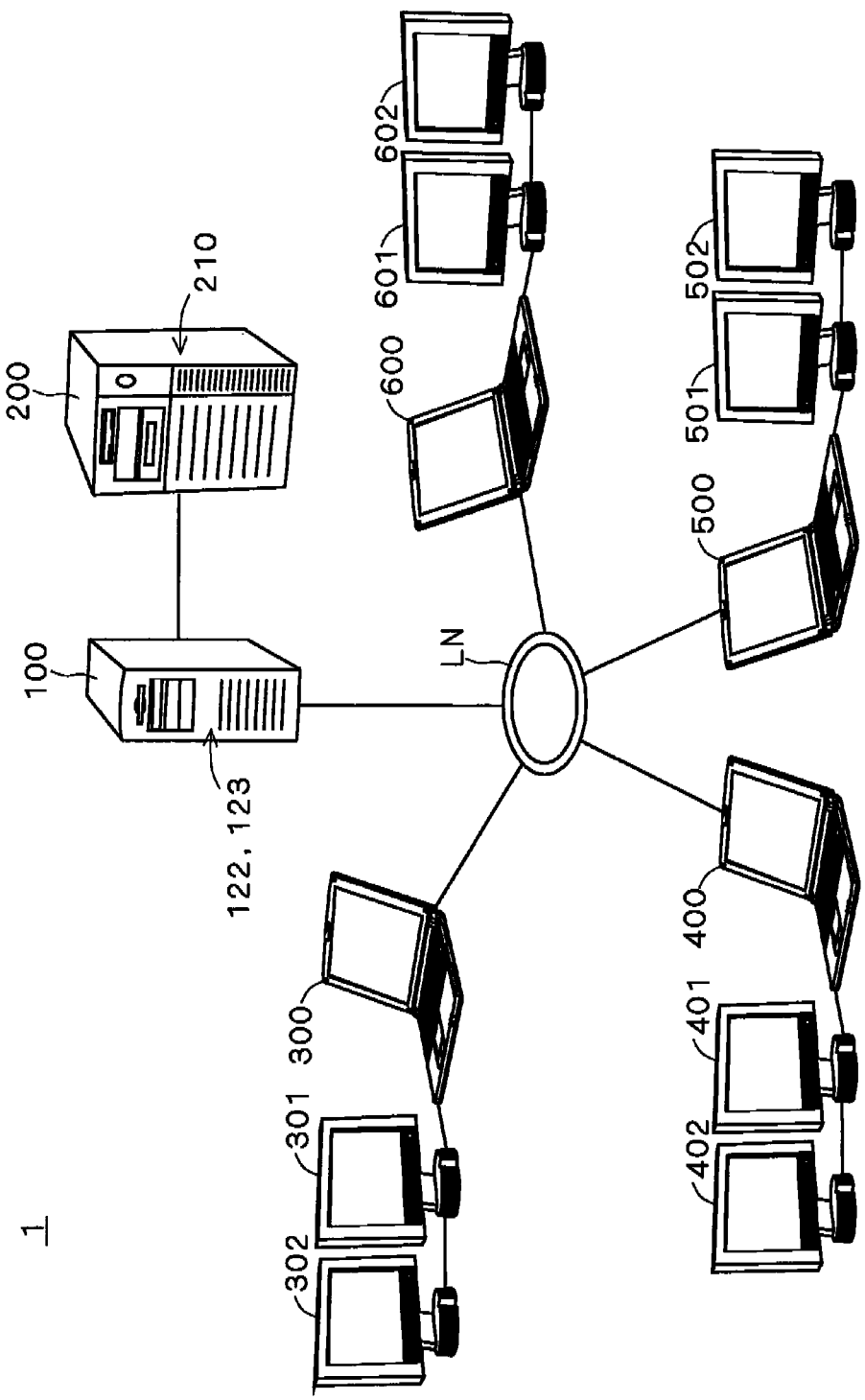

F I G . 3

TB1

| USER NAME | USER ID | PASSWORD |
|---|---|---|
| USER A | X X X X A | A O O O O |
| USER B | X X X X B | B O O O O |
| USER C | X X X X C | C O O O O |
| ⋮ | ⋮ | ⋮ |
| USER Z | X X X X Z | Z O O O O |

F I G . 6

TB2

| IMAGING CONDITION | SECTION | BASIC OBSERVATION | DIAGNOSIS | ... | NUMBER OF TIMES OF COMBINATIONS |
|---|---|---|---|---|---|
| T1 WEIGHTED IMAGE | OCCIPITAL LOBE | HIGH INTENSITY AREA | LACUNAR INFARCTION | ... | 3 |
| T2 WEIGHTED IMAGE | CEREBELLUM | LOW INTENSITY AREA | CEREBRAL INFARCTION | ... | 10 |
| ... | ... | ... | ... | ... | ... |
| T2 FLAIR IMAGE | PUTAMEN | PUNCTATE HIGH INTENSITY AREA | OLD CEREBRAL INFARCTION | ... | 2 |

TB3

| ELEMENT | USER A | USER B | USER C |
|---|---|---|---|
| ATELECTASIS | visible | visible | visible |
| CHRONIC BRONCHITIS | visible | invisible | visible |
| VALVULAR DISEASE | invisible | visible | visible |
| PULMONARY SEQUESTRATION | invisible | visible | visible |
| PARTIAL ATELECTASIS | invisible | invisible | visible |
|  |  |  |  |
|  |  |  |  |
|  |  |  |  |
|  |  |  |  |
|  |  |  |  |

FIG. 10

| PATIENT ID | PATIENT NAME | DATE OF BIRTH | AGE | SEX | STATE | EXAMINATION ID | EXAMINATION DATE | EXAMINATION SECTION | MODALITY | THE NUMBER OF IMAGES |
|---|---|---|---|---|---|---|---|---|---|---|
| 20060001 | TARO YAMADA | 1946.06.03 | 61.02 | M | NOT YET INTERPRETED | 11111 | 2002.06.03 | SKULL | MR | 2 |
| 20060002 | HANAKO TANAKA | 1949.06.03 | 58.02 | F | INTERPRETING | 22222 | 2002.06.04 | CHEST | CR | 3 |
| 20060003 | ICHIRO SATO | 1959.06.03 | 48.02 | M | WAITING FOR APPROVAL | 33333 | 2002.06.05 | CHEST | CT | 160 |
| 20060004 | KEIKO WATANABE | 1939.06.03 | 68.02 | F | INTERPRETING | 44444 | 2002.06.07 | CHEST | CT | 160 |
| 20060005 | ARIKO SHIMPO | 1932.06.03 | 75.02 | F | NOT YET INTERPRETED | 55555 | 2002.06.08 | CHEST | CT | 160 |
| 20060006 | JIRO SUZUKI | 1948.06.03 | 59.02 | M | INTERPRETING | 66666 | 2002.06.10 | CHEST | CT | 160 |

INTERPRETATION REPORT - EXAMINATION LIST SCREEN
FILE (F) WINDOW (W)
REPORT GENERATION

■REQUEST MATTER

20S, MALE
HE CAME TO HOSPITAL,
BECAUSE HE CANNOT STOP COUGHING.
PLEASE EXAMINE HIM IN DETAIL
WITH CHEST CR.

FIG. 13

■DETAILS OF EXAMINATION

| ATTRIBUTE | VALUE |
|---|---|
| MODALITY | CR |
| NAME OF DOCTOR WHO GENERATED REPORT | TARO TOKKYO |
| REPORT GENERATION DATE | JANUARY, 2005 |
| NUMBER OF IMAGES | 2 |
| PATIENT NAME | HANAKO TOKKYO |
| PATIENT SEX | F |

FIG. 14

■FREQUENTLY-USED PHRASE INPUT bilateral apical pleural thickening
aortic calcification
aortic elongation
mild cardiomegaly
Scoliosis
BHL

F I G. 1 5

■SUMMARY INPUT

THERE IS NOTHING PARTICULAR TO MENTION.
NO APPARENT ABNORMALITY IN THE IMAGE.
NO SIGNIFICANT CHANGE AS COMPARED TO THE PREVIOUS ONE (//**).
AFTER VALVE REPLACEMENT.
PLEASE FOLLOW UP AFTER THREE MONTHS.
PLEASE EXAMINE HIM IN DETAIL WITH CT.

F I G. 1 6

Tp2

■REPORT GENERATION

MODALITY: MR - EXAMINATION SECTION: SKULL

■→PLEASE SELECT A CATEGORY

VASCULAR DEFECT ➡    DEGENERATIVE DISEASE ➡
INFLAMMATION AND INFECTION ➡    TUMOR ➡
    DETAILS OF TUMOR ➡

REPORT GENERATION

MODALITY: MR - EXAMINATION SECTION: SKULL - VASCULAR DEFECT

| B1 | B2 | B3 | B4 |
|---|---|---|---|
| IMAGING CONDITION | SECTION | BASIC OBSERVATION | DIAGNOSIS |
| ☐ T1 WEIGHTED IMAGE | ☐ THALAMUS | ☐ HIGH INTENSITY AREA | ☐ LACUNAR INFARCTION |
| ☐ T2 WEIGHTED IMAGE | ☐ CEREBELLUM | ☐ LOW INTENSITY AREA | ☐ OLD CEREBRAL INFARCTION |
| ☐ T2 FLAIR IMAGE | ☐ PONS | | |
| | ☐ CORPUS CALLOSUM | | |
| | ☐ OCCIPITAL LOBE | | |
| | ☐ TEMPORAL LOBE | | |
| | ☐ BRAINSTEM | | |
| | ☐ FRONTAL LOBE | | |
| | ☐ PUTAMEN | | |

F1, F2, F3, F4

Ab1 ADD TERM  Ab2 ADD TERM  Ab3 ADD TERM  Ab4 ADD TERM

MP

LDB — DISPLAY OUTPUT SETTING LIST

MD — ,IN [W1] , [W2] [W3] IS SEEN. [∨] THE PATIENT IS SUSPECTED OF [∨] [W4]

F I G . 1 8

TB3a

| ELEMENTS | USER A | USER B |
|---|---|---|
| T1 WEIGHTED IMAGE | visible | invisible |
| T2 WEIGHTED IMAGE | visible | visible |
| T2 FLAIR IMAGE | visible | visible |
|  |  |  |
| THALAMUS | visible | visible |
| CEREBELLUM | visible | visible |
| PONS | visible | visible |
| CORPUS CALLOSUM | visible | visible |
| OCCIPITAL LOBE | visible | visible |
| TEMPORAL LOBE | visible | visible |
| BRAINSTEM | visible | visible |
| FRONTAL LOBE | visible | visible |
| PUTAMEN | visible | visible |
| CEREBRAL HEMISPHERE | invisible | visible |
|  |  |  |
| HIGH INTENSITY AREA | visible | visible |
| LOW INTENSITY AREA | visible | visible |
| ENLARGE | invisible | visible |
|  |  |  |
| LACUNAR INFARCTION | visible | visible |
| OLD CEREBRAL INFARCTION | visible | visible |
| CEREBRAL INFARCTION | invisible | invisible |
| SUBACUTE CEREBRAL INFARCTION | invisible | visible |
|  |  |  |

| REPORT GENERATION |

MODALITY: MR - EXAMINATION SECTION: SKULL - VASCULAR DEFECT

| IMAGING CONDITION (B1) | SECTION (B2) | BASIC OBSERVATION (B3) | DIAGNOSIS (B4) |
|---|---|---|---|
| ☑ T1 WEIGHTED IMAGE | ☐ THALAMUS | ☑ HIGH INTENSITY AREA | ☐ LACUNAR INFARCTION |
| ☐ T2 WEIGHTED IMAGE | ☐ CEREBELLUM | ☐ LOW INTENSITY AREA | ☐ OLD CEREBRAL INFARCTION |
| ☐ T2 FLAIR IMAGE | ☐ PONS | | |
| | ☑ CORPUS CALLOSUM | | |
| | ☐ OCCIPITAL LOBE | | |
| | ☐ TEMPORAL LOBE | | |
| | ☐ BRAINSTEM | | |
| | ☐ FRONTAL LOBE | | |
| | ☐ PUTAMEN | | |

F1  F2  F3  F4

MP

Ab1 [ADD TERM]  Ab2 [ADD TERM]  Ab3 [ADD TERM]  Ab4 [ADD TERM]  LDB [DISPLAY OUTPUT SETTING LIST]

MD: IN [T1 WEIGHTED IMAGE] ,IN [CORPUS CALLOSUM] , [HIGH INTENSITY AREA] [IS SEEN. ∨] [THE PATIENT IS SUSPECTED OF] [∨] [LACUNAR INFARCTION.]

REPORT GENERATION

MODALITY: MR - EXAMINATION SECTION: SKULL - VASCULAR DEFECT

| B1 ▽▽ IMAGING CONDITION | B2 ▽▽ SECTION | B3 ▽▽ BASIC OBSERVATION | B4 ▽▽ DIAGNOSIS MP |
|---|---|---|---|
| ☐ T1 WEIGHTED IMAGE<br>☐ T2 WEIGHTED IMAGE<br>☐ T2 FLAIR IMAGE<br>F1 | ☐ THALAMUS<br>☐ CEREBELLUM<br>☐ PONS<br>☐ CORPUS CALLOSUM<br>☐ OCCIPITAL LOBE<br>☐ TEMPORAL LOBE<br>☐ BRAINSTEM<br>☐ FRONTAL LOBE<br>☐ PUTAMEN<br>F2 | ☐ HIGH INTENSITY AREA<br>☐ LOW INTENSITY AREA<br>F3 | ☐ LACUNAR INFARCTION<br>☐ OLD CEREBRAL INFARCTION<br>F4<br>CEREBRAL INFARCTION<br>SUBACUTE CEREBRAL INFARCTION<br>CL1 |
| ADD TERM<br>Ab1 | ADD TERM<br>Ab2 | ADD TERM<br>Ab3 | ADD TERM<br>Ab4 |

MD
→IN  ,IN   ,   IS SEEN. ▽  THE PATIENT IS SUSPECTED OF ▽  DISPLAY OUTPUT SETTING LIST
    W1   W2      W3                                                              LDB

REPORT GENERATION

MODALITY: MR - EXAMINATION SECTION: SKULL - VASCULAR DEFECT

| IMAGING CONDITION (B1) | SECTION (B2) | BASIC OBSERVATION (B3) | DIAGNOSIS (B4) |
|---|---|---|---|
| ☐ T1 WEIGHTED IMAGE | ☐ THALAMUS | ☐ HIGH INTENSITY AREA | ☐ LACUNAR INFARCTION |
| ☐ T2 WEIGHTED IMAGE | ☐ CEREBELLUM | ☐ LOW INTENSITY AREA | ☐ OLD CEREBRAL INFARCTION |
| ☐ T2 FLAIR IMAGE | ☐ PONS | | |
| (F1) | ☐ CORPUS CALLOSUM | (F3) | CL2: CHANGE DISPLAY SETTING TO INVISIBLE |
| | ☐ OCCIPITAL LOBE | | MP |
| | ☐ TEMPORAL LOBE | | (F4) |
| | ☐ BRAINSTEM | | |
| | ☐ FRONTAL LOBE | | |
| | ☐ PUTAMEN | | |
| | (F2) | | |
| ADD TERM (Ab1) | ADD TERM (Ab2) | ADD TERM (Ab3) | ADD TERM (Ab4) |

MD: ,IN   W1: [  ]  ,   W2: [  ]  .   W3: [  ]  IS SEEN. ▽   THE PATIENT IS SUSPECTED OF ▽

LDB: DISPLAY OUTPUT SETTING LIST

INVISIBLE SETTING OF OLD CEREBRAL INFARCTION

"OLD CEREBRAL INFARCTION" IS CLOSELY RELATED TO THE FOLLOWING TERMS.
DO YOU WISH TO APPLY INVISIBLE SETTING?

PLEASE UNCHECK THE RELATED TERMS BELOW,
IF YOU WISH TO SET THEM TO INVISIBLE SETTING AT THE SAME TIME.

☐ AUTOMATICALLY SET CLOSELY RELATED TERMS TO INVISIBLE SETTING FROM NOW ON.
 └ Cx0

☑ T2 WEIGHTED IMAGE
 └ Cx11

☑ THALAMUS
 └ Cx21

☑ FRONTAL LOBE
 └ Cx22

☑ HIGH INTENSITY AREA
 └ Cx31

[ OK ] ─ Bo
[ Cancel ] ─ Bc

| ELEMENTS | USER A | USER B |
|---|---|---|
| T1 WEIGHTED IMAGE | visible | invisible |
| T2 WEIGHTED IMAGE | visible | visible |
| T2 FLAIR IMAGE | visible | visible |
|  |  |  |
| THALAMUS | visible | visible |
| CEREBELLUM | visible | visible |
| PONS | visible | visible |
| CORPUS CALLOSUM | visible | visible |
| OCCIPITAL LOBE | visible | visible |
| TEMPORAL LOBE | visible | visible |
| BRAINSTEM | visible | visible |
| FRONTAL LOBE | visible | visible |
| PUTAMEN | visible | visible |
| CEREBRAL HEMISPHERE | invisible | visible |
|  |  |  |
| HIGH INTENSITY AREA | visible | visible |
| LOW INTENSITY AREA | visible | visible |
| ENLARGE | invisible | visible |
|  |  |  |
| LACUNAR INFARCTION | visible | visible |
| OLD CEREBRAL INFARCTION | invisible | visible |
| CEREBRAL INFARCTION | invisible | invisible |
| SUBACUTE CEREBRAL INFARCTION | invisible | visible |
|  |  |  |

VISIBLE SETTING OF SUBACUTE CEREBRAL INFARCTION

"SUBACUTE CEREBRAL INFARCTION" IS CLOSELY RELATED TO THE FOLLOWING TERMS.
DO YOU WISH TO APPLY VISIBLE SETTING?

PLEASE CHECK THE RELATED TERMS BELOW. IF YOU WISH TO SET THEM TO VISIBLE SETTING AT THE SAME TIME.

☐ AUTOMATICALLY SET CLOSELY RELATED TERMS TO VISIBLE SETTING FROM NOW ON
Cx1

☑ CEREBRAL HEMISPHERE
Cx23

MP

OK — Bo
Cancel — Bc

| ELEMENTS | USER A | USER B |
|---|---|---|
| T1 WEIGHTED IMAGE | visible | invisible |
| T2 WEIGHTED IMAGE | visible | visible |
| T2 FLAIR IMAGE | visible | visible |
|  |  |  |
| THALAMUS | visible | visible |
| CEREBELLUM | visible | visible |
| PONS | visible | visible |
| CORPUS CALLOSUM | visible | visible |
| OCCIPITAL LOBE | visible | visible |
| TEMPORAL LOBE | visible | visible |
| BRAINSTEM | visible | visible |
| FRONTAL LOBE | visible | visible |
| PUTAMEN | visible | visible |
| CEREBRAL HEMISPHERE | visible | visible |
|  |  |  |
| HIGH INTENSITY AREA | visible | visible |
| LOW INTENSITY AREA | visible | visible |
| ENLARGE | invisible | visible |
|  |  |  |
| LACUNAR INFARCTION | visible | visible |
| OLD CEREBRAL INFARCTION | visible | visible |
| CEREBRAL INFARCTION | invisible | invisible |
| SUBACUTE CEREBRAL INFARCTION | visible | visible |
|  |  |  |

F I G . 3 0

Tp4

| TERM GENERATION | ☒ |

TERM: ─Bx1
┌─────────────────────────────────┐
│ ACUTE CEREBRAL INFARCTION       │     ↖MP
└─────────────────────────────────┘

WHEN YOU WISH TO INPUT PREFIX AND SUFFIX AT THE SAME TIME,
PLEASE FILL THEM INTO THE BELOW TEXT BOXES,
AND PRESS DOWN ADD BUTTON.

PREFIX: ─Bx2                        SUFFIX: ─Bx4
┌──────────────┐ ADD                ┌──────────────┐ ADD
└──────────────┘                    └──────────────┘

─Bo      ─Bc
                                    ┌──────┐ ┌──────┐
                                    │  OK  │ │Cancel│
                                    └──────┘ └──────┘

F I G . 3 2

TB3d

| ELEMENTS | USER A | USER B | NEW ADDITIONAL INFORMATION |
|---|---|---|---|
| T1 WEIGHTED IMAGE | visible | invisible | |
| T2 WEIGHTED IMAGE | visible | visible | |
| T2 FLAIR IMAGE | visible | visible | |
| | | | |
| THALAMUS | visible | visible | |
| CEREBELLUM | visible | visible | |
| PONS | visible | visible | |
| CORPUS CALLOSUM | visible | visible | |
| OCCIPITAL LOBE | visible | visible | |
| TEMPORAL LOBE | visible | visible | |
| BRAINSTEM | visible | visible | |
| FRONTAL LOBE | visible | visible | |
| PUTAMEN | visible | visible | |
| CEREBRAL HEMISPHERE | invisible | visible | |
| | | | |
| HIGH INTENSITY AREA | visible | visible | |
| LOW INTENSITY AREA | visible | visible | |
| ENLARGE | invisible | visible | |
| | | | |
| LACUNAR INFARCTION | visible | visible | |
| OLD CEREBRAL INFARCTION | visible | visible | |
| CEREBRAL INFARCTION | invisible | invisible | |
| SUBACUTE CEREBRAL INFARCTION | invisible | visible | |
| ACUTE CEREBRAL INFARCTION | invisible | visible | new(2007.8/25.20:00) |
| | | | |

FIG. 34

Tp3 [REPORT GENERATION]

MODALITY: MR - EXAMINATION SECTION: SKULL - VASCULAR DEFECT

| IMAGING CONDITION (B1) | SECTION (B2) | BASIC OBSERVATION (B3) | DIAGNOSIS (B4) MP |
|---|---|---|---|
| ☐ T1 WEIGHTED IMAGE | ☐ THALAMUS | ☐ HIGH INTENSITY AREA | ☐ LACUNAR INFARCTION |
| ☐ T2 WEIGHTED IMAGE | ☐ CEREBELLUM | ☐ LOW INTENSITY AREA | ☐ OLD CEREBRAL INFARCTION |
| ☐ T2 FLAIR IMAGE | ☐ PONS | ↙ F3 | ↙ F4 |
| ↙ F1 | ☐ CORPUS CALLOSUM | | CEREBRAL INFARCTION |
| | ☐ OCCIPITAL LOBE | | SUBACUTE CEREBRAL INFARCTION |
| | ☐ TEMPORAL LOBE | | ACUTE CEREBRAL INFARCTION *New* ← ELn |
| | ☐ BRAINSTEM | | ↖ CL1a |
| | ☐ FRONTAL LOBE | | |
| | ☐ PUTAMEN | | |
| | ↙ F2 | | |
| [ADD TERM] Ab1 | [ADD TERM] Ab2 | [ADD TERM] Ab3 | [ADD TERM] Ab4 [DISPLAY OUTPUT SETTING LIST] LDB |
| MD ↘ | | | |
| [ ] .IN [ ] , | [ ] ∨ | IS SEEN. | ∨ THE PATIENT IS SUSPECTED OF [ ] |
| .IN W1 W2 | W3 | | W4 |

| DISPLAY SETTING OF KNOWLEDGE | ☒ |
|---|---|

| ELEMENTS | DISPLAY SETTING |
|---|---|
| T1 WEIGHTED IMAGE | visible |
| T2 WEIGHTED IMAGE | visible |
| T2 FLAIR IMAGE | visible |
|  |  |
| THALAMUS | visible |
| CEREBELLUM | visible |
| PONS | visible |
| CORPUS CALLOSUM | visible |
| OCCIPITAL LOBE | visible |
| TEMPORAL LOBE | visible |
| BRAINSTEM | visible |
| FRONTAL LOBE | visible |
| PUTAMEN | visible |
| CEREBRAL HEMISPHERE | invisible |
|  |  |
| HIGH INTENSITY AREA | visible |
| LOW INTENSITY AREA | visible |
| ENLARGE | invisible |
|  |  |
| LACUNAR INFARCTION | visible |
| OLD CEREBRAL INFARCTION | visible |
| CEREBRAL INFARCTION | invisible |
| SUBACUTE CEREBRAL INFARCTION | invisible |
| ACUTE CEREBRAL INFARCTION  NEW | invisible |
|  |  |

ELm

OK — Bo
Cancel — Bc

MP

F I G . 4 1
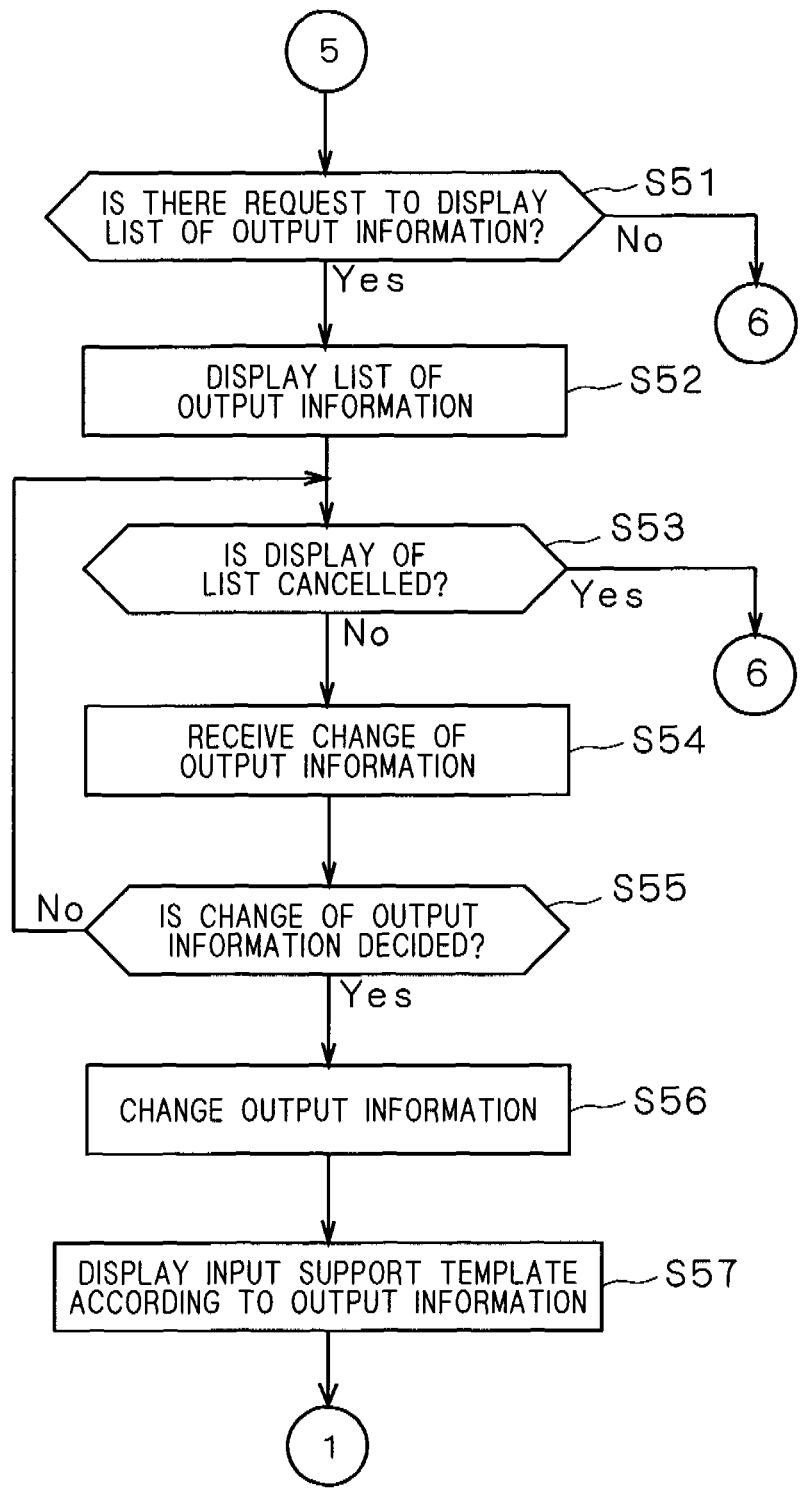

| IMAGING CONDITION | SECTION | BASIC OBSERVATION | DIAGNOSIS | USER A | USER B |
|---|---|---|---|---|---|
| T1 WEIGHTED IMAGE | OCCIPITAL LOBE | HIGH INTENSITY AREA | LACUNAR INFARCTION | visible | visible |
| T2 WEIGHTED IMAGE | CEREBELLUM | LOW INTENSITY AREA | CEREBRAL INFARCTION | invisible | visible |
| ... | ... | ... | ... | ... | ... |
| T2 FLAIR IMAGE | PUTAMEN | PUNCTATE HIGH INTENSITY AREA | OLD CEREBRAL INFARCTION | visible | visible |

DATABASE SYSTEM AND PROGRAM

RELATED APPLICATIONS

This application is a U.S. National Phase Application under 35 U.S.C. 371 of International Application No. PCT/JP2008/066728, filed with Japanese Patent Office on Sep. 17, 2008, which claims priority to Japanese Patent Application No. 2007-260976, filed Oct. 4, 2007.

TECHNICAL FIELD

The present invention relates to a database system.

BACKGROUND ART

When various reports are generated using information representing knowledge accumulated in the past, it has been conventionally necessary to search and reference the contents of reports of the past with some kind of means. In this operation, a report of the past suitable for the situation should be picked up from the enormous number of reports. Therefore, it has been difficult to effectively utilize the knowledge of the past.

For example, Japanese Patent Laid-Open No. 2007-140859 suggests a technique including the steps of classifying a plurality of elements constituting a report into items, generating a database upon associating the each element respectively belonging to each item with each other over the items, extracting from the database a portion of information corresponding to an extraction condition specified by a user, and presenting a list of the extracted information.

According to the technique suggested in Japanese Patent Laid-Open No. 2007-140859, a user can reference the list of information, which enables the user to generate a report by using the information of the past. Therefore, the technique supports the user to generate the report in an appropriate and smooth manner. Further, since knowledge based on a report generated by other users is reflected in the database in real time, all the users are able to share the knowledge. In other words, the knowledge of other users can be referenced and efficiently used. For example, in a medical scene, a novice radiologist can reference and use the knowledge of a veteran radiologist.

For example, Japanese Patent Laid-Open Nos. 2004-199406 and 2003-108417 suggest various techniques relating to addition of information to a database and extraction of information from a database.

However, it may be required to customize the range of read information according to the situation, e.g., setting a restriction on the range of information read from a database for each user. For example, the following aspect is conceivable. When a doctor specialized in a particular field references the information, the doctor is allowed to reference detailed information relating to the particular field. When a doctor specialized in a field other than the particular field references the information, the doctor is allowed to reference rough information relating to the particular field. In other words, where necessary information is not sufficiently provided or too much unnecessary information is provided depending on the level of knowledge of a user, it becomes very hard to use.

In this regard, since the technique of Japanese Patent Laid-Open No. 2007-140859 allows all the users to utilize the shared knowledge, it is impossible to customize the range of information read by each user.

For this problem, just like the technique of Japanese Patent Laid-Open No. 2004-199406, it is conceivable to apply a configuration of determining, when a client adding an information to the database, whether to make the added information available for reference by other clients However, with this configuration, a user who references the information from the database cannot voluntarily customize the range of information that the user references.

Alternatively, just like the technique of Japanese Patent Laid-Open No. 2003-108417, it is conceivable to apply a configuration of setting, for each client, a range of information searched in the database, so that each client obtains information within the range. However, in order to specify the range of information searched, it is necessary for a user to always understand the entire information constituting the database. Therefore, customization with this kind of technique is difficult.

DISCLOSURE OF THE INVENTION

The present invention is made in view of the above problems, and it is the object of the present invention to provide a technique for allowing a user to reference information added by another user and allowing the user to customize the range of information that the user references from a database.

In order to solve the above problems, a database system according to the first aspect includes a first storage for storing an accumulated element information in which a plurality of elements are accumulated, an additional writing portion configured to additionally write an additional information to the accumulated element information, in response to input of information relating to at least one or more elements, and a second storage for storing an output setting information in which, in response to input of a first identification information and the additional writing of the additional information by the additional writing portion, a second identification information, that is different from the first identification information, is associated with an information relating to visual output of the additional information. The database system also comprises a changing portion configured to change the information relating to the visual output associated with the second identification information in the output setting information, in response to input of the second identification information and predetermined operation performed by a user, and an extracting portion configured to extracting, from the accumulated element information, at least a portion of information included in the accumulated element information in accordance with an input of an extraction condition by the user. Further, the database system includes a display for visually outputting, when the second identification information is input, the portion of information extracted by the extracting portion, in accordance with the information relating to the visual output associated with the second identification information in the output setting information.

With the above, a user can change the information relating to the visual output of the information added by another user. Accordingly, the user is not forced to see the additional information added by another user. When the user wants to reference the additional information added by another user, the user can change the information relating to the visual output, so that the user can easily reference and use the additional information added by another user. In other words, the user can reference the information added by another user, and can customize the range of information that the user references from the database.

The database system according to the second aspect includes a server, a first terminal, and a second terminal. Here, the server includes a first storage for storing an accumulated element information in which a plurality of elements are accumulated, an additional writing portion for additionally writing an additional information to the accumulated element information, in response to input of information relating to at least one or more elements by the first terminal, and a second storage for storing an output setting information in which, in response to the additional writing of the additional information by the additional writing portion, an information specifying the second terminal is associated with an information relating to the visual output of the additional information. Further, the server includes a changing portion configured to change the information relating to the visual output associated with the information specifying the second terminal in the output setting information, in response to a request from the second terminal, and an extracting portion configured to extract, from the accumulated element information, at least a portion of information included in the accumulated element information in accordance with an input of an extraction condition by the second terminal. The second terminal includes a display for displaying a screen for visually outputting the portion of information extracted by the extracting portion. The screen is a screen relating to the portion of information according to the information relating to the visual output associated with the information specifying the second terminal in the output setting information.

With the above, the user can change the information relating to the visual output of the information added by another user. Accordingly, the user is not forced to see the additional information added by another user. When the user wants to reference the additional information added by another user, the user can change the information relating to the visual output, so that the user can easily reference and use the additional information added by another user. In other words, the user can reference the information added by another user, and can customize the range of information that the user references from the database.

A database system according to the third aspect includes a server, a first terminal, and a second terminal. Here, the server includes a first storage for storing an accumulated element information in which a plurality of elements are accumulated, an additional writing portion configured to additionally write an additional information to the accumulated element information, in response to input of information relating to at least one or more elements by the first terminal, and an extracting portion configured to extract, from the accumulated element information, at least a portion of information included in the accumulated element information in accordance with an input of an extraction condition by the second terminal. The second terminal includes a second storage for storing an output setting information including the information relating to the visual output of the additional information, in response to the additional writing of the additional information by the additional writing portion, a changing portion configured to change the information relating to the visual output included in the output setting information, in response to an input of information by a user, and a display for displaying a screen for visually outputting the portion of information extracted by the extracting portion. The screen is a screen relating to the portion of information according to the information relating to the visual output included in the output setting information.

With the above, the user can change the information relating to the visual output of the information added by another user. Accordingly, the user is not forced to see the additional information added by another user. When the user wants to reference the additional information added by another user, the user can change the information relating to the visual output, so that the user can easily reference and use the additional information added by another user. In other words, the user can reference the information added by another user, and can customize the range of information that the user references from the database.

A database system according to the fourth aspect is based on the database system according to any one of the first to third aspects, in which the information relating to the visual output includes an information for permitting visual output and an information for prohibiting visual output.

With the above, as necessary, the user can easily change permission/prohibition of presentation of the additional information added by another user.

A database system according to the fifth aspect is based on the database system according to the fourth aspect, in which the display visually outputs the additional information associated with the information for prohibiting visual output in the output setting information, in response to particular operation performed by the user.

With the above, even when the visual output of the additional information added by another user is prohibited, the additional information added by another user can be visually output by performing particular operation. Therefore, the additional information added by another user can be easily presented without changing the information relating to the visual output. Particularly, this is effective for presenting the additional information which is referenced relatively less frequently, and users are motivated to change the setting so as to permit visual output.

A database system according to the sixth aspect is based on the database system according to the fifth aspect, in which the changing portion changes, with the additional information associated with the information for prohibiting visual output in the output setting information being visually output by the display, the information for prohibiting visual output associated with respect to the additional information to the information for permitting visual output, in response to predetermined operation performed by the user.

With the above, while the additional information added by another user is visually output, the setting can be changed to permit visual output of the additional information. Accordingly, a user can easily make a determination whether visual output is to be permitted or not.

A database system according to the seventh aspect is based on the database system according to the fifth or sixth aspect, in which the display visually outputs the additional information together with a display element indicating that the additional information has been added.

With the above, the user can easily find the additional writing of the additional information by another user.

A database system according to the eighth aspect is based on the database system according to any one of the fifth to seventh aspects, in which the information relating to the visual output includes an information for prohibiting visual output and prohibiting visual output with respect to the particular operation.

With the above, it is possible to prevent visual output of additional information that hardly needs to be referenced to avoid the problem of hindering a user from referencing information.

A database system according to the ninth aspect is based on the database system according to the first aspect, in which the second storage stores the output setting information including: an information in which the information for permitting visual output of the additional information is associated with the first identification information; and an information in which the information for prohibiting visual output of the additional information is associated with the second identification information, in response to the additional writing of the additional information by the additional writing portion.

With the above, when the additional information is added, a user who additionally wrote the additional information is permitted to perform visual output of the additional information, whereas the other users are prohibited from visual output of the additional information. Accordingly, a user is not abruptly forced to reference the additional information added by another user.

A database system according to the tenth aspect is based on the database system according to the second aspect, in which the second storage stores the output setting information including: an information in which the information for permitting visual output of the additional information is associated with the information for specifying the first terminal; and an information in which the information for prohibiting visual output of the additional information is associated with the information for specifying the second terminal, in response to the additional writing of the additional information by the additional writing portion.

With the above, when the additional information is added, a user who additionally wrote the additional information is permitted to perform visual output of the additional information, whereas the other users are prohibited from visual output of the additional information. Accordingly, a user is not abruptly forced to reference the additional information added by another user.

A database system according to the eleventh aspect is based on the database system according to the third aspect, in which the second storage stores the information for prohibiting visual output of the additional information, in response to the additional writing of the additional information by the additional writing portion, in which the first terminal stores in a predetermined storage unit the information for permitting visual output of the additional information, in response to the additional writing of the additional information by the additional writing portion.

With the above, when the additional information is additionally written, a user who additionally wrote the additional information is permitted to perform visual output of the additional information, whereas the other users are prohibited from visual output of the additional information. Accordingly, a user is not abruptly forced to reference the additional information added by another user.

A database system according to the twelfth aspect is based on the database system according to any one of the first to eleventh aspect, in which the additional information includes one or more elements.

With the above, the information relating to the visual output is set for each element. Accordingly, a visual output condition can be set in detail.

A database system according to the thirteenth aspect is based on the database system according to any one of the first to twelfth aspects, in which the accumulated element information is structured so as to accumulate a plurality of pieces of combination information respectively representing a combination of elements.

A database system according to the fourteenth aspect is based on the database system according to the thirteenth aspect, in which the additional information includes combination information representing a combination of elements.

With the above, the information relating to the visual output can be set for each combination of elements. Accordingly, it is possible to customize the visual output condition of the additional information that better reflects each user's knowledge.

A database system according to the fifteenth aspect is based on the database system according to the thirteenth or fourteenth aspect, in which the combination information is an information structured such that at least one or more elements belong to each item included in a plurality of items, and wherein the combination information represents a combination of a plurality of elements respectively belonging to the plurality of items.

A database system according to the sixteenth aspect is based on the database system according to any one of the thirteenth to fifteenth aspects, in which the additional information includes one or more additional elements, in which the display visually outputs, when the changing portion changes the information relating to the visual output of the additional element, a display element for requesting change of the information relating to the visual output of one or more elements, different from the additional element, combined with the additional element in the combination information.

With the above, visual output conditions can be reliably changed without failure, with respect to a plurality of elements constituting one piece of knowledge.

A database system according to the seventeenth aspect is based on the database system according to the sixteenth aspect, in which the display visually outputs, when the changing portion changes the information relating to the visual output of the additional element, and where change of the information relating to the visual output is not specified with respect to one or more elements, different from the additional element, combined with the additional element in the combination information, a display element representing a predetermined warning.

With the above, visual output conditions can be reliably changed without failure, with respect to a plurality of elements constituting one piece of knowledge.

A database system according to the eighteenth aspect is based on the database system according to any one of the thirteenth to fifteenth aspects, in which the additional information includes one or more additional element, in which the changing portion changes, when changing the information relating to the visual output of the additional element, the information relating to the visual output of the one or more elements, different from the additional element, combined with the additional element in the combination information.

With the above, visual output conditions can be reliably changed without failure, with respect to a plurality of elements constituting one piece of knowledge.

A database system according to the nineteenth aspect is based on the database system according to any one of the first to eighteenth aspects, in which the display visually outputs a display element indicating that the additional information has been added, in response to the additional writing of the additional information by the additional writing portion.

With the above, it is possible to avoid the following problem: a user does not notice the additional information that has been additionally written and keeps on not referencing the additional information added by another user.

A database system according to the twentieth aspect is based on the database system according to any one of the first to nineteenth aspects, in which the display visually outputs the output setting information, in response to predetermined operation performed by the user.

With the above, the information relating to the visual output of the additional information is visually output, and therefore it is easy to determine whether the information relating to the visual output should be changed or not.

A database system according to the twenty-first aspect is based on the database system according to the twentieth aspect, in which the display visually outputs the additional information in the output setting information together with a display element indicating that the additional information has been added, in response to the additional writing of the additional information by the additional writing portion.

With the above, it is easy to find the additional information for which a determination should be made as to whether the information relating to the visual output is to be changed or not.

A database system according to the twenty-second aspect is based on the database system according to the first to twenty-first aspects, in which the information relating to the visual output includes an information that switches between an information for permitting visual output and an information for prohibiting visual output, in accordance with information representing a frequency of use of the additional information.

With the above, the setting can be made to change permission/prohibition of visual output in accordance with the frequency of use of the additional information. Accordingly, information can be presented according to the versatility of the additional information.

A database system according to the twenty-third aspect is based on the database system according to the first aspect, in which the information relating to the visual output includes an information that switches between the information for permitting visual output and the information for prohibiting visual output, in accordance with an information representing a frequency of use of the additional information with respect to the second identification information or a predetermined identification information group including the second identification information.

With the above, the setting can be made to change permission/prohibition of visual output in accordance with the frequency of use of the additional information. Accordingly, information can be presented according to the versatility of the additional information.

A database system according to the twenty-fourth aspect is based on the database system according to the second or third aspect, in which the information relating to the visual output includes an information that switches between the information for permitting visual output and the information for prohibiting visual output, in accordance with an information representing a frequency of use of the additional information with respect to the second terminal or a predetermined terminal group including the second terminal.

With the above, the setting can be made to change permission/prohibition of visual output in accordance with the frequency of use of the additional information. Accordingly, information can be presented according to the versatility of the additional information.

A database system according to the twenty-fifth aspect is based on the database system according to any one of the first to twenty-fourth aspects, further including a collective update portion configured to collectively update the accumulated element information stored in the first storage to an accumulated element information in which a plurality of other elements are accumulated, in which the second storage maintains the output setting information when the collective update portion collectively updates the accumulated element information.

With the above, even when the accumulated element information is collectively updated, it is possible to effectively use the customized setting content before the collective update.

The present invention is also directed to a computer software product including a recording medium recording a computer-readable software program that operates an information processing system as a database system.

With the above, the program can provide the same effects as those achieved by the database system according to any one of the first to twenty-fifth aspects

BRIEF DESCRIPTION OF THE DRAWINGS

FIG. 1 is a figure showing a schematic configuration of a database system according to an embodiment of the present invention.

FIG. 3 is a figure showing an example of data content of a user management DB.

FIG. 6 is a figure showing an example of data content of the combination information DB.

FIG. 10 is a figure showing an example of an examination list screen.

FIG. 12 is a figure showing an example of content of a request matter.

FIG. 13 is a figure showing an example of content of detailed examination.

FIG. 14 is a figure showing a list of frequently-used phrases.

FIG. 15 is a figure showing a list of fixed phrases.

FIG. 16 is a figure showing an example of a search-condition deciding-template.

FIG. 17 is a figure showing an example of an input support template.

FIG. 18 is a figure showing an example of data content of the output setting information DB.

FIG. 19 is a figure showing an example of the input support template.

FIG. 20 is a figure showing an example of the input support template.

FIG. 22 is a figure showing an example of the input support template.

FIG. 23 is a figure showing an example of a related element setting input screen.

FIG. 25 is a figure showing an example of data content of the output setting information DB.

FIG. 27 is a figure showing an example of the related element setting input screen.

FIG. 29 is a figure showing an example of data content of the output setting information DB.

FIG. 30 is a figure showing an example of a term generation template.

FIG. 32 is a figure showing an example of data content of the output setting information DB.

FIG. 34 is a figure showing an example of the input support template.

FIG. 35 is a figure showing an example of an output information list.

FIG. 41 is a flowchart showing an operational flow of the input support operation.

FIG. 43 is a figure showing an example of data content of the output setting information DB according to a variation.

BEST MODE FOR CARRYING OUT THE INVENTION

Figure 2:
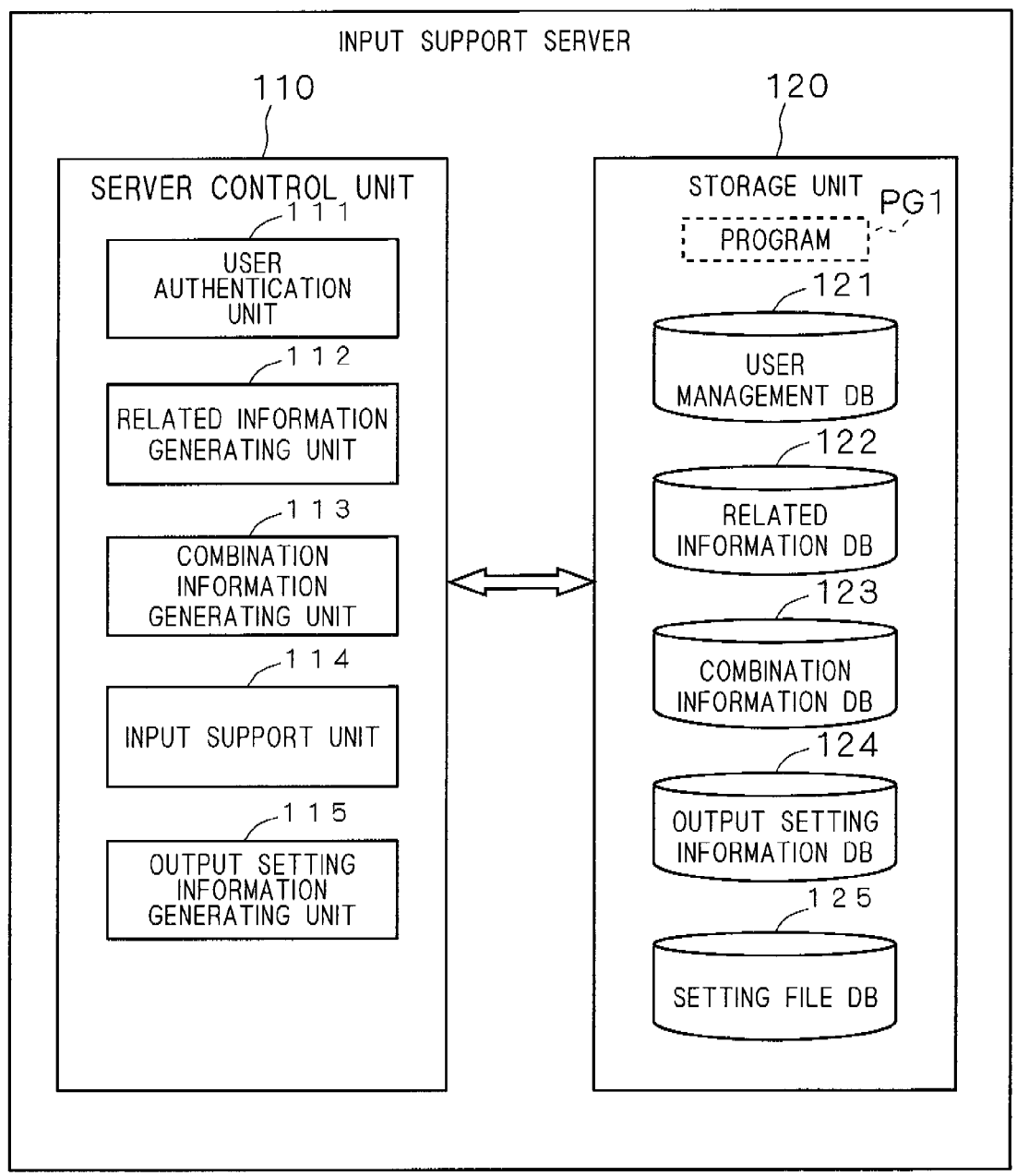
FIG. 2 is a block diagram showing the main functional elements of an input support server.

The embodiments of the present invention will be hereinafter described based on the drawings.

<Overview of Information Processing System>

FIG. 1 is a diagram showing a schematic configuration of an information processing system 1 according to an embodiment of the present invention.

The information processing system 1 is, for example, a system for managing and processing clinical information in a hospital, and includes a network circuit LN such as LAN (Local Area Network) connected by an input support server 100, a PACS (Medical Image Management System: Picture Archiving and Communication System) server 200, and report generation terminals (which may be hereinafter abbreviated as "terminal" as necessary) 300 to 600, in such a manner as to be able to mutually transmit and receive data therebetween.

Displays 301 and 302 are connected to the terminal 300 in such a manner as to be able to transmit and receive data to/from the terminal 300. Displays 401 and 402 are connected to the terminal 400 in such a manner as to be able to transmit and receive data to/from the terminal 400. Displays 501 and 502 are connected to the terminal 500 in such a manner as to be able to transmit and receive data to/from the terminal 500. Displays 601 and 602 are connected to the terminal 600 in such a manner as to be able to transmit and receive data to/from the terminal 600.

The PACS server 200 has a database (clinical information DB) 210 storing image data obtained by medical equipment using CT (Computed Tomography) and MR (Magnetic Resonance) and various kinds of clinical information such as information (for example, interpretation report information) representing reports (for example, interpretation reports). In this embodiment, the format of image data stored in the clinical information DB 210 is assumed to be so-called DICOM (Digital Imaging and Communications in Medicine) format.

Thus, the image data and a header storing information about a patient and the image data together forms a file (DICOM file) to be stored. The file format of the image data is not limited to DICOM format, and other formats may be employed.

Further, the clinical information DB 210 stores information of a list of examinations (examination list) of many patients (examination list information). The examination list information is assigned, for example, a DICOM attribute for each examination. The DICOM attribute includes, for example, information each representing attributes of a patient subjected to each examination (patient ID, name of patient, date of birth, age, sex), a state indicating whether an interpretation report has been generated or not, an ID identifying an examination (examination ID), date of an examination, a section to be examined (examination section), a modality representing imaging equipment, and the number of taken images. In addition, the clinical information DB 210 stores, in association with the examination ID, attribute information representing an order (request matter) given by an attending doctor and details of examination (information about patient and examination).

The input support server 100 generates a database storing information for supporting generation of a new report (a related information DB 122 and a combination information DB 123, which will be described later) by analyzing report information accumulated in the clinical information DB 210, thus supporting the terminals 300 to 600 in generating reports.

Each of the terminals 300 to 600 is constituted by a generally-available personal computer, or the like. Since each of the terminals 300 to 600 has the similar function and configuration, the description will hereinafter be made on the function and configuration of the terminal 300 as an example. The terminal 300 visually outputs on the displays 301 and 302 image data stored in the clinical information DB 210 so as to make the image data available for reference. A user (for example radiologist) generates a new interpretation report on the terminal 300 with viewing the image data visually output on the displays 301 and 302.

On the terminal 300, various kinds of information stored in the related information DB 122 and the like can be referenced as necessary, and thus supporting the radiologist in generating interpretation reports. The terminals 300 to 600 achieve various functions and operations by executing dedicated programs.

As described above, the information processing system 1 serves as a system (database system) for obtaining and presenting information stored in the related information DB 122 and the like, and also serves as a system for inputting reports (reporting system). Further, in the information processing system 1, operation for presenting searched information (information presenting operation) is especially devised, namely, information presented to a user is limited according to the setting made by the user. In other words, the user can customize the range of information read from a database. The information presenting operation will be explained later.

<Functions of Information Processing System>

FIG. 2 is a block diagram showing the main functional elements of the input support server 100.

The input support server 100 mainly includes a server control unit 110 and a storage unit 120.

The server control unit 110 includes, e.g., a CPU, a RAM, and a ROM, which centrally controls, such as various operations and functions of the input support server 100. The server control unit 110 includes as functions, a user authentication unit 111, a related information generating unit 112, a combination information generating unit 113, an input support unit 114, and an output setting information generating unit 115, which are achieved by reading and executing a program PG1 stored in the storage unit 120.

The storage unit 120 is constituted with a hard disk and the like, and stores a user management database (DB) 121, a related information database (DB) 122, a combination information database (DB) 123, an output setting information database (DB) 124, and a setting file database (DB) 125.

The user management DB 121 stores identification information for identifying a user accessible to the input support server 100 (for example, user ID and password).

FIG. 3 is a figure showing an example of data content in the user management DB 121. As shown in FIG. 3, the user management DB 121 stores a data table TB1 in which each of the user names having an access authority to the input support server 100 is associated with a user ID and a password. This data table TB1 is previously generated by such as an administrator of the input support server 100.

The user authentication unit 111 recognizes a user who uses each terminal 300 to 600, and permits the terminals 300 to 600 to access the input support server 100. For example, the user authentication unit 111 references the user management DB 121 in response to input of user identification information (for example, user ID and password) given by the terminal 300, whereby permitting access for a user who has an access authority, and not permitting access for a user who does not have an access authority. Then, in the input support server 100, the user authentication unit 111 recognizes a user who is accessing from each terminal 300 to 600. It should be noted that the user authentication unit 111 replies, to each terminal 300 to 600, the information indicating whether access is permitted or not.

The related information DB 122 is generated by the related information generating unit 112 on the basis of the clinical information DB 210 stored in the PACS server 200. When the related information DB 122 is generated, the combination information DB 123 is generated by the combination information generating unit 113.

Figure 4:
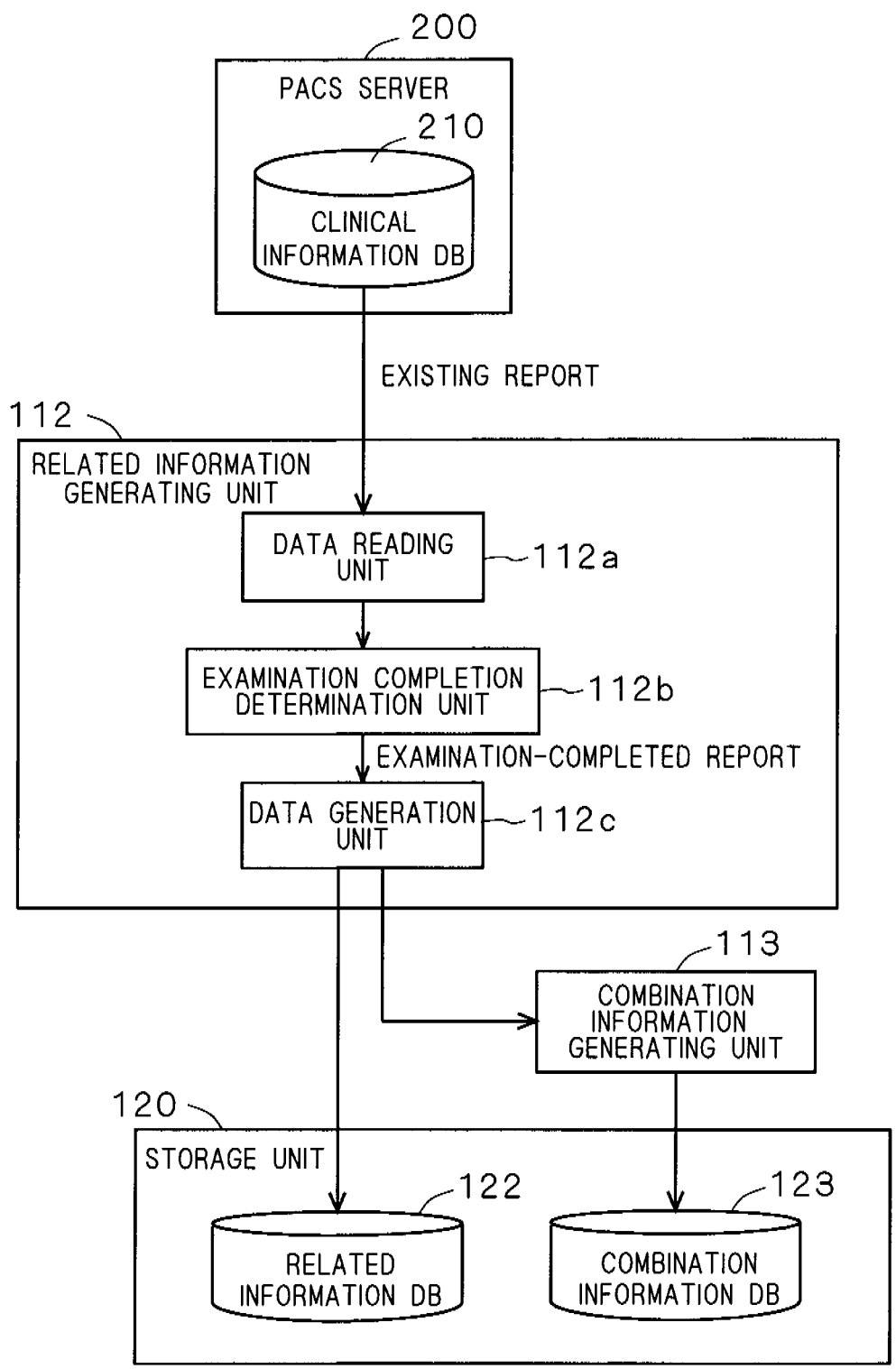
FIG. 4 is a figure showing the functional elements for generating a related information DB and a combination information DB.

FIG. 4 is a block diagram showing functional elements for generating the related information DB 122 and the combination information DB 123.

The related information generating unit 112 includes functional elements such as a data reading unit 112a, an examination completion determination unit 112b, and a data generation unit 112c.

The data reading unit 112a reads, from the clinical information DB 210, interpretation report information, attribute information corresponding to the interpretation report information (for example, information relating to request matter, patient attribute, and examination attribute), and the examination list information. Then, the data reading unit 112a transmits the interpretation report information, the attribute information, and the examination list information to the examination completion determination unit 112b.

The examination completion determination unit 112b references the examination list information to determine whether the interpretation report of each examination is generated with an observation text written thereon. Then, the examination completion determination unit 112b transmits the interpretation report information having been generated (namely, the examination has been completed), together with attribute information, to the data generation unit 112c.

For each pieces of the interpretation report information, the data generation unit 112c extracts necessary elements from an observation text, written in natural sentences, included in the interpretation report together with various elements included in the attribute information, and structures them using an RDF (Resource Description Framework, disclosed in for example, http://www.w3c.org/RDF/). Then, the data generation unit 112c accumulates, in the storage unit 120, the information structuring a plurality of pieces of interpretation report information, thus generating the related information DB 122.

The generation of the related information DB 122 will be hereinafter described in more detail.

First, the data reading unit 112a reads, from the clinical information DB 210, the interpretation report information, the attribute information corresponding to this interpretation report information, and the examination list information, and transmits them to the examination completion determination unit 112b.

Subsequently, the examination completion determination unit 112b references the examination list information to determine whether the interpretation report is generated for each examination, and transmits the generated interpretation report information, together with the attribute information, to the data generation unit 112c.

Then, the data generation unit 112c extracts necessary elements from an observation text included in the interpretation report, together with the various elements included in the attribute information, and structures them using the RDF. This structuring of the elements of the interpretation report is achieved with the use of, for example, a machine learning.

Described below is a function of the data generation unit 112c, more specifically, a function of machine learning (machine learning function), a function for identifying elements (identifying function), and a function for structuring the interpretation report by associating the identified elements (structuring function).

When a learning corpus or the like is given as teacher data by the machine learning function of the data generation unit 112c, information serving as a basis for structuring is learned.

The learning corpus includes a large amount of text data according to the format of observation texts included in the interpretation report (text model). This text model represents observation text structures, such as for example, imaging condition→section→basic observation text (feature—and conclusion)→diagnosis (diagnosis—and conclusion). More specifically, in this learning corpus, each term is tagged with a classification item (which may be hereinafter abbreviated as "item", as necessary) name of each element constituting a text model of observation text. When a learning corpus provided from the outside is given to the data generation unit 112c, the data representing a representative text model in which a conclusion is somewhat identified is also given from the outside.

Then, the machine learning function of the data generation unit 112c extracts terms from the learning corpus, and stores the extracted terms respectively by items of the corresponding elements. The data learned and stored here are used as data of model (model data) indicating how the elements constituting the interpretation report should be divided into the items of elements.

Subsequently, the identifying function of the data generation unit 112c uses the above model data as a basis to identify the items of elements and the actually used terms in the interpretation report information input to the data generation unit 112c.

Further, the structuring function of the data generation unit 112c divides various kinds of information included in the interpretation report information and the attribute information into terms (elements) belonging to each item of elements, on the basis of the information identified by the identifying function, and describes the same in RDF, so that the elements constituting an observation text is structured. Then, the elements constituting one interpretation report are structured by also adding the elements constituting the attribute information relating to the interpretation report and the attribute information relating to the patient, so that the data described in RDF (which may be hereinafter referred to as "single-report-structured data") are generated, and the interpretation report information is structured.

Figure 5:
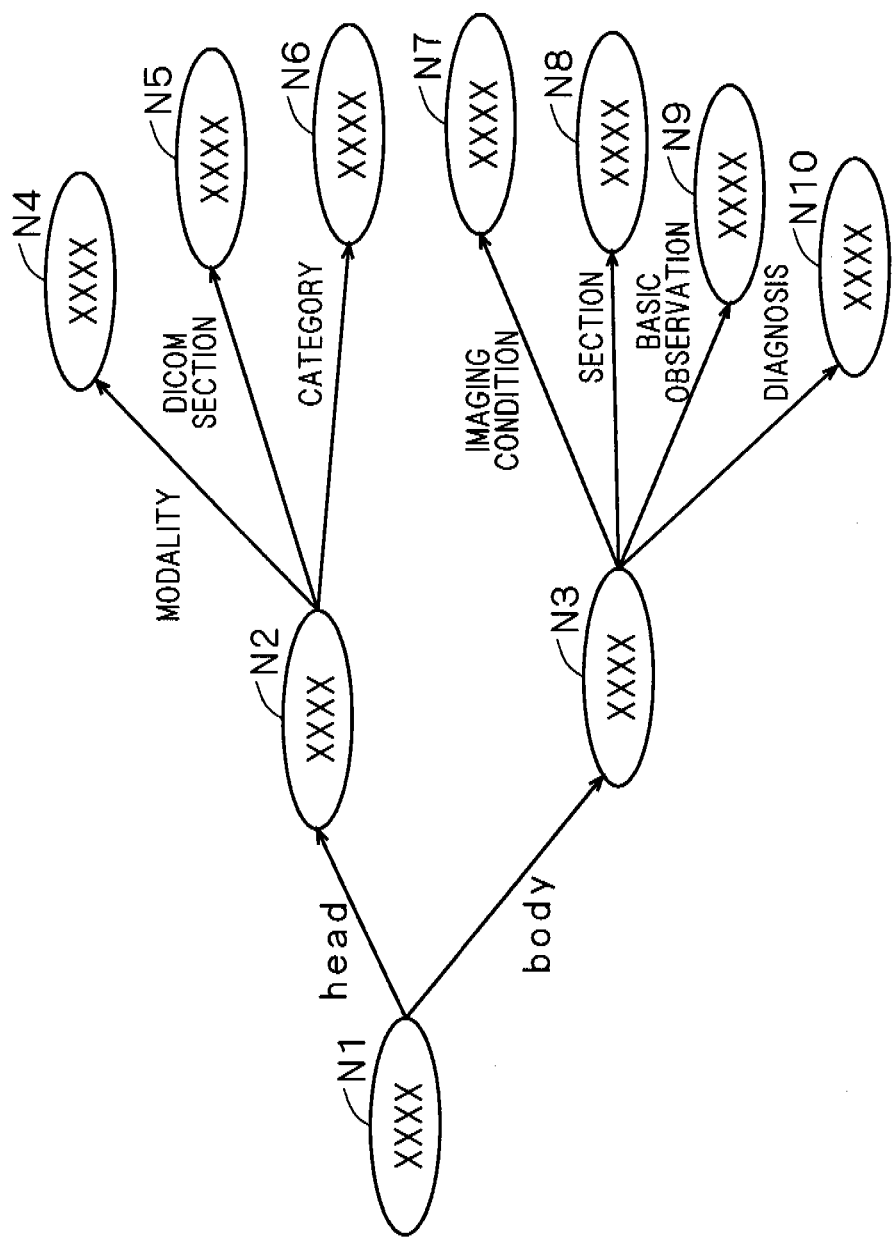
FIG. 5 is a schematic diagram showing an example of data formation of a single-report-structured data.

FIG. 5 is a schematic diagram showing an example of data structure of the single-report-structured data.

As shown in FIG. 5, the single-report-structured data includes a plurality of nodes (ellipse in the figure) N0 to N10 representing the elements (specifically, attribute values and the like), which are connected by arcs (arrows in the figure) indicating item names (specifically, attributes). The single-report-structured data shown in FIG. 5 starts from the node N1 indicating an examination ID, and a plurality of nodes N2 to N10 are connected by a plurality of arcs.

In FIG. 5, the elements represented in each node N1 to N10 are described as "XXXX", for the sake of simplifying the figure and generalizing the description. An attribute indicated by each arc, i.e., item name, is described next to each arrow. Attributes indicated by the arcs connected to the nodes N2 to N10 include attribute information portion (head), content portion (body), modality, DICOM section (examination section), category, imaging condition, section, basic observation text, and diagnosis. The DICOM section is an examination section of the DICOM attribute.

The content portion includes a combination of elements constituting an observation text, namely, the knowledge itself. The elements constituting an observation text are extracted in units of items to be structured and are accumulated in the content portion. Alternatively, in another aspect, the units of items in which the elements constituting an observation text are extracted may be changed according to the attribute information.

For example, under a condition where an element "SKULL", an element "MR", and an element "vascular defect" respectively belong to an item "DICOM section", an item "modality", and an item "category", the items of elements extracted from an observation text are determined to be four items, i.e., "imaging condition", "section", "basic observation text", and "diagnosis". Under a condition where an element "SKULL", an element "MR", and an element "tumor" respectively belong to an item "DICOM section", an item "modality", and an item "category", the items of elements extracted from an observation text are determined to be five items, i.e., "abnormality", "imaging method", "state of abnormality", "influenced section", and "influence".

The machine learning function, the identifying function, and the structuring function of the data generation unit 112c as described above enable generation of a single-report-structured data as shown in FIG. 5 for each of many pieces of the examined interpretation report information accumulated in the clinical information DB 210. Then, many pieces of single-report-structured data thus generated are accumulated to the storage unit 120, so that the related information DB 122 is generated.

Therefore, in the related information DB 122, at least one or more elements belong to each item included in a plurality of items, and each of single-report-structured data (in general, combination information) represents a combination of the plurality of elements respectively belonging to the plurality of items. Further, the related information DB 122 serves as information accumulating a plurality of elements (which may be hereinafter referred to as "accumulated element information").

Further, every time the data generation unit 112c generates single-report-structured data, the combination information generating unit 113 recognizes the combination of the plurality of elements represented by the new single-report-structured data, associates the combination of elements and the number of combinations (the number of times), and stores them to the storage unit 120, thus generating the combination information DB 123.

FIG. 6 is a figure showing an example of data content of the combination information DB 123.

As shown in FIG. 6, the combination information DB 123 stores a data table TB2 in which the combination of elements respectively belonging to each item (for example, "imaging condition", "section", "basic observation text", "diagnosis", etc) is associated with the number of combinations. That is, the combination information DB 123 represents the strength of relationship between the elements in the related information DB 122. It should be noted that, since the combination information DB 123 manages the number of overlapping combinations of elements, the related information DB 122 is configured not to store a plurality of same single-report-structured data.

Every time a users performs various operations on an operation unit 330 (which will be described later) to add a new interpretation report to the clinical information DB 210, the related information generating unit 112 generates a new single-report-structured data, and enriches the related information DB 122 or the combination information DB 123. The elements constituting the related information DB 122 are enriched, as necessary, in response to input of information provided by a user with the operation unit 330.

The explanation continues with reference back to FIG. 2.

The input support unit 114 extracts a portion of information from the related information DB 122 in accordance with a search rule input by any one of the terminals 300 to 600 (here, the terminal 300), and achieves operation (input support operation) for providing the terminal 300 with the extracted information serving as information for supporting input of the interpretation report (input support information).

Figure 7:
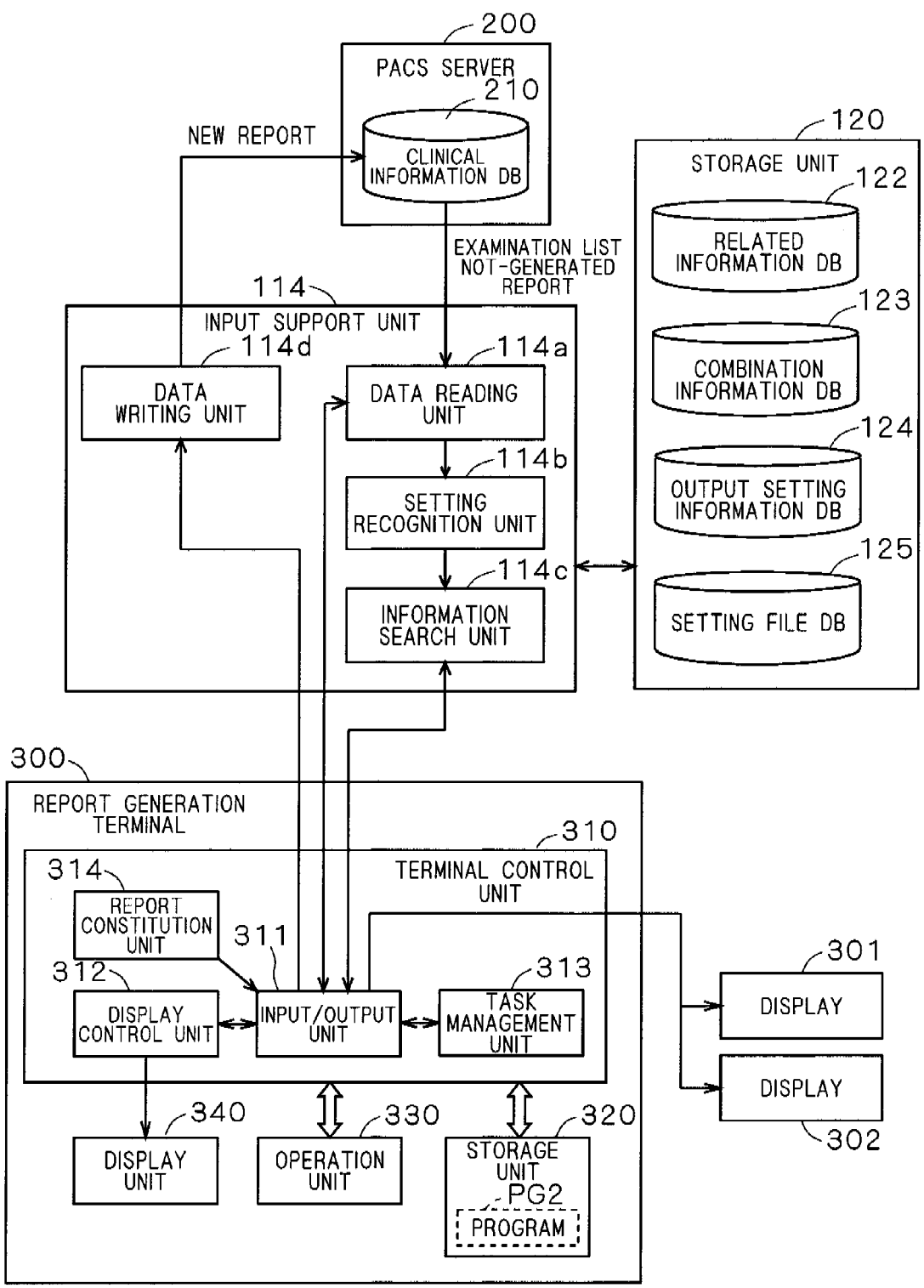
FIG. 7 is a figure showing the functional elements according to input support operation.

FIG. 7 is a figure for illustrating functional elements relating to the input support operation.

The input support unit 114 includes functional elements such as a data reading unit 114a, a setting recognition unit 114b, an information search unit 114c, and a data writing unit 114d.

When an examination for which an interpretation report is generated (report-input targeted examination) is determined, the data reading unit 114a reads the examination list information from the clinical information DB 210, and transmits to the terminal 300. When the terminal 300 inputs an instruction for specifying the report-input targeted examination, the data reading unit 114a reads from the clinical information DB 210 the interpretation report information, the attribute information, the examination list information and the image data relating to the report-input targeted examination, and transmits to the terminal 300.

Here, the displays 301 and 302, connected in such a manner to enable transmission and reception of data, visually outputs the image data relating to the report-input targeted examination in accordance with the control of the terminal 300. A user, i.e., radiologist, operates the terminal 300 to perform various operations relating to generation of the interpretation report with referencing the image data visually output on the displays 301 and 302.

The setting recognition unit 114b recognizes the search format of the search rule input by user operation (here, operation performed on the operation unit 330). Then, the setting recognition unit 114*b* recognizes and employs a setting file storing a screen generation rule corresponding to the search format by referencing a setting file DB 125.

The setting file DB 125 stores file information (setting file) in which the screen generation rules are respectively associated with the formats of each search rule (search format). The search rule is a rule requesting for acquisition of the information from the related information DB 122. The search format represents, e.g., which information is to be searched and for what kind of items the information is to be obtained.

The search rule may be any rule as long as a portion of information is estimated and obtained from the information. For example, the related information DB 122 may accumulate information using RDF, and the search rule may employ inference supported by well-known "Jena" (for example, disclosed at http://jena.sourceforge.net/), i.e., a well-known framework for generating a semantic web application. The screen generation rule is a rule for generating a screen in which the obtained portion of information is visually presented (result display screen), and defines, for example, the number of items to be presented, the type, the order of presentation of the items, and the arrangement of display elements and the like.

Further, the setting recognition unit 114*b* references the output setting information DB 124 so as to recognize the setting of output set and customized for each user.

Figures 8, 9:
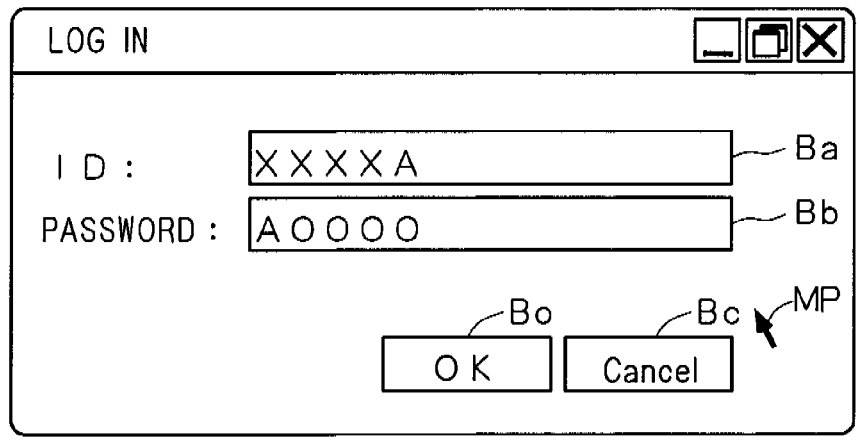
FIG. 8 is a figure showing an example of data content of an output setting information DB.
FIG. 9 is a figure showing an example of a login screen.

FIG. 8 is a figure showing an example of data content of the output setting information DB 124.

The output setting information DB 124 is information accumulating information (hereinafter "output setting information") that associates each user with the information (output information) about the output of each element constituting the related information DB 122. The output information includes information (here, visible) for permitting a visual output (i.e., display) and information (here, invisible) for prohibiting a visual output (i.e., display). This output information sets for each element whether to permit visual output, enabling detailed setting of outputs.

FIG. 8 shows the output setting information DB 124 with a data table TB 3 in which user names (for example, users A to C) serving as identification information specifying users is associated with either visible or invisible for each element (for example, atelectasis, chronic bronchitis, valvular disease, pulmonary sequestration, and partial atelectasis) stored therein.

The setting recognition unit 114*b* references the output setting information DB 124 to recognize, as necessary, the output information relating to each element for each user who is identified as making an access by the user authentication unit 111, and accordingly corrects slightly the screen generation rule.

The information search unit 114*c* obtains a portion of information from the related information DB 122 in accordance with the search rule.

Then, the information search unit 114*c* generates information in which each element belonging to the plurality of items of elements is associated with each other over the items (network information) on the basis of the obtained portion of information and the employed screen generation rule, and generates display data (result display screen data) representing a screen displaying the search result (result display screen). This result display screen data is output to the terminal 300, the terminal 300 displays the result display screen on a display unit 340 on the basis of the result display screen data. In the explanation below, the data for displaying the screen including the result display screen data may be generally referred to as "display information" as necessary.

In this way, in response to the input of the search rule by the terminal 300, a series of operations (information search operation) is executed, which includes obtaining information, generating the result display screen data, and displaying the result display screen. It should be noted that the information search operation includes operation for presenting information customized for each user in accordance with the output setting information DB 124 (information presenting operation).

The data writing unit 114*d* adds, to the clinical information DB 210, the interpretation report information generated by a report constitution unit 314 of the terminal 300.

Further, the terminal 300 mainly includes a terminal control unit 310, a storage unit 320, the operation unit 330, and the display unit 340.

The terminal control unit 310 includes, e.g., a CPU, a RAM, and a ROM, which centrally controls, such as various operations and functions of the terminal 300. The terminal control unit 310 includes as functions, an input/output unit 311, a display control unit 312, a task management unit 313, and a report constitution unit 314, which are achieved by reading and executing a program PG2 stored in the storage unit 320.

The input/output unit 311 is adapted to data transmission and reception with an external apparatus of the terminal 300 (here, the input support server 100, the displays 301 and 302, or the like).

The display control unit 312 visually displays various screens on the display unit 340 on the basis of various kinds of information input from the input support server 100. For example, the display control unit 312 displays the result display screen on the display unit 340 on the basis of the result display screen data input from the information search unit 114*c*.

When an examination to be input to a new interpretation report (report-input targeted examination) is selected, the task management unit 313 identifies a task relating to generation of the new interpretation report corresponding to the report-input targeted examination.

The report constitution unit 314 receives new report information (structured report information) having a format of data in which elements are structured (structured data) in accordance with information input by a user via the operation unit 330, and generates new interpretation report information in accordance with a predetermined rule on the basis of the structured report information.

The operation unit 330 includes, e.g., a keyboard and a mouse, and outputs various signals to the terminal control unit 310 in response to operation of which by a user as necessary.

The display unit 340 is constituted by various displays such as a liquid crystal display. For example, the display unit 340 visually outputs the result display screen data received from the information search unit 114*c* in accordance with the control of the display control unit 312.

The storage unit 320 is constituted with a hard disk and the like, and stores the program PG2 and various data for achieving the various operations and functions in the terminal 300.

Various data temporarily generated in various information processing are temporarily stored, as necessary, in RAMs and the like respectively built in the server control unit 110 and the terminal control unit 310

Further, the explanation continues with reference back to FIG. 2.

The output setting information generating unit 115 generates the output setting information DB 124. For example, an administrator of the input support server 100 inputs information as necessary to generate the output setting information DB 124. When a user performs various operations with the operation unit 330 to input a new element to the related information DB 122, the output setting information generating unit 115 adds the output information relating to the new element to the output setting information DB 124. Further, the output setting information generating unit 115 changes the output setting information DB 124 as necessary, in response to an input of the information by the user from the operation unit 330.

<Input Support Operation>

The input support operation will be hereinafter described in more detail.

Login:

When the terminal 300 accesses the input support server 100, namely, when the information processing system 1 is used, the terminal 300 displays a screen for performing login to the system (login screen) on the display unit 340.

FIG. 9 is a figure showing an example of a login screen Tp1.

The login screen Tp1 is arranged with a user ID input field Ba, a password input field Bb, an OK button Bo, and a cancel button Bc. When a user performs various operations on the operation unit 330 while this login screen Tp1 is displayed, the user can fill the user ID and the password into the fields Ba and Bb. When the OK button Bo is pressed down with a mouse point MP, the identification information relating to the user is input.

The identification information input to the login screen Tp1 is transmitted to the input support server 100, where if the input identification information is present in the user management DB 121, the user authentication unit 111 permits access to the input support server 100, so that the login is performed. While accessing, the user corresponding to the identification information input at the time of the login is recognized as the user of the terminal 300. Then, for example, when the terminal 300 transmits various kinds of information to the input support server 100, the server control unit 110 attaches the identification information to the various kinds of information, so that the information transmitted by the terminal 300 to the input support server 100 is recognized as information input by the predetermined user. It should be noted that unless the input identification information is present in the user management DB 121, login will not be performed.

Once logged in, the data reading unit 114a reads the examination list information from the clinical information DB 210, and transfers to the terminal control unit 310 of the terminal 300. Then, the function of the display control unit 312 is used to display an examination list screen on the display unit 340 on the basis of the examination list information.

Identification of Report-Input Targeted Examination

FIG. 10 is a figure showing an example of examination list screen G1. As shown in FIG. 10, the examination list screen G1 is a screen showing a list of information relating to the examination (namely, patient ID, name of patient, date of birth, age, sex, state, examination ID, date of examination, examination section, modality, the number of images). The user views the examination list screen G1 to find out that the examination labeled with the state "not yet interpreted" is an examination for which an interpretation report has not yet been generated.

In the examination list screen G1, a thick box cursor CS1 is displayed to encircle one examination. This thick box cursor CS1 is moved up and down in response to the user operation of the operation unit 330. When a decide button of the operation unit 330 (for example, a return key) is pressed down while the thick box cursor CS1 is placed on a desired examination, the one examination encircled by the thick box cursor CS1 is identified as the report-input targeted examination. When the report-input targeted examination is identified, the screen shown on the display unit 340 transits from the examination list screen G1 to an interpretation report input screen G2 (which will be described later).

Here, when the report-input targeted examination is selected in the examination list screen G1, a combination of the element belonging to the item "examination section" (for example, SKULL) and the element belonging to the item "modality" (for example, MR) is specified and recognized at the same time.

When the report-input targeted examination is identified, the task management unit 313 identifies a task relating to generation of a new interpretation report corresponding to the report-input targeted examination. Here, under the control of the task management unit 313, the data reading unit 114a reads, from the clinical information DB 210, the request matter and the attribute information representing the details of the examination corresponding to the report-input targeted examination, and provides them to the terminal control unit 310.

Structure of Interpretation Report Input Screen

Figure 11:
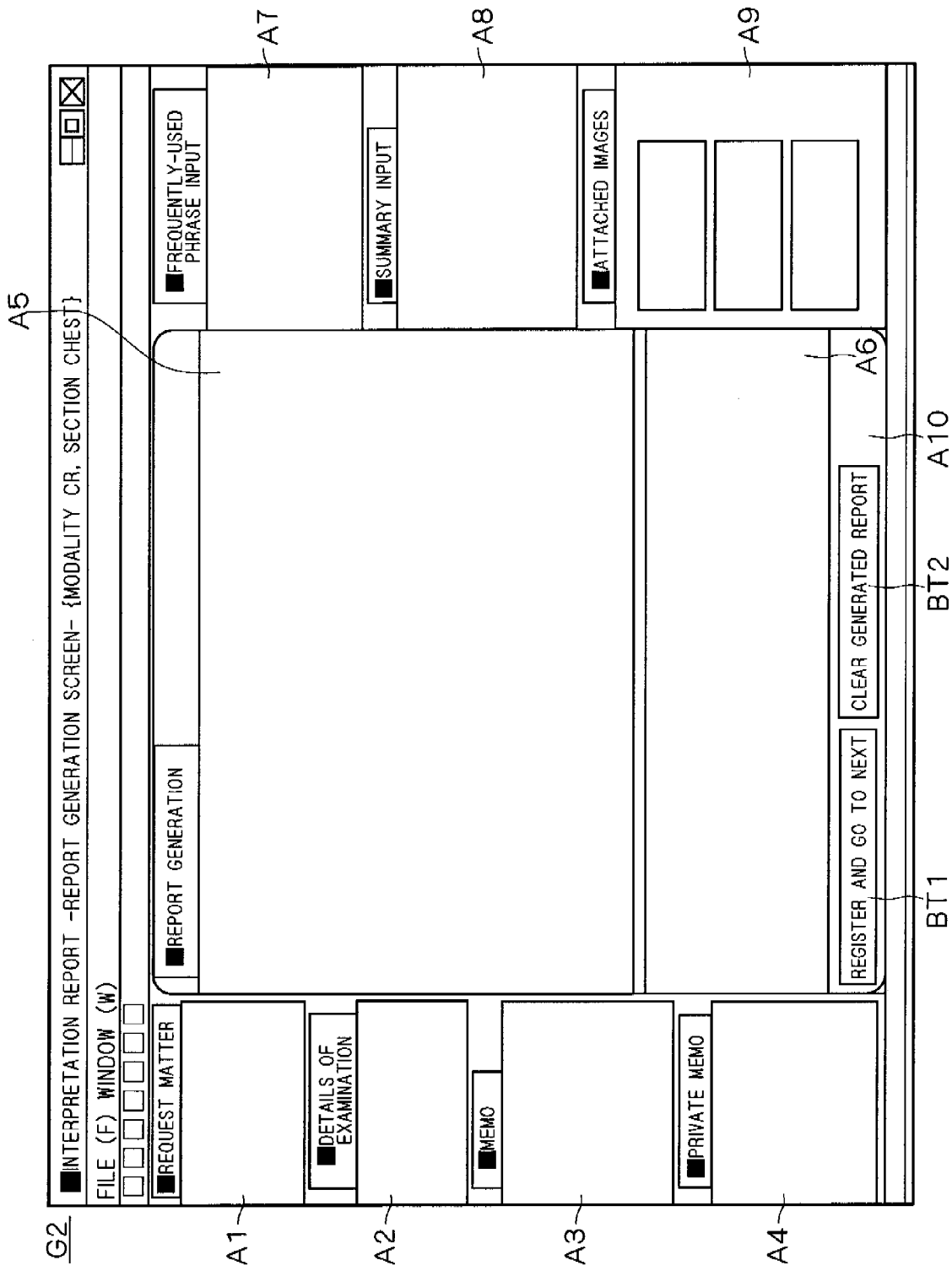
FIG. 11 is a figure showing an example of an interpretation report input screen.

FIG. 11 is a figure showing an example of the interpretation report input screen G2 displayed on the terminal 300. The interpretation report input screen G2 is consisted mainly of regions A1 to A10.

The region A1 is a region for displaying the content of the request matter relating to the report-input targeted examination. For example, the region A1 displays the content of the request matter as shown in FIG. 12, on the basis of information relating to the request matter obtained from the clinical information DB 210 via the input support server 100.

The region A2 is a region for displaying the detailed content of the examination relating to the report-input targeted examination. For example, the region A2 displays the detailed content of the examination as shown in FIG. 13, on the basis of information relating to the details of the examination obtained from the clinical information DB 210 via the input support server 100.

The regions A3 and A4 are regions in which opinions and other information are freely described according to an operation performed by a radiologist on the operation unit 330. However, the region A4 is described a highly confidential personal information, which is restricted from viewing by, for example, an input of a password.

The region A5 is a region for visually providing a portion of information obtained from the related information DB 122 in order to support generation of an interpretation report.

The region A6 is a region for displaying an observation text constituting an interpretation report. The observation text is filled into the region A6 in response to an operation performed by a radiologist on the operation unit 330.

The region A7 is a region for displaying a list of fixed phrases frequently used in observation texts (frequently-used phrases). For example, the region A7 displays a list of frequently-used phrases as shown in FIG. 14.

The region A8 is a region for displaying a list of fixed texts frequently used in observation text (summary phrases). For example, the region A8 displays a list of fixed texts as shown in FIG. 15.

The region A9 is a region for attaching a representative image. A desired, representative image is attached to the region A9 in accordance with operation performed by a radiologist on the operation unit 330

The region A10 is a region for enumerating icons for inputting commands (here, buttons BT1 and BT2). More specifically, the button BT1 is a button for deciding the content of the observation text and the attached image constituting the interpretation report generated on the interpretation report input screen G2, newly registering the content to the clinical information DB 210, and inputting a command for proceeding to generation of a subsequent interpretation report. The button BT2 is a button for inputting a command for clearing the content of the observation text and the attached image constituting the interpretation report generated on the interpretation report input screen G2, and for regenerating the content of the interpretation report over again.

Now, operation for inputting the observation text using templates displayed on the region A5 will be explained.

The region A5 obtains, from the related information DB 122, the information corresponding to the search rule input by a user through the information search operation, and visually outputs, as necessary in a form of template. Then, when alternatives of the elements in this template (here, terms and phrases including terms) are specified as necessary, an input of observation text is executed.

Information Search Operation

The search rule is decided according to information input from the operation unit 330, and is input to the information search unit 114c. The information search unit 114c infers data from the related information DB 122 on the basis of the input search rule to obtain a portion of information. For example, a technique of semantic web using RDF and inference may be used in this obtaining of a portion of information. Here, the portion of information is information representing relationship between elements (partial related information). The information search unit 114c generates the result display screen data on the basis of the partial related information, according to the screen generation rule corresponding to the search rule. This result display screen data are output to the terminal 300. In the terminal 300, the display control unit 312 displays the result display screen on the display unit 340 on the basis of the result display screen data provided by the information search unit 114c. The user can see the search result on the result display screen.

The information search operation will be hereinafter explained in more detail.

When the report-input targeted examination is specified on the examination list screen G1, the interpretation report input screen G2 (for example, FIG. 11) displays, for example, the content of the request matter (for example, FIG. 12) in the region A1 and the detailed content of the examination relating to the report-input targeted examination (for example, FIG. 13) in the region A2. Further, the function of the information search unit 114c is used to display, in the region A5, a search-condition deciding-template (which may be hereinafter abbreviated as "template" as necessary) Tp2.

FIG. 16 is a figure showing an example of the template Tp2. The template Tp2 is a template for deciding a search rule (more specifically, search condition) for obtaining a desired partial related information from the related information DB 122.

The template Tp2 enumerates terms (alternatives) about the attribute item "category", i.e., one of all the attribute items in the related information DB 122. The enumerated alternatives relating to the attribute item "category" are, among related information DB122, for example, the elements belonging to the item "category", associated with a combination of an element belonging to the item "examination section" and an element belonging to the item "modality" designated at the same time as when the report-input targeted examination is identified through an examination identifying operation.

For example, when a combination of the element "CHEST" belonging to the item "examination section" and the element "MR" belonging to the item "modality" is specified in the examination identifying operation, the template Tp2 enumerates, as alternatives, a plurality of elements belonging to the item "category" (for example, vascular defect, degenerative disease, inflammation and infection, tumor, details of tumor, and the like) as shown in FIG. 16.

Information about alternatives relating to the item "category" enumerated in the template Tp2 may be stored in the storage unit 120 and the like in advance. For example, one or more elements relating to the item "category" may be stored in association with a combination of elements belonging to two items "examination section" and "modality", and the template Tp2 may show a list of alternatives belonging to the item "category" according to the combination of elements belonging respectively to the two items "examination section" and "modality" specified by the examination list screen G1.

A radiologist performs various operations on the operation unit 330, so that the mouse pointer MP is placed on a desired alternative in the template Tp2. When a predetermined operation (for example, double click) is performed, the desired alternative is specified with respect to the item "category". At this occasion, a combination of a plurality of items and elements specified in an examination list screen (for example, FIG. 10) and the template Tp2 (for example, FIG. 16) is decided as a search condition.

For example, when an alternative "vascular defect" is specified with respect to the item "category" in the template Tp2 as shown in FIG. 16, the search condition is decided as follows: the element "CHEST" is specified with respect to the item "examination section"; the element "CR" is specified with respect to the item "modality"; and the element "vascular defect" is specified with respect to the item "category". Here, the search condition represents a combination of a plurality of items and elements but the present invention is not limited thereto, and may be for example, a combination of one or more items and one or more elements.

At this occasion, for example, a portion of information satisfying a search condition is obtained from the related information DB 122, and a search rule is input to extract elements belonging to predetermined items and information representing the relationship thereof and present them according to a predetermined order of items. This search rule is given by the terminal control unit 310 from the terminal 300 to the information search unit 114c and the setting recognition unit 114b.

Further, the setting recognition unit 114b recognizes and employs a setting file corresponding to the search rule in response to an input of the search rule. Here, the setting recognition unit 114b references the output setting information DB 124, recognizes the output information relating to each element with respect to the user of the terminal 300 that has input the search rule, and corrects the screen generation rule included in the setting file.

The information search unit 114c collects, from the related information DB 122, the single-report-structured data satisfying the search condition (namely, having a corresponding combination of elements) in response to input of the search rule. In other words, information representing relationship between some of the elements (the partial related information) is collected from the related information DB 122. Then, the result display screen data according to the screen generation rule is generated. Here, the result display screen data is generated, realizing a form of list representation in which an element belonging to each item in the collected single-report-structured data are grouped into items and arranged according to the display order and the predetermined number of items defined by the screen generation rule. In the result display screen data, overlapped elements are grouped into one.

More specifically, this result display screen data includes information enumerating one or more (here, a plurality of) attributes values (here, terms) for each item included in the plurality of items. The display unit 340 visually outputs this result display screen data as the result display screen in accordance with the control of the display control unit 312. This result display screen can be in a form of a template (which may be hereinafter referred to as "input support template") in which elements (for example, terms) belonging to each item included in the list representation are presented as alternatives that can be specified as elements constituting an interpretation report (report constituent element).

Overview of Input Support Template

FIG. 17 is a figure showing an example of an input support template Tp3. Various inputs and specifications to the template Tp3 are made based on a signal that is input in response to operation performed by a user, i.e., radiologist, on the operation unit 330.

In the template Tp3 as shown in FIG. 17, an extraction condition is presented at the uppermost portion, and below it is a plurality of display elements (item display elements), visually representing a plurality of items (at this occasion, four items "imaging condition", "section", "basic observation text", and "diagnosis"), arranged from left to right in a spatial sequential order. Further, below the item display elements, a plurality of terms (terms and phrases including terms) F1 to F4 are enumerated, sequentially from left to right, as display elements visually representing the elements respectively belonging to the items "imaging condition", "section", "basic observation text", and "diagnosis".

For example, as shown in FIG. 17, a plurality of terms (T1 weighted image, T2 weighted image, T2 FLAIR image) F1 are enumerated with respect to the attribute item "imaging condition", a plurality of terms (optic thalamus, ..., putamen) F2 are enumerated with respect to the attribute item "section", a plurality of terms (high intensity area, low intensity area) F3 are enumerated with respect to the attribute item "basic observation text", and a plurality of terms (lacunar infarction, old cerebral infarction) F4 are enumerated with respect to the attribute item "diagnosis"

More specifically, the plurality of terms F1 are arranged in the vertical direction below the item display element "imaging condition" representing the item to which the plurality of terms F1 belong, the plurality of terms F2 are arranged in the vertical direction below the item display element "section" representing the item to which the plurality of terms F2 belong, the plurality of terms F3 are arranged in the vertical direction below the item display element "basic observation text" representing the item to which the plurality of terms F3 belong, and the plurality of terms F4 are arranged in the vertical direction below the item display element "diagnosis" representing the item to which the plurality of terms F4 belong.

These plurality of terms F1 to F4 correspond to the list representation relating to the partial related information. This list representation is made by visually outputting a portion of information extracted from the related information DB 122 in accordance with the output information of the output setting information DB 124. For example, when the output setting information DB 124 stores the data table TB 3a a as shown in FIG. 18, and a user who uses the terminal 300 is user A, the plurality of terms F1 to F4 are visually output in accordance with the output information (visible or invisible) of each element associated with the user A in the output setting information DB 124. In other words, the elements associated with visible are visually output in the plurality of terms F1 to F4, and the elements associated with invisible (for example, cerebral hemisphere, enlarge, cerebral infarction, and subacute cerebral infarction) are not visually output in the plurality of terms F1 to F4.

Then, the user can generate an interpretation report with referencing the knowledge accumulated in the past by viewing the template Tp3.

Input of Observation text

Further, in the template Tp3, for each of four items (imaging condition, section, basic observation text, diagnosis), a user can specify a term corresponding to each item constituting an observation text of a new interpretation report, by placing the mouse pointer MP on one of the plurality of terms F1 to F4 and pressing down the left button of the mouse (left-click). At this occasion, the user references a text model MD of observation text of interpretation report displayed at lower portion of the template Tp3. The information relating to this text model MD is provided from outside together with, for example, teacher data and the like.

This text model MD represents a model of observation text of interpretation report such as "in [Blank Field W1], in [Blank Field W2], [Blank Field W3] is seen. The patient is suspected of [Blank Field W4]." Further, the terms serving as the elements (i.e., elements that constitute the text, which may be hereinafter referred to as "text constituent element") relating to the four items (imaging condition, section, basic observation text, diagnosis) are respectively applicable to the blank fields W1 to W4. More specifically, according to specifications of terms by the user, one of the plurality of terms F1 (for example, T1 weighted image) is filled into the blank field W1, one of the plurality of terms F2 (for example, corpus callosum) is filled into the blank field W2, one of the plurality of terms F3 (for example, high intensity area) is filled into the blank field W3, and one of the plurality of terms F4 (for example, lacunar infarction) is filled into the blank field W4.

In FIG. 19, the four terms (T1 weighted image, corpus callosum, high intensity area, lacunar infarction) are specified to the four items (imaging condition, section, basic observation text, diagnosis), and the template Tp3 in which display elements representing the specified terms are displayed in reversed grayscale are shown. At this occasion, the report constitution unit 314 generates an observation text based on the text model MD and the terms filled into the blank fields W1 to W4, and displayed in a region A6.

In the template Tp3, the terms are filled into the blank fields W1 to W4 of the text model MD, and when a user operates the operation unit 330 as necessary to press down the button BT1 in a region A10 with the mouse pointer MP while the observation text is displayed in the region A6, the observation text displayed in the display region A6 is registered as the new observation text.

At this occasion, the information about the newly generated observation text is additionally registered to the clinical information DB 210 by the data writing unit 114d. For example, information representing the following observation text made of natural sentences is generated and additionally registered to the clinical information DB 210: "in T1 weighted image, in corpus callosum, high intensity area is seen. The patient is suspected of lacunar infarction." In other words, information about the new interpretation report (new interpretation report information) is generated that includes the new observation text according to the predetermined text model MD. Further, the related information generating unit 112 generates the new single-report-structured data, so as to enrich the related information DB 122 and the combination information DB 123 as necessary.

Here, one text constituent element is specified for each item, but the present invention is not limited thereto and at least one or more text constituent element may be specified for each item, for example, two or more text constituent element may be specified. Alternatively, the report constitution unit 314 may generate a new single-report-structured information by associating the examination IDs with the elements (here, terms) filled into the blank fields W1 to W4 of the text model MD and the elements (here, terms) constituting the extraction condition, and the related information generating unit 112 and the combination information generating unit 113 may enrich the related information DB 122 and the combination information DB 123 as necessary.

Further, in the template Tp3, when elements are specified with respect to one or more items, the combination information DB 123 may be referenced, and a combination of elements closely related with the specified element may be displayed in such a visually distinguishable manner. Alternatively, the order of display of items may be changed as necessary in accordance with various operations performed by a user on the operation unit 330.

In the template Tp3, various display based on the output setting information DB 124 and the output information stored in the output setting information DB 124 can be changed in accordance with various information input by a user from the operation unit 330. Various displays based on the output setting information DB 124 are realized by performing the steps of causing the setting recognition unit 114b to recognize the output information, causing the information search unit 114c to generate data to display a screen, and causing the display unit 340 to visually output data. Further the change of the output information is realized by the output setting information generating unit 115.

Display and Selection of Hidden elements

The template Tp3 is arranged with buttons B1 to B4 for requesting display of terms that are not visually displayed according to the output information "invisible", with respect to each item (imaging condition, section, basic observation text, diagnosis). In the template Tp3, when a user performs various operations on the operation unit 330 to place the mouse pointer MP on any one of the buttons B1 to B4 and press down the button (here, left-click), a list enumerating one or more elements (here, terms) that are not visually output according to the output information "invisible" is requested to be displayed with respect to the desired one item.

Specifically, the setting recognition unit 114b references the output setting information DB 124 to recognize the element attached with the output information "invisible" with respect to the desired one item. Then, the information search unit 114c generates data for displaying a screen where the template Tp3 is attached with the element attached with the output information "invisible" recognized by the setting recognition unit 114b and transmits to the terminal 300. At this occasion, the terminal 300 visually outputs the element attached with the output information "invisible" with respect to the desired one item.

For example, as shown in FIG. 20, when the button B4 relating to the item "diagnosis" is pressed down by the mouse pointer MP, a list with respect to the item "diagnosis" is requested to be displayed, in which the list visually enumerates the elements that are not visually output (which may be hereinafter referred to as "hidden elements") according to the output information "invisible". At this occasion, as shown in FIG. 20, a list CL1 visually enumerating the hidden elements (here, cerebral infarction and subacute cerebral infarction) is displayed in proximity to the button B4. In other words, according to a specific operation performed by a user, the elements associated with the output information prohibiting the visual output in the output setting information DB 124 are visually output.

The hidden elements visually enumerated in the list CL1 shown in FIG. 20 correspond to the elements that are associated with the output information "invisible" with respect to user A in the data table TB3a shown in FIG. 18. Here, a list display of the hidden elements relating to the item "diagnosis" has been explained as an example, but when the buttons B1 to B3 are pressed down, lists visually enumerating one or more hidden elements can also be displayed with respect to each item other than the item "diagnosis" (imaging condition, section, basic observation text).

Figure 21:
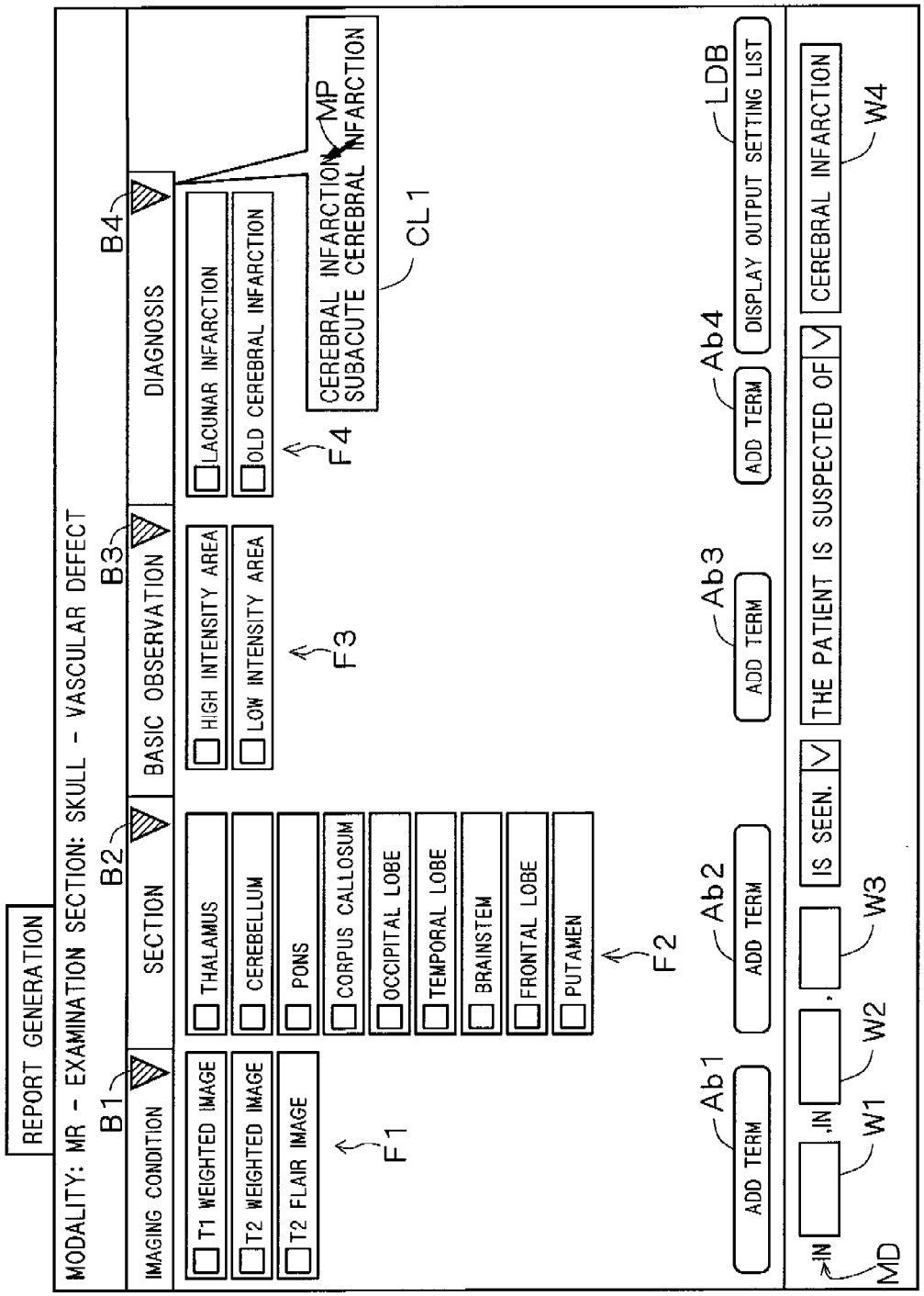
FIG. 21 is a figure showing an example of the input support template.

Then, as shown in FIG. 21, when a user performs various operations on the operation unit 330 to place the mouse pointer MP on a desired one of the one or more hidden elements visually enumerated in the list CL1 and perform a left-click, the desired hidden element is selected as a term constituting the observation text. At this occasion, the selected, desired hidden element is specified as a term corresponding to one of the plurality of items constituting the observation test to which the desired hidden element belongs. In FIG. 21, the hidden element "cerebral infarction" is selected with respect to the item "diagnosis", and the selected element "cerebral infarction" is filled into the blank field W4

Change of Output Information

In the template Tp3, a user can change the output information relating to any term included in the plurality of terms F1 to F4 to "invisible" by operating the operation unit 330 as necessary.

For example, as shown in FIG. 22, when a user places the mouse pointer MP on a desired term included in the plurality of terms F1 to F4 (for example, "old cerebral infarction") and presses down the right button of the mouse (right-click), a command list CL2 is displayed in proximity to the desired term. The command list CL2 shows an indication (hereinafter "hide-command indication") for inputting a command for changing the output information of desired term from "visible" to "invisible". In FIG. 22, a hide-command indication "change display setting to invisible" is shown.

Then, when a user operates the operation unit 330 as necessary to place the mouse pointer MP on the hide-command indication "change display setting to invisible" and performs a left-click, a command is input to change the output information of the desired element from "visible" to "invisible".

At this occasion, the information search unit 114c references the combination information DB 123, and recognizes one or more other distinct elements combined with the desired element in the combination information DB 123. Then, the information search unit 114c generates data for displaying a screen for requesting change of the output information relating to the recognized one or more elements (hereinafter "related element setting input screen"), and the display unit 340 displays the related element setting input screen on the basis of the data. In other words, when the output setting information generating unit 115 changes the output information relating to the desired element, a display element requesting change of the output information with respect to one or more other distinct elements combined with the desired element in the combination information DB 123 is visually output.

FIG. 23 is a figure illustrating an example of a related element setting input screen Tp5 displayed when the output information of the desired element is changed from "visible" to "invisible".

In the related element setting input screen Tp5, a user is asked whether to change, from "visible" to "invisible", the output information of other elements closely related to the desired element (here, old cerebral infarction) for which the command is input to change the output information from "visible" to "invisible.

Specifically, for example, as shown in FIG. 23, the element "T2 weighted image" belonging to the item "imaging condition", the elements "thalamus" and "frontal lobe" belonging to the item "section", and the element "high intensity area" belonging to the item "basic observation text" are enumerated in such a manner that each item can be distinguished from each other. The related element setting input screen Tp5 enumerates one or more elements that is combined with the element "old cerebral infarction" for a predetermined number of times (for example, three times) or more in the combination information DB 123 and that is attached with the output information "visible" in the output setting information DB 124.

Further, in the related element setting input screen Tp5, checkboxes Cx11, Cx21, Cx22, Cx31 are arranged on the left side of each element (here, term). In the initial state in which the related element setting input screen Tp5 is displayed, the checkboxes Cx11, Cx21, Cx22, Cx31 are attached with check marks (checked state) so as to indicate that the output information of each element is "visible".

Here, when a user performs various operations on the operation unit 330 to place the mouse pointer MP on the checkbox arranged on the left side of the element whose output information is to be changed to "invisible" and perform a left-click, the checkbox is changed from checked state to the state without any checkmark attached (unchecked state).

Then, when the checkbox is changed from checked state to unchecked state, and then an OK button Bo arranged on the lower portion of the related element setting input screen Tp5 is pressed down by the mouse pointer MP as necessary, a command is input to change, from "visible" to "invisible", the output information of the element relating to the checkbox that has been changed to unchecked state. In other words, at this occasion, the command for changing the output information of the desired element (here, old cerebral infarction) from "visible" to "invisible" and the command for changing the output information of element closely related to the desired element (here, old cerebral infarction) from "visible" to "invisible" are input.

In a case where the output setting information generating unit 115 changes the output information of the desired element from "visible" to "invisible", unless the output information of one or more other distinct elements combined with the desired element in the combination information DB 123 is specified to be changed from "visible" to "invisible", the display unit 340 visually outputs a display element indicating a predetermined warning under the control of the display control unit 312.

Specifically, when there is an element maintaining checked state in the related element setting input screen Tp5, the display unit 340 displays a warning screen for confirming that the output information of the element in checked state is not to be changed to "invisible", in response to the OK button Bo pressed down. As described above, the indication is shown to prompt a user to change the output information of the closely related element. Therefore, visual output conditions, such as permission or prohibition of visual output, can be reliably changed without failure, with respect to a plurality of elements constituting one piece of knowledge such as a combination of elements.

Figure 24:
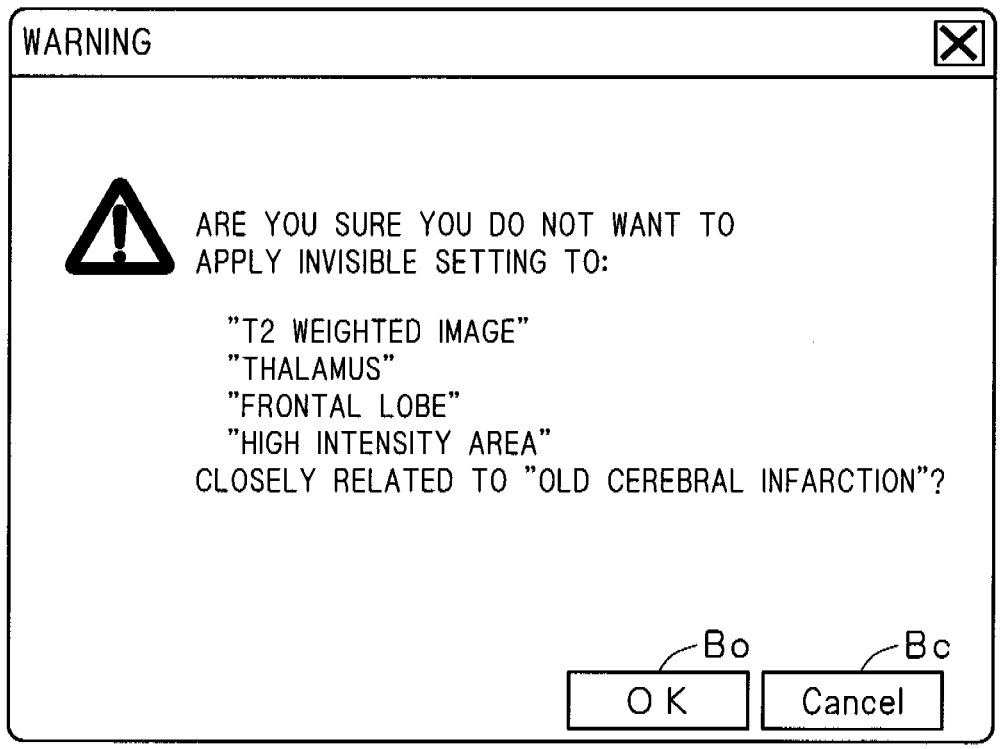
FIG. 24 is a figure showing an example of a warning screen.

FIG. 24 is a figure showing an example of warning screen CGa for confirming that the output information is not to be changed to "invisible".

For example, when four elements (T2 weighted image, thalamus, frontal lobe, high intensity area) are maintained in checked state in the related element setting input screen Tp5 as shown in FIG. 23, a user is asked whether the output information of the four elements (T2 weighted image, thalamus, frontal lobe, high intensity area) should be changed to "invisible", in the warning screen CGa as shown in FIG. 24. On the lower portion of the warning screen CGa, the OK button Bo and the cancel button Bc are arranged. When the OK button Bo is pressed down by the mouse pointer MP, the command for accordingly changing the output information is determined. On the other hand, when the cancel button Bc is pressed down by the mouse pointer MP, the screen displayed on the display unit 340 is changed back to the related element setting input screen Tp5 with the control of the display control unit 312.

When the cancel button Bc arranged on the lower portion of the related element setting input screen Tp5 is pressed down by the mouse pointer MP, the command for changing the output information of the desired element (here, old cerebral infarction) from "visible" to "invisible" is canceled.

When a user operates the mouse pointer MP in the related element setting input screen Tp5 to set the checkbox Cx0 to checked state and presses down the OK button Bo with the mouse pointer MP, the related element setting input screen Tp5 is no longer displayed thereafter. When the output setting information generating unit 115 changes the output information of the desired element from "visible" to "invisible", the output information with respect to one or more other distinct elements combined with the desired element in the combination information DB 123 is also changed from "visible" to "invisible", instead of displaying the related element setting input screen Tp5.

In other words, the output information of the other elements closely related to the element whose output information is changed from "visible" to "invisible" is also set to automatically change from "visible" to "invisible". Note that, for example, the storage unit 320 stores the information of setting for automatically changing the output information of closely-related other elements. As described above, when the output information of the elements including the closely-related other elements is automatically changed, visual output conditions such as permission or prohibition of visual output are changed for each information constituted of the plurality of elements.

Now, the change of the output setting information DB 124 according to the command for changing the output information will be explained.

For example, where the output setting information DB 124 stores the data table TB 3a as shown in FIG. 18, when a command for changing the output information of the desired element (old cerebral infarction) from "visible" to "invisible" is input in response to operation performed by a user A on the operation unit 330 as shown in FIG. 23, the output setting information generating unit 115 changes the data table TB 3a (FIG. 18) to the data table TB3b as shown in FIG. 25

Specifically, the data table TB 3a in which the output information "visible" is associated with the user A and the element "old cerebral infarction" is changed to the data table TB 3b in which the output information "invisible" is associated with the user A and the element "old cerebral infarction".

The output information of one or more hidden element (here, cerebral infarction, subacute cerebral infarction) visually enumerated in the list CL1 shown in FIG. 20 can be changed from "invisible" to "visible" in the template Tp3. Below is a further explanation with a specific example.

Figure 26:
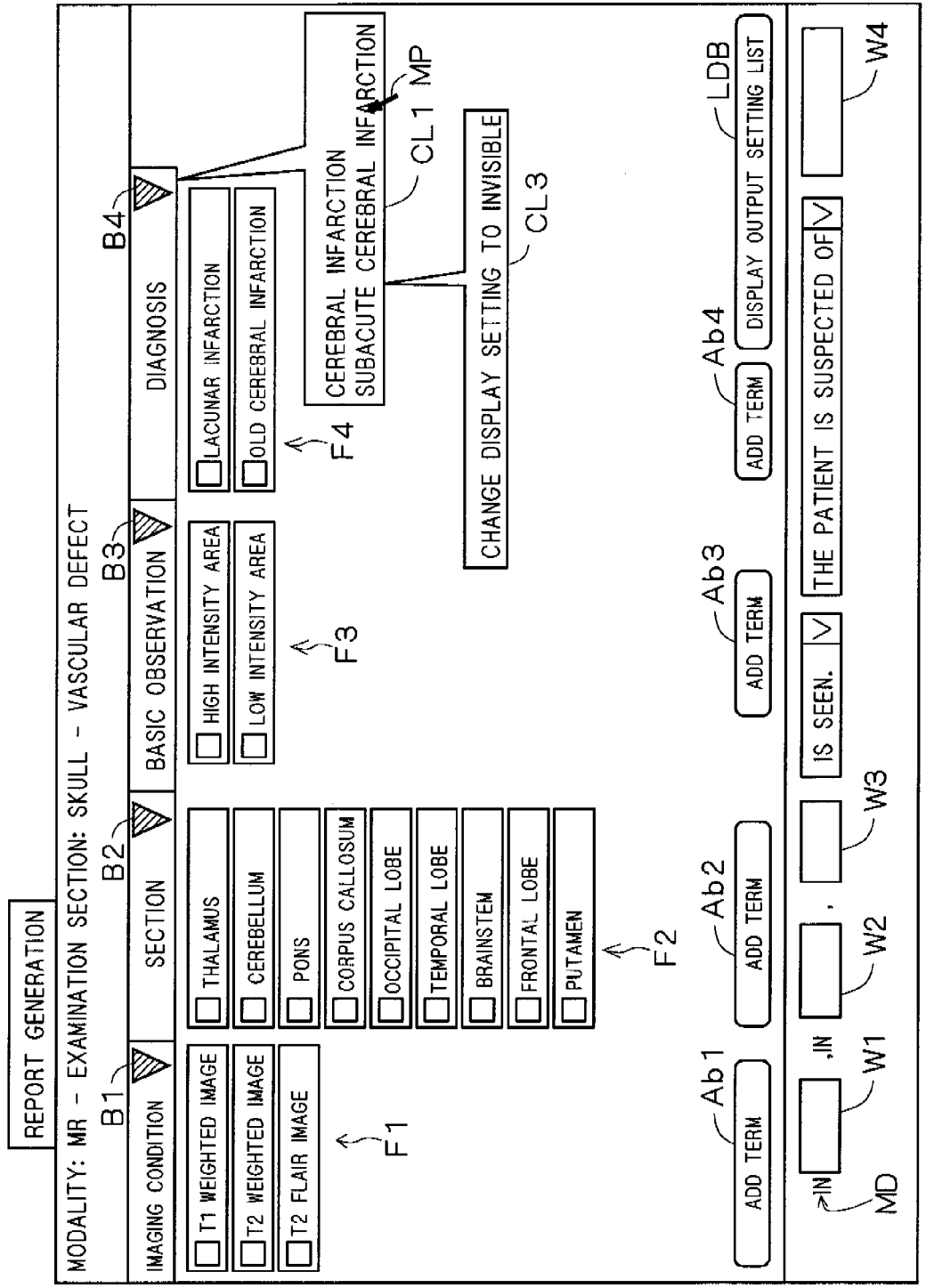
FIG. 26 is a figure showing an example of the input support template.

For example, when a user performs various operations on the operation unit 330 to place the mouse pointer MP on the desired hidden element (here, subacute cerebral infarction) of one or more hidden elements visually enumerated in the list CL1 as shown in FIG. 26 and performs a right-click, the command list CL3 is displayed in proximity to the desired hidden element. In the command list CL3, an indication (hereinafter "show-command indication") is shown to input a command for changing the output information of the desired hidden element from "invisible" to "visible". In FIG. 26, a show-command indication "change display setting to visible" is shown.

Then, when a user operates the operation unit 330 as necessary to place the mouse pointer MP on the show-command indication "change display setting to visible" and performs a left-click, a command is input to change the output information of the desired element from "invisible" to "visible".

At this occasion, the information search unit 114c references the combination information DB 123 to recognize one or more other distinct elements combined with the desired element in the combination information DB 123. Then, the information search unit 114c generates data for displaying the related element setting input screen for requesting change of the output information relating to the recognized one or more elements, and the display unit 340 displays the related element setting input screen on the basis of the data.

FIG. 27 is a figure showing an example of related element setting input screen Tp6 displayed when the output information of the desired element is changed from "invisible" to "visible".

In the related element setting input screen Tp6, a user is asked whether to change, from "invisible" to "visible", the output information of other elements closely related to the desired element (here, subacute cerebral infarction) for which the command is input to change the output information from "invisible" to "visible".

Specifically, the related element setting input screen Tp6 enumerates one or more elements that is combined with the desired element (for example, subacute cerebral infarction) for a predetermined number of times (for example, three times) or more in the combination information DB 123 and that is attached with the output information "invisible" in the output setting information DB 124. For example, as shown in FIG. 27, the element "cerebral hemisphere" belonging to the item "section" is enumerated in such a manner that each item to which it belongs is distinguishable.

In the related element setting input screen Tp6, a checkbox Cx23 is arranged on the left side of each element (here, one term). In the initial state in which the related element setting input screen Tp6 is displayed, the checkbox Cx23 is not attached with any check mark (unchecked state) so as to indicate that the output information of each element is "invisible".

Here, when a user performs various operations on the operation unit 330 to place the mouse pointer MP on the checkbox arranged on the left side of the element whose output information is to be changed to "visible" and perform a left-click, the checkbox is changed from unchecked state to checked state.

Then, when the checkbox is changed from unchecked state to checked state, and then the OK button Bo arranged on the lower portion of the related element setting input screen Tp6 is pressed down by the mouse pointer MP as necessary, a command is input to change, from "invisible" to "visible", the output information of the element set to checked state. In other words, at this occasion, the command for changing the output information of the desired element (here, subacute cerebral infarction) from "invisible" to "visible" and the command for changing the output information of element (for example, cerebral hemisphere) closely related to the desired element (here, subacute cerebral infarction) from "invisible" to "visible" are input.

In a case where the output setting information generating unit 115 changes the output information of the desired element from "invisible" to "visible", unless the output information of one or more other distinct elements combined with the desired element in the combination information DB 123 is specified to be changed from "invisible" to "visible", the display unit 340 visually outputs a display element indicating a predetermined warning under the control of the display control unit 312.

Specifically, when there is an element maintaining unchecked state in the related element setting input screen Tp6, the display unit 340 displays a warning screen for confirming that the output information of the element in unchecked state is not to be changed to "visible", in response to the OK button Bo pressed down. As described above, the indication is shown to prompt a user to change the output information of the closely related element. Therefore, visual output conditions, such as permission or prohibition of visual output, can be reliably changed without failure, with respect to a plurality of elements constituting one piece of knowledge such as a combination of elements.

Figure 28:
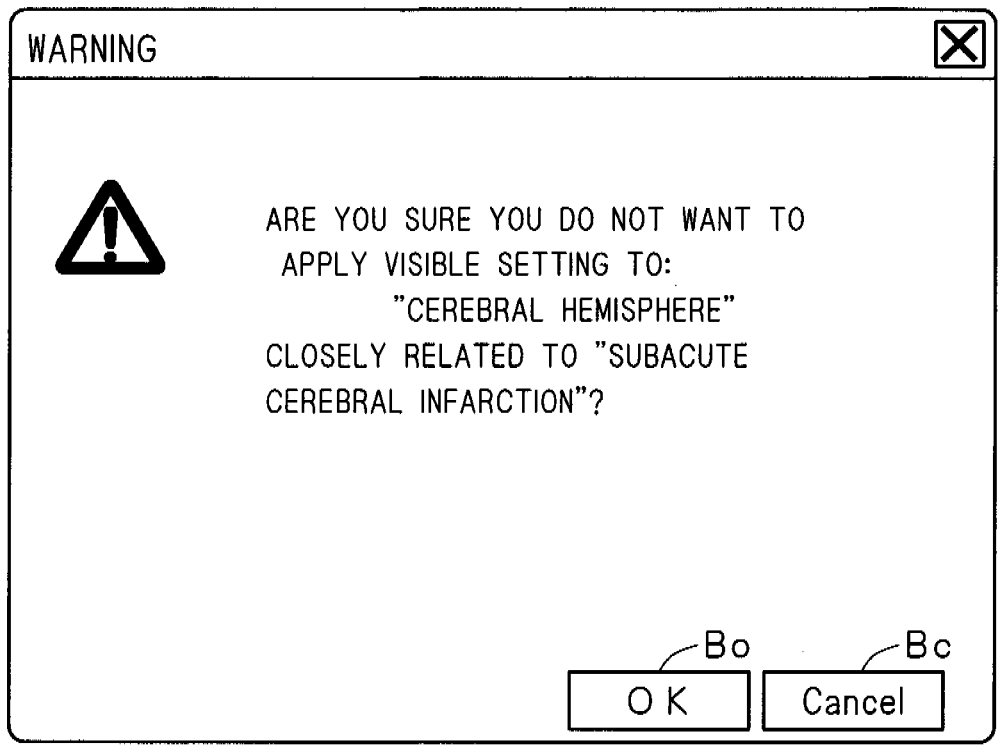
FIG. 28 is a figure showing an example of the warning screen.

FIG. 28 is a figure showing an example of warning screen CGb for confirming that the output information is not to be changed to "visible".

If one element (cerebral hemisphere) is maintained in unchecked state in the related element setting input screen Tp6, a user is asked whether the output information of the one element (cerebral hemisphere) should be changed to "visible", in the warning screen CGb as shown in FIG. 28. On the lower portion of the warning screen CGb, the OK button Bo and the cancel button Bc are arranged. When the OK button Bo is pressed down by the mouse pointer MP, the command for accordingly changing the output information is determined. On the other hand, when the cancel button Bc is pressed down by the mouse pointer MP, the screen displayed on the display unit 340 is changed back to the related element setting input screen Tp6 with the control of the display control unit 312.

When the cancel button Bc arranged on the lower portion of the related element setting input screen Tp6 is pressed down by the mouse pointer MP, the command for changing the output information of the desired element (here, subacute cerebral infarction) from "invisible" to "visible" is canceled.

When a user operates the mouse pointer MP in the related element setting input screen Tp6 to set the checkbox Cx1 to checked state and presses down the OK button Bo with the mouse pointer MP, the related element setting input screen Tp6 is no longer displayed thereafter. When the output setting information generating unit 115 changes the output information of the desired element from invisible" to "visible", the output information of one or more other distinct elements combined with the desired element in the combination information DB 123 is changed from "invisible" to "visible", instead of displaying the related element setting input screen Tp6.

In other words, the output information of the other elements closely related to the element whose output information is changed from "invisible" to "visible" is also set to automatically change from "invisible" to "visible". Note that, for example, the storage unit 320 stores the information of setting for automatically changing the output information of closely-related other elements. As described above, when the output information of the elements including the closely-related other elements is automatically changed, visual output conditions such as permission or prohibition of visual output are changed for each information constituted of the plurality of elements.

Now, the change of the output setting information DB 124 according to the command for changing the output information will be explained.

For example, where the output setting information DB 124 stores the data table TB 3a as shown in FIG. 18, when a command for changing the output information of two elements (subacute cerebral infarction, cerebral hemisphere) from "invisible" to "visible" is input in response to operation performed by a user A on the operation unit 330 as shown in FIG. 27, the output setting information generating unit 115 changes the data table TB 3a (FIG. 18) to the data table TB 3c as shown in FIG. 29.

Specifically, the data table TB 3a in which the output information "invisible" is associated with the combination of the user A and the element "subacute cerebral infarction" and the combination of the user A and the element "cerebral hemisphere" is changed to the data table TB 3c in which the output information "visible" is associated with the combination of the user A and the element "subacute cerebral infarction" and the combination of the user A and the element "cerebral hemisphere".

As described above, while the display unit 340 displays the list CL1 visually outputting the hidden elements associated with the output information "invisible" in the output setting information DB 124, the output setting information generating unit 115 changes the output information "invisible" associated with the hidden element to the output information "visible", in response to a predetermined operation performed by the user on the operation unit 330. At this occasion, the setting for permitting the output of the hidden elements can be changed while the hidden elements are visually output. Therefore, it is easy to determine whether to permit output.

Input of Additional Information

As shown in FIG. 17, the template Tp3 is arranged with four term addition buttons Ab1 to Ab4. The four term addition buttons Ab1 to Ab4 are buttons for respectively adding terms belonging to four items (imaging condition, section, basic observation text, diagnosis). More specifically, the term addition button Ab1 is a button for adding terms belonging to the item "imaging condition", the term addition button Ab2 is a button for adding terms belonging to the item "section", the term addition button Ab3 is a button for adding terms belonging to the item "basic observation text", and the term addition button Ab4 is a button for adding terms belonging to the item "diagnosis".

When a user operates the operation unit 330 as necessary to press down any one of the term addition buttons Ab1 to Ab4 with the mouse pointer MP, the display unit 340 displays a template for generating a term (hereinafter "term generation template") under the control of the display control unit 312. The explanation below will be made on an example in which the term addition button Ab4 is pressed down.

FIG. 30 is an example of term generation template Tp4 overlappingly displayed on the template Tp3 when the term addition button Ab4 is pressed down.

The term generation template Tp4 is arranged with a term field Bx1, an additional prefix field Bx2, an additional suffix field Bx4, the OK button Bo, and the cancel button Bc.

The term field Bx1 is a field for filling in a new term that a user wants to add. A user places the mouse pointer MP on the term field Bx1 and performs a left-click, so that a cursor appears in the term field Bx1. In this state, a desired term is filled into the term field Bx1 by an input of information from a keyboard.

The additional prefix field Bx2 is a field for filling in a prefix which is to be added to the term in the term field Bx1. The additional suffix field Bx4 is a field for filling in a suffix which is to be added to the term in the term field Bx1. A user places the mouse pointer MP on either of the additional prefix field Bx2 and the additional suffix field Bx4 and performs a left-click, so that the cursor appears in either of the additional prefix field Bx2 and the additional suffix field Bx4. In this state, a desired prefix is filled into the additional prefix field Bx2, or a suffix is filled into the additional suffix field Bx4, in response to an input of information from a keyboard.

Figure 31:
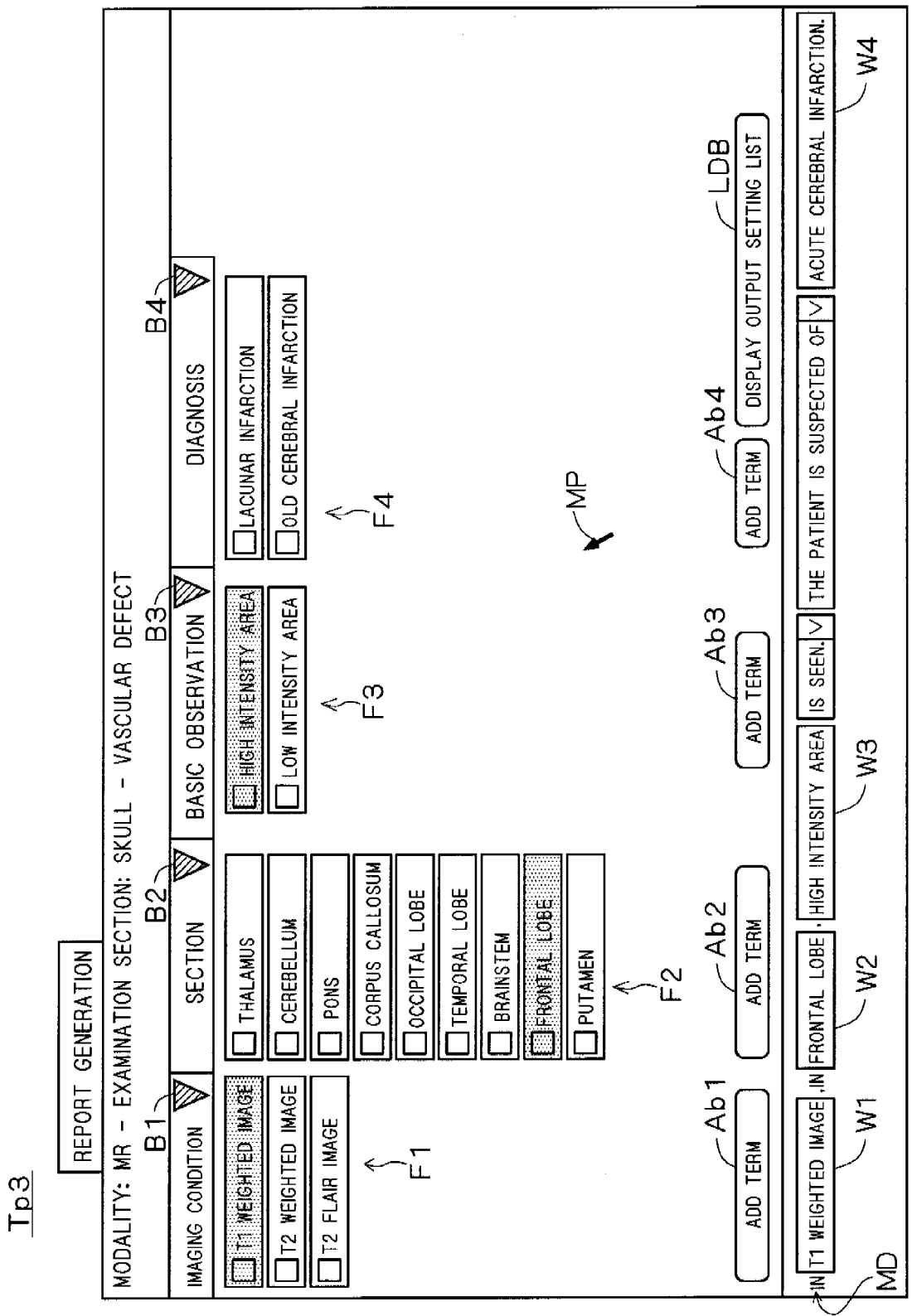
FIG. 31 is a figure showing an example of the input support template.

Then, when a user pressed down the OK button Bo, with the mouse pointer MP, for example with a term "acute cerebral infraction" filled in the term field Bx1, "acute cerebral infarction" is filled into the blank field W4 of the item "diagnosis" as shown in FIG. 31. On the other hand, when the cancel button Bc is pressed down by the mouse pointer MP, the term generation template Tp4 disappears from the region A5, and the template Tp3 is displayed in the region A5.

Then, for example, as shown in FIG. 31, 4 terms (T1 weighted image, frontal lobe, high intensity area, acute cerebral infarction) are filled into the blank fields W1 to W4, and the following observation text is displayed in the region AG: "In T1 weighted image, in frontal lobe, high intensity area is seen. The patient is suspected of acute cerebral infarction." When a user pressed down the button BT1 with the mouse pointer MP in this state, the report constitution unit 314 registers the observation text displayed in the region AG as a new observation text.

At this occasion, the data writing unit 114d additionally registers the information about the newly generated observation text to the clinical information DB 210, and the related information generating unit 112 generates a new single-report-structured data, so as to enrich the related information DB 122 and the combination information DB 123 as necessary. As long as the elements constituting this new single-report-structured data include at least one or more new elements (for example, acute cerebral infarction), i.e., additional information, the output information of the new element is added to the output setting information DB 124.

In other words, in response to the input of the additional information relating to the at least one or more elements from the terminal 300, the related information generating unit 112 additionally writes the additional information to the related information DB 122, and the output setting information generating unit 115 stores, to the output setting information DB 124, the output setting information associated with the information relating to the output of the additional information.

Further, at this occasion, in the output setting information DB 124, the output information "visible" is associated with the additional information with respect to a user who inputs the additional information. On the other hand, the output information "invisible" is associated with the additional information with respect to the other users.

FIG. 32 is a figure showing an example of data content of the output setting information DB 124, right after a user B inputs, from the terminal 300, the element "acute cerebral infarction" as additional information. As shown in FIG. 32, the output information "visible" is associated with the element "acute cerebral infarction", i.e., the additional information, with respect to the user B who inputs the additional information. On the other hand, the output information "invisible" is associated with the element "acute cerebral infarction", i.e., the additional information, with respect to the other users (for example, user A).

As described above, when the additional information is additionally written to the related information DB 122 and the combination information DB 123, the visual output of the additional information is permitted with respect to the user who additionally wrote the additional information, whereas the visual output of the additional information is prohibited with respect to the other users. Therefore, in subsequent uses, the additional information input by the user is visually output in such a manner as included in the plurality of terms F1 to F4 in the template Tp3, so that the knowledge of the past can be provided in accordance with the circumstances of the user. Further, the user who has not added the additional information is not forced to abruptly see additional information made by another user.

Whether the additional information is useful for the other users is not known. Therefore, the added element is set to a hidden element right after the additional information is added. However, the output information of the hidden element may be changed, as necessary, from "invisible" to "visible" through the operation as described above. In other words, the other users are allowed to selectively set whether the additional information is visually output or not in the template Tp3.

However, it is difficult for the other users to notice that the additional information has been additionally written, unless the addition of the additional information to the related information DB 122 by a certain user is somewhat reflected in the template Tp3.

In view of the above problem, the information processing system 1 is configured such that, when the additional information is additionally added to the related information DB 122, a display element (message display) is visually output on the template Tp3 so as to show a message indicating that the additional information is additionally written, only for a predetermined period from the time of additional writing. This configuration enables avoiding the following problem: a user does not notice the additional information added to the related information DB 122 and keeps on not referencing the additional information added by another user.

Figure 33:
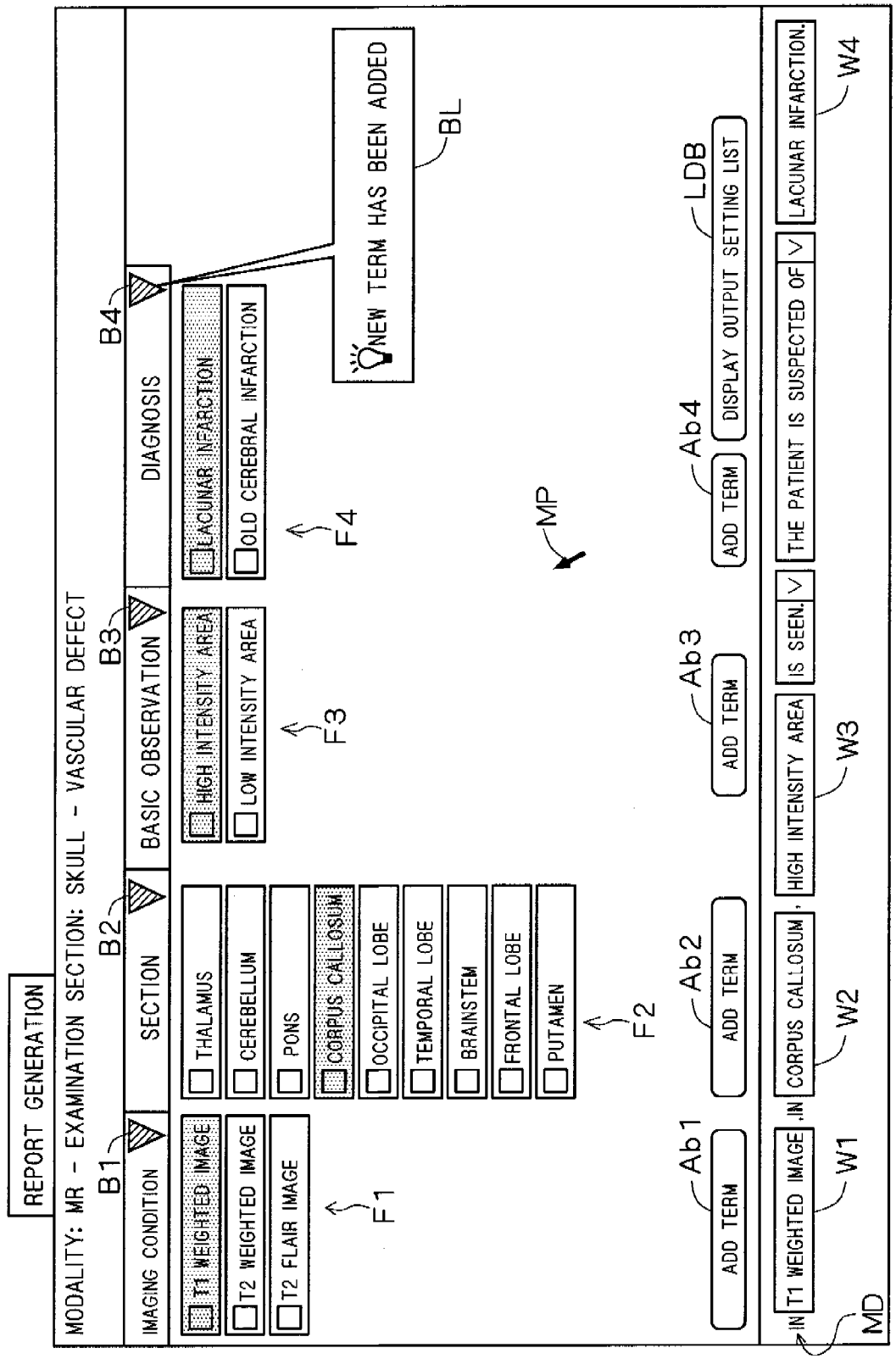
FIG. 33 is a figure showing an example of the input support template.

FIG. 33 is a figure showing the template Tp3 presenting a message indication BL. For example, when a certain element (for example, acute cerebral infarction) is added to the item "diagnosis", a message indication BL indicating that a new term has been added is presented in proximity to the button B4 relating to the item "diagnosis" as shown in FIG. 33. It should be noted that, for example, as shown in FIG. 32, the additional information (here, the element "acute cerebral infarction") and information representing a time at which the additional information was additionally written (for example, day, month, year and time) are associated with each other in the output setting information DB 124, so that a period of presenting the message indication BL can be easily controlled.

When the hidden element is visually output, and the additional information is included in the hidden element, the information processing system 1 visually outputs the additional information together with a display element indicating that the additional information has been added (for example, New). Therefore, a user can easily find the additional information that has been additionally written by another user.

FIG. 34 is a figure showing an example of the list CL1a visually enumerating the hidden elements relating to the item "diagnosis", displayed in proximity to a button B4 in response to the press down of the button B4 with the mouse pointer MP in the template Tp3. For example, when the user A uses the terminal 300 right after the user B has added a certain element (for example, acute cerebral infarction) to the item "diagnosis", not only the element "acute cerebral infarction", i.e., the additional information, but also the display element indicating that the element has been additionally written (here, New) ELn are visually output in the list CL1a as shown in FIG. 34.

Preferably, the display element ELn is visually output for a predetermined period of time since the additional information is additionally written to the related information DB 122. For example, as shown in FIG. 32, when the additional information (here, the element "acute cerebral infarction") and information representing a time at which the additional information was additionally written (for example, day, month, year and time) are associated with each other in the output setting information DB 124, the period of presenting the display element ELn can be easily controlled.

The mode in which the output setting of each term is changed to either "invisible" or "visible" in the template Tp3 has been hereinabove explained with reference to FIG. 22 and FIG. 26, however, the present invention is not limited thereto. Alternatively, the setting of the output information of a certain user can be collectively changed by the user. This will be explained in more detail below.

As shown in FIG. 19 and the like, a button LDB is arranged on the lower right side of the template Tp3. The button LDB is used to request display of a list showing the output information of a user. When a user operates the operation unit 330 as necessary to press down the button LDB with the mouse pointer MP while the template Tp3 is displayed, the setting recognition unit 114b and the information search unit 114c extracts from the output setting information DB 124 the output setting information relating to the user who presses down the button LDB. Then, the display control unit 312 visually displays on the display unit 340 a list of output information (output information list) on the basis of the output setting information thus extracted. As described above, the information relating to the visual output of the additional information is visually output, a user can easily determine whether the information relating to the visual output should be changed or not.

FIG. 35 is a figure showing an example of output information list Tp7. In a case where the data content of the output setting information DB 124 is what is illustrated in FIG. 32, FIG. 35 shows an example of the output information list Tp7 that is overlappingly displayed on the template Tp3 when the user A presses down the button LDB.

In the output information list Tp7, each element (for example, T1 weighted image, T2 weighted image, . . . , acute cerebral infarction) are associated with the output information (here, either visible or invisible). Further, the display element of each output information (here, either visible or invisible) is in a form of a so-called pull-down list, and the display of the output information can be switched according to the movement of the mouse pointer MP.

When there is any additional information, in the output setting information relating to the user who pressed down the button LDB, that has been additionally written to the related information DB 122 recently through the operation performed by the user on the operation unit 330, the additional information is visually output together with the display element ELm indicating that the additional information has been additionally written (for example, New) in the output information list Tp7. Therefore, the user can easily find the additional information for which the user has to determine whether the information relating to the visual output should be changed or not.

Further, for example, as shown in FIG. 32, when the additional information (here, the element "acute cerebral infarction") and the information indicating a time at which the additional information was additionally written (for example, day, month, year and time) are associated with each other in the output setting information DB 124, the period of presenting the display element ELm can be easily controlled.

At the lower portion of the output information list Tp7, the OK button Bo and the cancel button Bc are arranged. When the cancel button Bc is pressed down with the mouse pointer MP, the display of the output information list Tp7 is simply terminated. On the other hand, when one or more display elements of output information is switched as necessary in the output information list Tp7, and the OK button Bo is pressed down with the mouse pointer MP, the output information of one or more elements is changed with respect to the user in operation.

Operation Flow of Input Support Operation

FIG. 36 to FIG. 42 are flowcharts showing the operation flow of input support operation performed in the information processing system 1. This operation flow is achieved by cooperation of the server control unit 110 and the terminal control unit 310, 410, 510, 610. Here, an explanation will be made with an example in which the input support operation is performed while a user operates the terminal 300. It should be noted that when the identification information is input in the login screen Tp1 in response to operation performed by the user on the terminal 300, the user logs in to the information processing system 1, and the program proceeds to step S1 of FIG. 36.

In step S1, the data reading unit 114*a* reads the examination list information from the clinical information DB 210 and the display control unit 312 displays, on the display unit 340 the examination list screen G1 as shown in FIG. 10, on the basis of the examination list information In step S2, the terminal control unit 310 determines whether an input target examination is identified in the examination list screen G1. Here, the determination in step S2 is repeated until the input target examination is identified. Once the input target examination is identified, the program proceeds to step S3. At this occasion, the data reading unit 114*a* reads from the clinical information DB 210 the request matter and the attribute information representing the details of examination corresponding to the report-input targeted examination, and provides to the terminal control unit 310 of the terminal 300. Further, when the report-input targeted examination is identified, the combination of the element belonging to the item "examination section" (for example, SKULL) and the element belonging to the item "modality" (for example, MR) is also specified and recognized at the same time.

In step S3, the display control unit 312 displays on the display unit 340 the interpretation report input screen G2 as shown in FIG. 11.

In step S4, the information search unit 114*c* presents, on the display unit 340, the extraction condition determination template Tp2 as shown in FIG. 16 in the region A5 of the interpretation report input screen G2.

In step S5, when a user performs various operations on the operation unit 330 while the template Tp2 is displayed, the search condition is decided by the terminal control unit 310. Here, the user performs various operations on the operation unit 330 while the template Tp2 is displayed, and the user places the mouse pointer MP on a desired alternative and performs predetermined operation. Accordingly, the desired alternative is specified with respect to the item "category". At this occasion, a combination of a plurality of items and elements specified in the search list screen (for example, FIG. 10) and the template Tp2 (for example FIG. 16) is determined as the search condition.

In step S6, the information search unit 114*c* extracts from the related information DB 122 a portion of information (the partial related information) corresponding to the search condition determined in step S5.

In step S7, the display control unit 312 displays on the display unit 340 the input support template Tp3 according to the output setting information DB 124. Here, the information search unit 114*c* generates the result display screen data, on the basis of the obtained partial related information in accordance with the screen generation rule corresponding to the search rule. The display control unit 312 displays on the display unit 340 the input support template Tp3 on the basis of the result display screen data.

Figure 37:
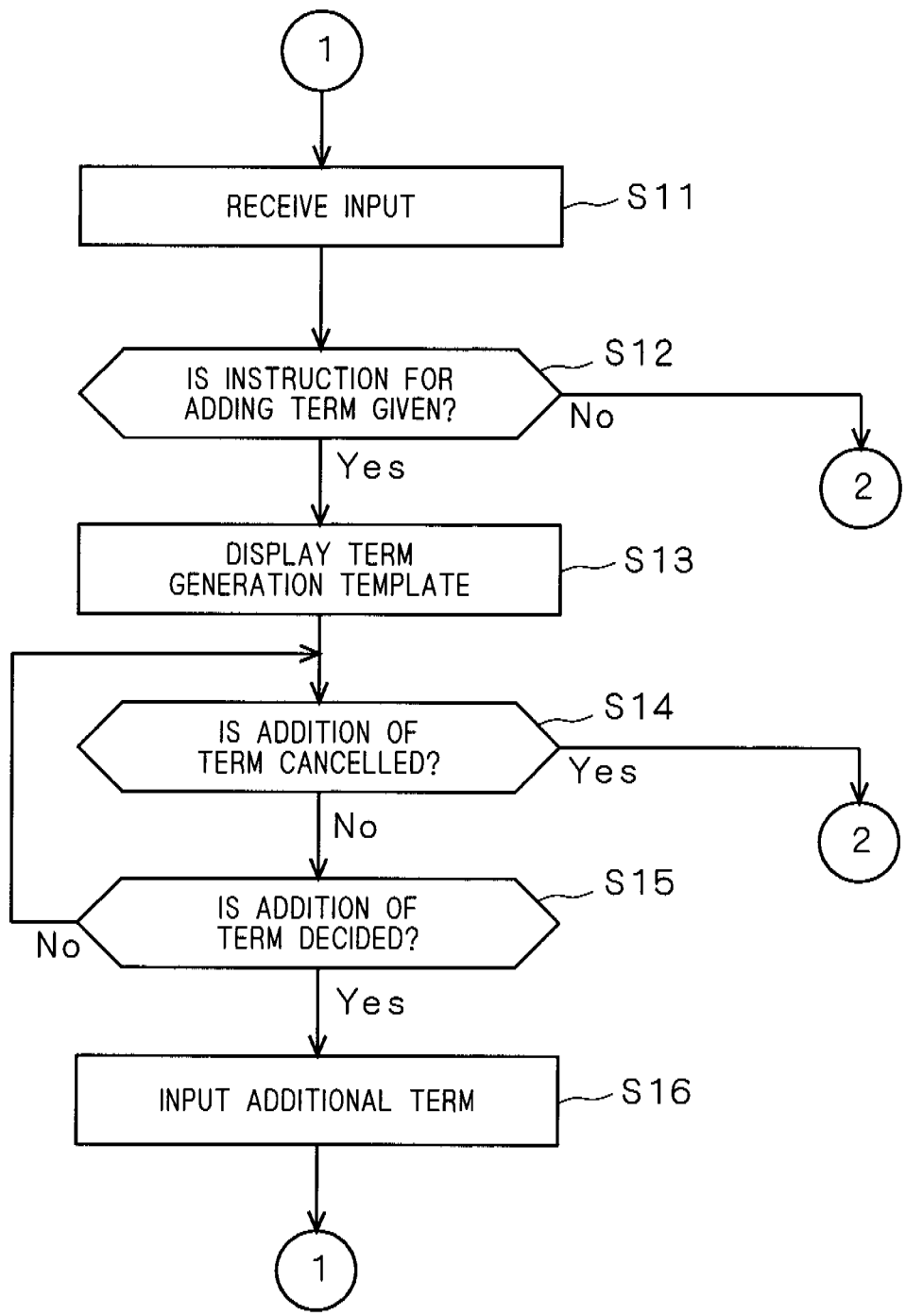
FIG. 37 is a flowchart showing an operational flow of the input support operation.

In step S11 of FIG. 37, the terminal control unit 310 receives specification of terms in the input support template Tp3 and input of various kinds of information relating to the change of the output information. Here, various kinds of information are input in accordance with an operation performed by a user on the operation unit 330.

In step S12, the terminal control unit 310 determines whether an instruction for adding a term is given or not. Here, when any one of term addition buttons Ab1 to Ab4 is pressed down, an instruction for adding a term is assumed to be given, and the program proceeds to step S13. When an instruction for adding a term is not given, the program proceeds to step S21 of FIG. 38.

In step S13, the display control unit 312 displays on the display unit 340 the term generation template Tp4 as shown in FIG. 30.

In step S14, the terminal control unit 310 determines whether addition of a term is to be cancelled or not. For example, when the cancel button Bc is pressed down in the term generation template Tp4, addition of a term is determined to be cancelled, and the program proceeds to step S21 of FIG. 38. On the other hand, when addition of a term is not cancelled, the program proceeds to step S15.

In step S15, the terminal control unit 310 determines whether addition of a term is decided or not. For example, when the OK button Bo is not pressed down in the term generation template Tp4, addition of a term is determined not to have been decided, and the program returns back to step S14. When the OK button Bo is pressed down, addition of a term is determined to have been decided, and the program proceeds to step S16.

In step S16, the terminal control unit 310 inputs the added term. For example, the term added in the term generation template Tp4 (for example, acute cerebral infarction) is input as a report constituent element belonging to an item (for example, diagnosis), to which it belongs, of the plurality of items constituting the observation text. At this occasion, the added term is filled into any one of the blank fields W1 to W4.

Figure 38:
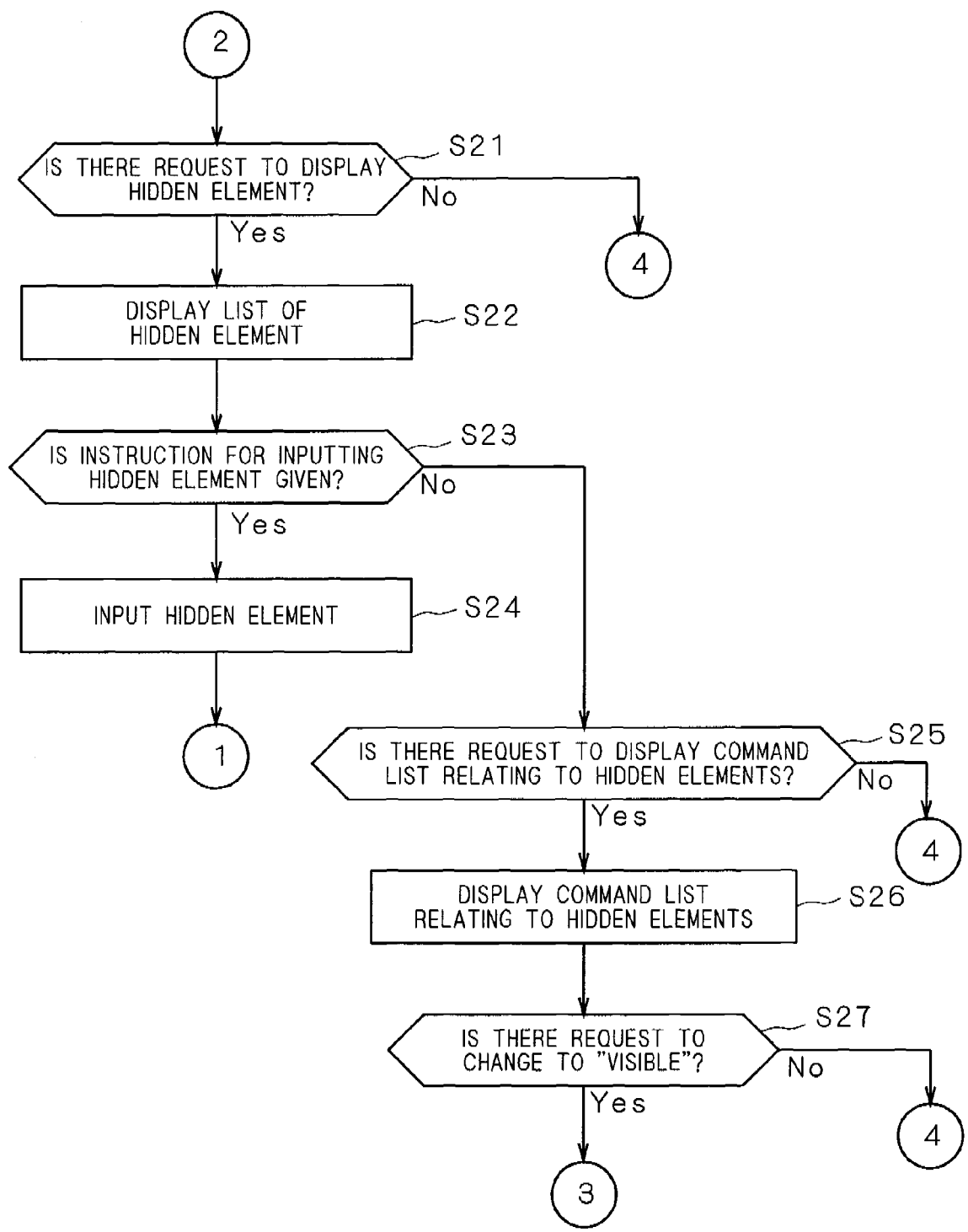
FIG. 38 is a flowchart showing an operational flow of the input support operation.

In step S21 of FIG. 38, the terminal control unit 310 determines whether the hidden element is requested to be displayed or not. Here, when any one of the buttons B1 to B4 arranged in the input support template Tp3 is pressed down, it is determined that the hidden element is requested to be displayed, and the program proceeds to step S22. On the other hand, when the hidden element is not requested to be displayed, the program proceeds to step S41 of FIG. 40.

In step S22, the display control unit 312 displays on the display unit 340 a list visually enumerating the hidden elements relating to the desired item as shown in the list CL1 of FIG. 20.

In step S23, the terminal control unit 310 determines whether or not an instruction is given to input the hidden elements enumerated in the list displayed in step S22 as report constituent elements. Here, when a user places the mouse pointer MP on a desired hidden element included in the list as shown in FIG. 21 and performs a left-click, it is determined that an instruction is given to input the desired hidden element as a report constituent element belonging to an item (for example, diagnosis) to which it belongs, and the program proceeds to step S24. On the other hand, when an instruction is not given to input the hidden element as the report constituent element, the program proceeds to step S25.

In step S24, the terminal control unit 310 inputs the hidden element as the report constituent element in response to an instruction given by a user.

In step S25, the terminal control unit 310 determines whether a command list relating to the hidden element is requested to be displayed. Here, when a user places the mouse pointer MP on a term, i.e., the desired hidden element included in the list as shown in FIG. 21 and performs a right-click, it is determined the command list relating to the hidden element is requested to be displayed, and the program proceeds to step S26. On the other hand, the command list relating to the hidden element is not requested to be displayed, the program proceeds to step S41 of FIG. 40.

In step S26, the display control unit 312 displays on the display unit 340 the command list relating to the desired hidden elements in proximity to the desired hidden element, i.e., the term. For example, the command list CL3 as shown in FIG. 26 is displayed in proximity to the desired term.

In step S27, the terminal control unit 310 determines whether the output information is requested to be changed to "visible" in the command list displayed in step S26. Here, when a user places the mouse pointer MP on the show-command indication included in the command list as shown in FIG. 26 and performs a left-click, it is determined that the output information relating to the desired hidden element, i.e., term, is requested to change to "visible", the program proceeds to step S31 of FIG. 39. On the other hand, when the output information relating to the desired hidden element, i.e., term, is not requested to be changed to "visible", the program proceeds to step S41 of FIG. 40.

Figure 39:
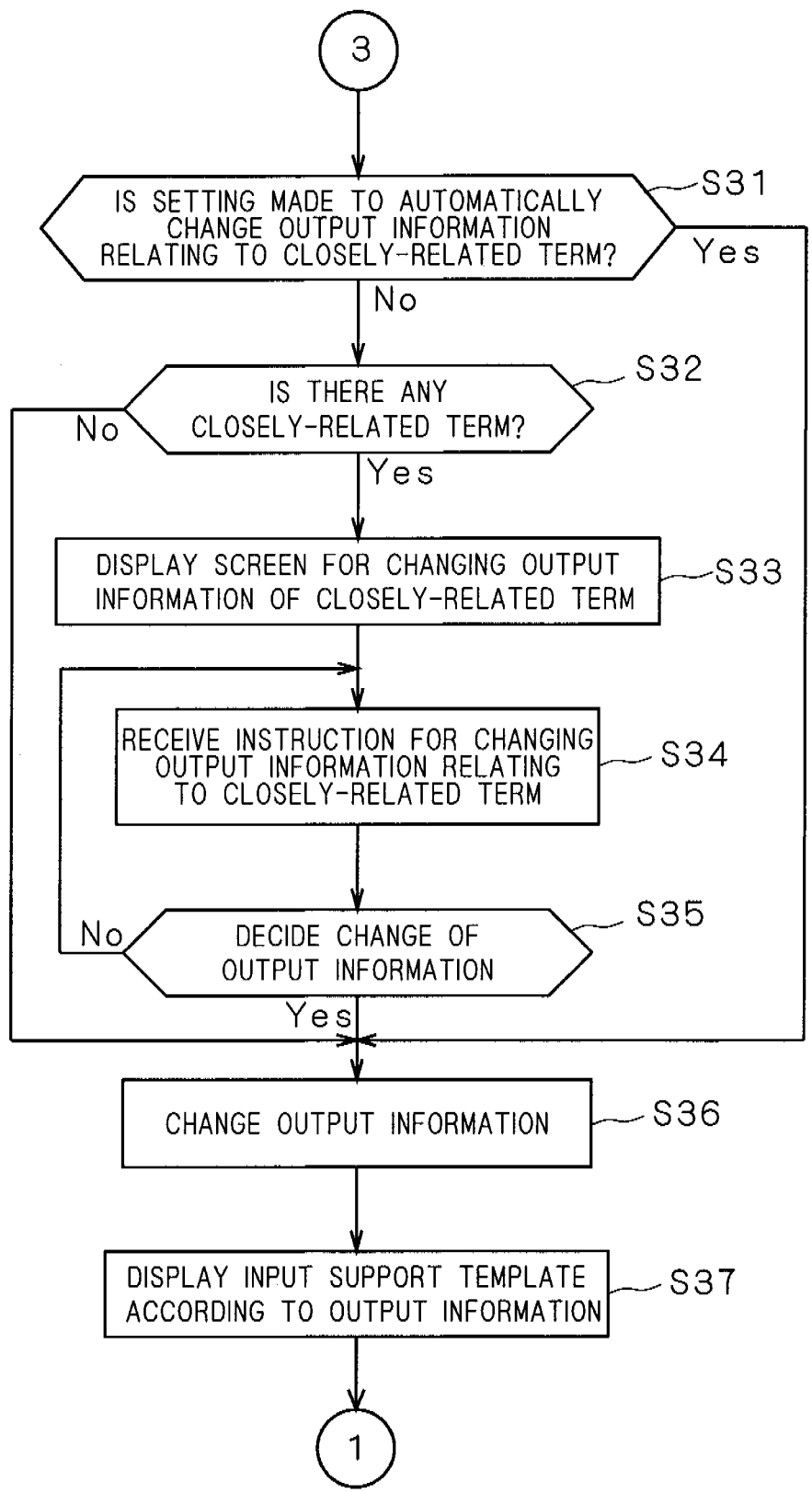
FIG. 39 is a flowchart showing an operational flow of the input support operation.

In step S31 of FIG. 39, the terminal control unit 310 references the setting information stored in the storage unit 320, and determines whether the setting is made to automatically change the output information relating to closely-related terms. Here, when the setting is made to automatically change the output information relating to the closely-related terms, the program proceeds to step S36. When the setting is not made to automatically change the output information relating to the closely-related terms, the program proceeds to step S32. For example, when a user checks the checkbox Cx1 in the related element setting input screen Tp6 and presses down the OK button Bo with the mouse pointer MP as shown in FIG. 27, the setting is made to automatically change the output information relating to the closely-related terms.

In step S32, the setting recognition unit 114b determines whether there is any hidden element, i.e., term, closely related to the hidden element (hereinafter "display target element"), i.e., term, whose output information is to be changed to "visible". Here, when there is any hidden element, i.e., term, that has been combined with the display target element, i.e., term, for a predetermined number of times (for example, three times) or more in the combination information DB 123, it is determined that there is a closely-related term, and the program proceeds to step S33. On the other hand, when there is no closely-related term, the program proceeds to step S36.

In step S33, the setting recognition unit 114b displays a screen (related element setting input screen) for changing the output information relating to the terms closely related to the display target element, i.e., term, with the control of the display control unit 312. For example, the display unit 340 displays the related element setting input screen Tp6 as shown in FIG. 27.

In step S34, the terminal control unit 310 receives an instruction for changing the output information relating to the terms closely related to the display target element, i.e., term. For example, various instructions on the related element setting input screen Tp6 are received.

In step S35, the terminal control unit 310 determines whether the change of the output information is decided or not. Here, when a user presses down the OK button Bo with the mouse pointer MP in the related element setting input screen Tp6 as shown in FIG. 27, it is determined that the change of the output information is decided, and the program proceeds to step S36. On the other hand, when the change of the output information is not decided, the program returns back to step S34.

In step S36, the output setting information generating unit 115 changes, from "invisible" to "visible", the output information of the display target element and the element closely related to the display target element in the output setting information relating to the user who is currently using the terminal 300 included in the output setting information DB 124. For example, when the program proceeds from step S31, the output information is changed from "invisible" to "visible" with respect to the display target element and the element combined with the display target element for a predetermined number of times (for example, three times) or more in the combination information DB 123. Alternatively, when the program proceeds from step S35, the output information is changed from "invisible" to "visible" with respect to the display target element and the element whose output information is determined to be changed in the related element setting input screen Tp6.

In step S37, in accordance with the change of the output setting information in step S36, the information search unit 114c generates the result display screen data again, and the display control unit 312 displays on the display unit 340 the input support template Tp3 according to the output information thus changed.

Figure 40:
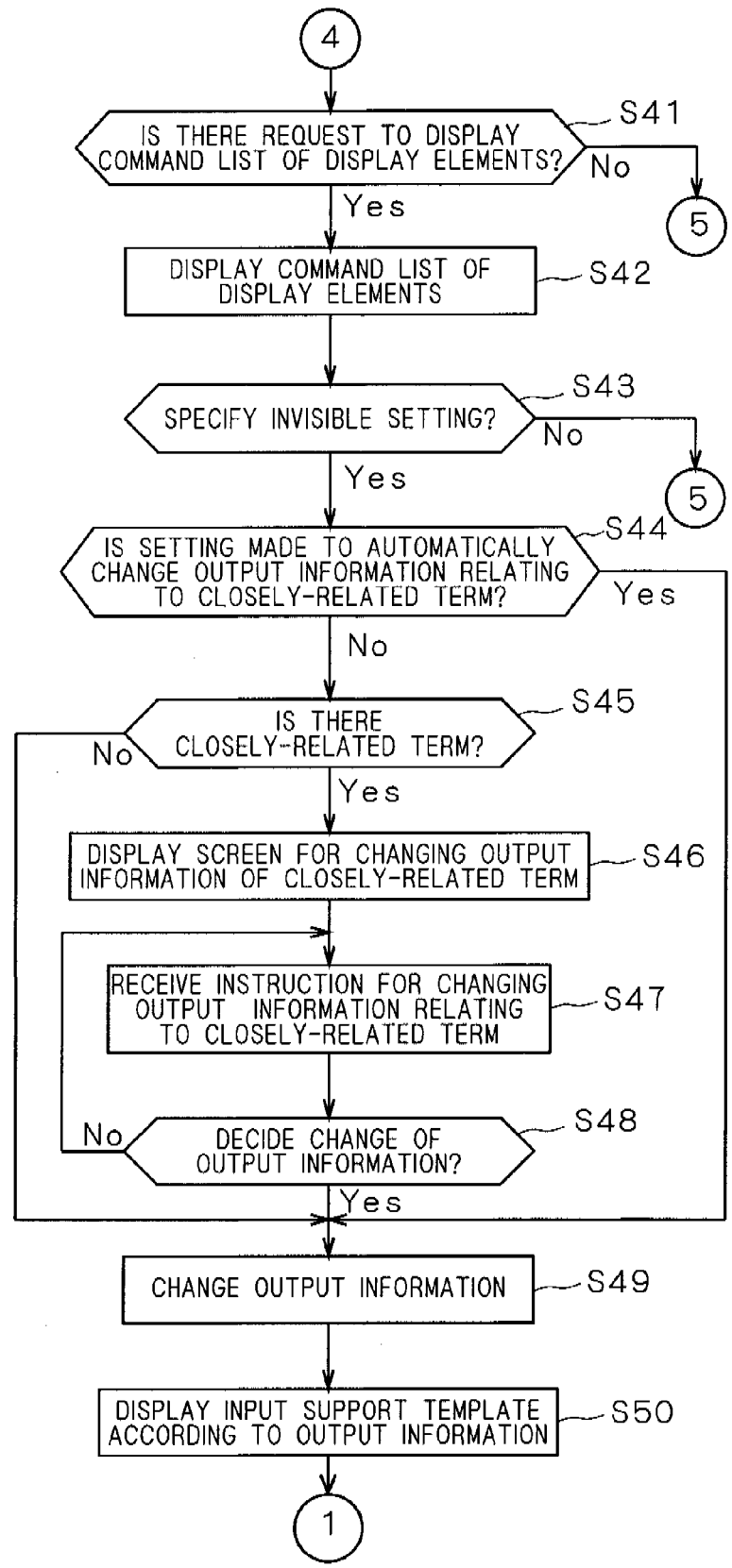
FIG. 40 is a flowchart showing an operational flow of the input support operation.

In step S41 of FIG. 40, the terminal control unit 310 determines whether the command list relating to the display elements is requested to be displayed. Here, when a user places the mouse pointer MP on a desired term included in the plurality of terms F1 to F4 in the input support template Tp3 and performs a right-click, it is determined that the command list relating to the display elements is requested to be displayed, the program proceeds to step S42. On the other hand, when the command list relating to the display elements is not requested to be displayed, the program proceeds to step S51 of FIG. 41.

In step S42, the display control unit 312 displays on the display unit 340 the command list relating to the desired display element as shown in the list CL2 of FIG. 22.

In step S43, the terminal control unit 310 determines whether if there is any request to change the output information to "visible" in the command list displayed in step S42. Here, when a user places the mouse pointer MP on a hide-command indication included in the command list CL2 as shown in FIG. 22 and performs a left-click, it is determined that the output information relating to the desired display element, i.e., term, is requested to be changed to "invisible", and the program proceeds to step S44. On the other hand, when the output information is not requested to change to "invisible", the program proceeds to step S51 of FIG. 41.

In step S44, the terminal control unit 310 references the setting information stored in the storage unit 320, and determines whether the setting is made to automatically change the output information relating to the closely-related terms. At this occasion, when the setting is made to automatically change the output information relating to the closely-related terms, the program proceeds to step S49. When the setting is not made to automatically change the output information relating to the closely-related terms, the program proceeds to step S45. For example, when a user checks the checkbox Cx0 in the related element setting input screen Tp5 as shown in FIG. 23 and presses down the OK button Bo with the mouse pointer MP, the setting is made to automatically change the output information relating to the closely-related terms.

In step S45, the setting recognition unit 114b determines whether there is any display element, i.e., term, closely related to the display element (hereinafter "hiding target element"), i.e., terms, whose output information is to be changed to "invisible". Here, when there is a display element, i.e., term, combined with the hiding target element, i.e., term, for a predetermined number of times (for example, three times) or more in the combination information DB 123, it is determined that there is the closely-related term, and the program proceeds to step S46. On the other hand, when there is no closely-related term, the program proceeds to step S49.

In step S46, with the control of the setting recognition unit 114b and the display control unit 312, a screen is displayed to change the output information relating to the term closely related to the hiding target element, i.e., term, (related element setting input screen). For example, the display unit 340 displays the related element setting input screen Tp5 as shown in FIG. 23.

In step S47, the terminal control unit 310 receives an instruction for changing the output information relating to the term closely related to the hiding target element, i.e., term. For example, various instructions on the related element setting input screen Tp5 are received.

In step S48, the terminal control unit 310 determines whether the change of the output information is decided. Here, when a user presses down the OK button Bo with the mouse pointer MP in the related element setting input screen Tp5 as shown in FIG. 23, it is determined that the change of the output information is decided, and the program proceeds to step S49. On the other hand, when the change of the output information is not decided, the program returns back to step S47.

In step S49, the output setting information generating unit 115 changes the output information from "visible" to "invisible" with respect to the hiding target element and the elements closely related to the hiding target element in the output setting information relating to the user who is currently using the terminal 300 included in the output setting information DB 124. For example, when the program proceeds from step S44, the output information is changed from "visible" to "invisible" with respect to the hiding target element and the elements combined with the hiding target element for a predetermined number of times (for example, three times) or more in the combination information DB 123. Alternatively, when the program proceeds from step S48, the output information is changed from "visible" to "invisible" with respect to the hiding target element and the elements whose output information is determined to change in the related element setting input screen Tp5.

In step S50, in accordance with the change of the output setting information in step S49, the information search unit 114c generates the result display screen data again, and the display control unit 312 displays on the display unit 340 the input support template Tp3 according to the output information thus changed.

In step S51 of FIG. 41, the terminal control unit 310 determines whether there is a request to display a list of the output information relating to the user who is currently operating the operation unit 330. Here, when a user presses down a button LDS with the mouse pointer MP in the input support template Tp3, it is determined that there is a request to display the list of the output information, and the program proceeds to step S52. On the other hand, when there is no request to display the list of the output information, the program proceeds to step S61 of FIG. 42.

In step S52, with the control of the setting recognition unit 114b and the display control unit 312, the display unit 340 displays the list of the output information. For example, the display unit 340 overlappingly displays the output information list Tp7 (FIG. 35) on the template Tp3.

In step S53, the terminal control unit 310 determines whether the display of the list of the output information is to be cancelled. Here, for example, when a user presses down the cancel button Bc with the mouse pointer MP in the output information list Tp7, the display of the list of the output information is cancelled, and the program proceeds to step S61 of FIG. 42. When the display of the list of the output information is not cancelled, the program proceeds to step S54.

In step S54, the terminal control unit 310 receives an instruction for changing the output information. For example, various instructions on the output information list Tp7 are received.

In step S55, the terminal control unit 310 determines whether the change of the output information is decided. Here, when a user presses down the OK button Bo with the mouse pointer MP in the output information list Tp7, it is determined that the change of the output information is decided, and the program proceeds to step S56. On the other hand, when the change of the output information is not decided, the program returns back to step S53.

In step S56, the output setting information generating unit 115 changes the output information relating to the user who is currently using the terminal 300 in the output setting information DB 124. For example, the output information in the output setting information DB 124 is changed in response to the switching of the display element of the output information in the output information list Tp7.

In step S57, in accordance with the change of the output setting information in step S56, the information search unit 114c generates the result display screen data again, and the display control unit 312 displays on the display unit 340 the input support template Tp3 according to the output information thus changed.

Figure 42:
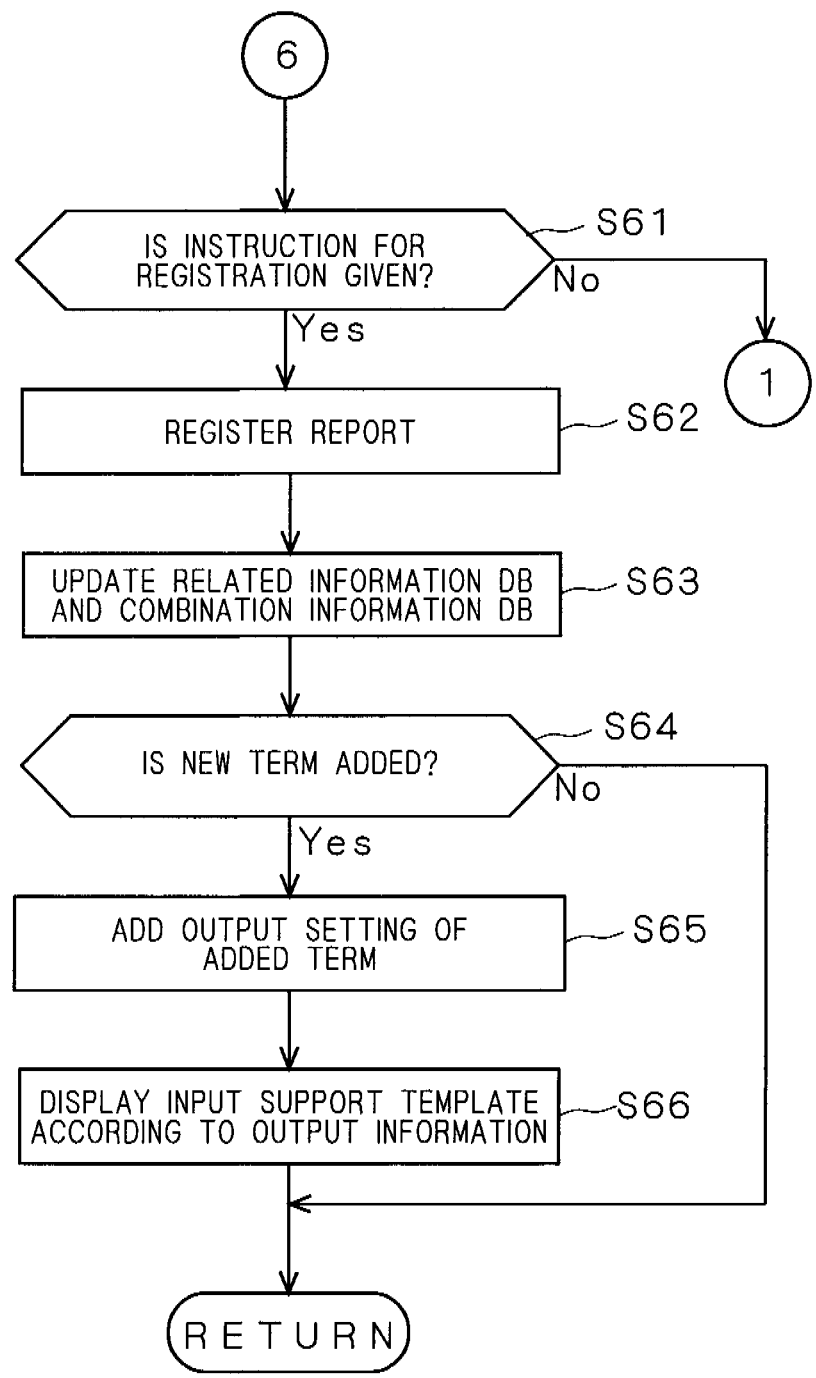
FIG. 42 is a flowchart showing an operational flow of the input support operation.

In step S61 of FIG. 42, the terminal control unit 310 determines whether an instruction is given to register a new interpretation report. Here, when a user presses down the button BT1 with the mouse pointer MP in the input support template Tp3, it is determined that the instruction for registration is given, and the program proceeds to step S62. On the other hand, when the instruction for registration is not given, the program returns back to step S1 of FIG. 36.

In step S62, the report constitution unit 314 and the data writing unit 114d determine the contents of the observation text and the attached image constituting the interpretation report generated on the interpretation report input screen G2, and the new interpretation report is registered to the clinical information DB 210.

In step S63, the related information generating unit 112 and the combination information generating unit 113 update the related information DB 122 and the combination information DB 123. Here, single-report-structured data is generated on the basis of the interpretation report newly registered in step S62. The single-report-structured data is added to the related information DB 122, and the information representing the combination of elements relating to the single-report-structured data is added to the combination information DB 123.

In step S64, the output setting information generating unit 115 determines whether a new term is added, on the basis of the observation text included in the interpretation report newly registered in step S62. Here, when the elements constituting the new single-report-structured data include at least one or more new elements (for example, acute cerebral infarction), namely, the additional information, it is determined that a new term is added, and the program proceeds to step S65. On the other hand, when no new term is added, the program returns back to step S1 of FIG. 36.

In step S65, the output setting information generating unit 115 stores the output information of the added new term to the output setting information DB 124. At this occasion, in the output setting information DB 124, the output information "visible" is associated with the additional information with respect to the user who inputs the additional information, whereas the output information "invisible" is associated with the additional information with respect to the other users.

In step S66, in accordance with the addition of the output information in step S65, namely, the change of the output setting information, the information search unit 114c generates the result display screen data again, and the display control unit 312 displays on the display unit 340 the input support template Tp3 according to the output information thus changed. When the processing of step S66 is completed, the program returns back to step S1 of FIG. 36.

Figure 36:
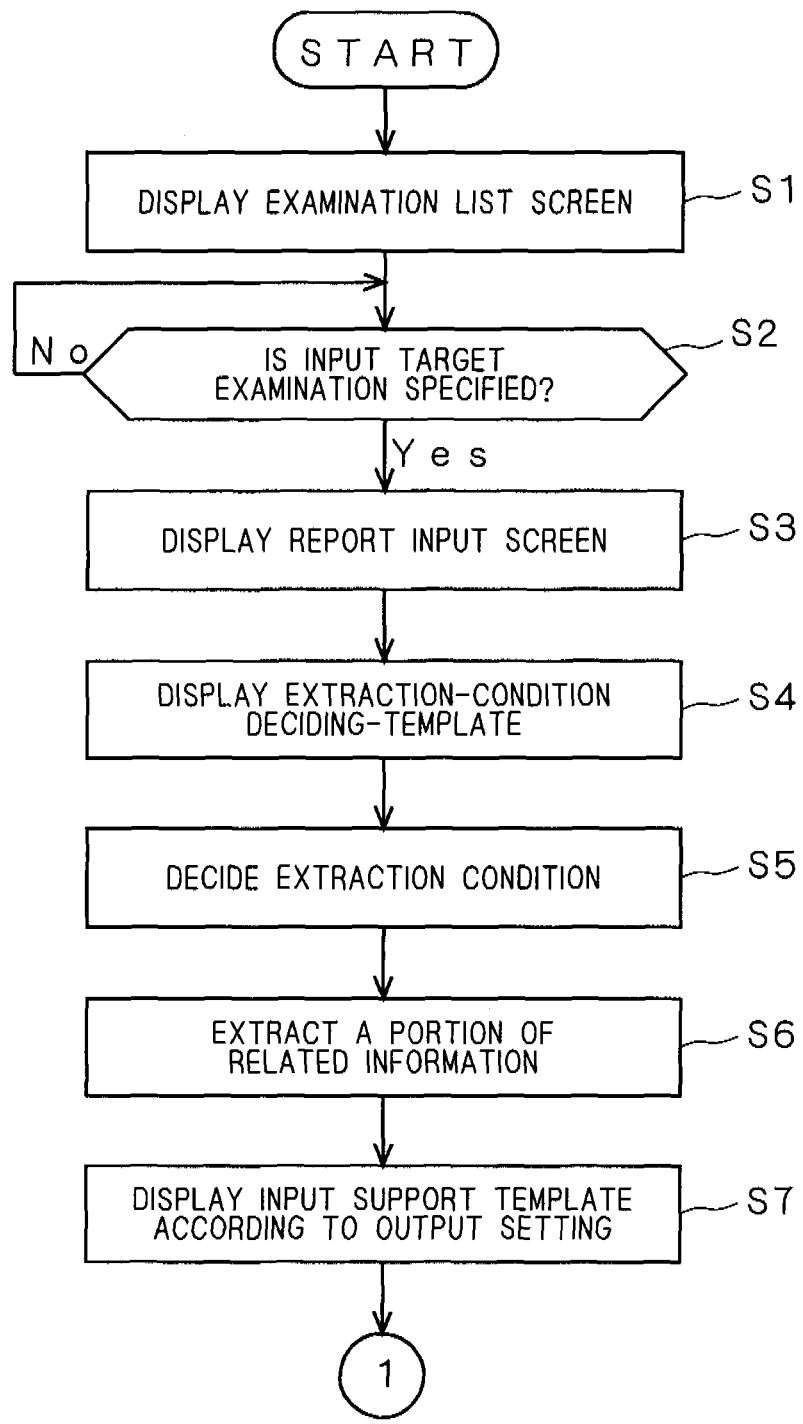
FIG. 36 is a flowchart showing an operational flow of the input support operation.

The process from step S1 of FIG. 36 to step S66 of FIG. 42 in this input support operation is repeated as necessary, so that the new interpretation report is generated. It should be noted that when a user performs various operations on the operation unit 330, the input support operation is forcibly terminated as necessary.

As described above, in the information processing system 1 according to the present embodiment, when a certain user uses the system, the information added by the other users are set not to be displayed at first. However, instead, it is possible to change the output information of the information added by the other users. Therefore, the user is not forced to see the additional information added by the other users, but the user can easily reference and use the additional information added by the other users by changing the output information when the user wants to reference the additional information added by the other users. In other words, the user can reference the information added by the other users, and can customize the range of information that the user references from the database.

Therefore, the user can reference and use the knowledge added by the other users (additional information) when the users wants to do so. At this occasion, without being forced to see the knowledge added by the other users, the user can easily reference and use the knowledge added by the other users whenever the user wants to view them, while maintaining the output setting customized by the user.

The output information includes information for permitting a visual output (for example, visible) and information for prohibiting a visual output (for example, invisible). Therefore, as necessary, permission/prohibition of presentation of the additional information added by the other users can be easily changed.

Further, even when the visual output of the additional information added by the other users is prohibited, the additional information added by the other users can be visually output by performing a particular operation. Therefore, it is possible to easily present the additional information added by the other users without changing the output information. Particularly, this is effective for presenting the additional information which is referenced relatively less frequently, and users are motivated to change the setting so as to permit visual output.

<Variation>

The present invention is not limited to the above-described embodiment, and various changes, improvements, and the like are possible without departing from the scope of the present invention.

For example, in the above embodiment, the output information is set for each user, but is not limited thereto, and the output information may be set, for example, for each terminal. In other words, in the above embodiment, the output information of each term including the additional information is associated with a user name, i.e., identification information for specifying a user, in the output setting information DB 124, but the present invention is not limited thereto. For example, the output information of each term including the additional information may be associated with identification information (for example, identification number) for specifying a terminal (for example, the terminals 300 to 600 and the like)

The method for specifying a source terminal and a destination terminal of information may be a method for analyzing terminal-specifying identification information attached to information transmitted from each terminal to the server 100.

In the above embodiment, the output setting information DB 124 is stored in the server 100, but the present invention is not limited thereto. For example, the output setting information storing the output information relating to each terminal may be stored in each terminal, and each terminal may visually output a portion of related information extracted from the related information DB 122 in accordance with the output information of the output setting information.

Further, in the above embodiment, the output information includes information for permitting a visual output (for example, visible) and information for prohibiting a visual output (for example, invisible), but the present invention is not limited thereto. For example, the output information may include output information for prohibiting visual output with respect to particular operation (for example, never).

Specifically, as shown in FIG. 20, the following configuration is conceivable: when the list CL1 is displayed to visually output the hidden elements in response to particular operation performed by a user in order to press down any one of the buttons B1 to B4, the elements associated with the output information "never" are not visually output on the list CL1. This configuration prevents visual output of additional information that a certain user hardly needs to reference to avoid the problem of hindering a user from referencing information.

Further, the output information may include switchable information (for example, default) that switches, in accordance with information representing frequency of use of the additional information, between the information for permitting a visual output (i.e., visible) and information for prohibiting a visual output (i.e., invisible).

The frequency of use of additional information referred to herein is, for example, the number of combinations of elements in the combination information DB 123 (the number of times). This number of times corresponds to the number of combinations of elements used in the observation text, namely, the frequency of use.

The number of combinations of elements described in the combination information DB 123 represents the frequency of use by all the users of the information processing system 1, but the present invention is not limited thereto. For example, the following configurations are conceivable: the combination information DB 123 stores the frequency of use for each user, and the frequency of use is used; each terminal stores the frequency of use, and the frequency of use is used; and each group of predetermined terminals comprising a plurality of terminals including a particular terminal stores the frequency of use, and the frequency of use is used. Information for specifying each user, each terminal, and each terminal group includes identification information including various IDs and passwords. Alternatively, the following configurations are also conceivable: the frequency of use is stored for each identification information, and the frequency of use is used; and the frequency of use is stored for each identification information group consisting of a plurality of pieces of identification information, and the frequency of use is used.

With the above configurations, the setting can be made to change permission/prohibition of visual output in accordance with the frequency of use of the additional information. Therefore, information can be presented according to the versatility of the additional information.

In the above embodiment, the output information "visible" is associated with the additional information with respect to the user who additionally wrote the additional information, whereas the output information "invisible" is associated with respect to the other users, but the present invention is not limited thereto. For example, the output information "visible" may be associated with the additional information with respect to the user who additionally wrote the additional information, whereas the output information "default" may be associated with respect to the other users. With the above configuration, the output information "default" may be changed to other output information (for example, visible and invisible) through the similar method as the various methods for changing the output information explained in the above embodiment.

Further, in the above embodiment, the output information is set to each element, but the present invention is not limited thereto. The output information may be set with respect to a combination of elements. More specifically, the following configuration is conceivable: when a user adds each single-report-structured data (in general, combination information) representing a combination of elements to the related information DB 122, the output information (for example, visible and invisible) is set with respect to the combination information, i.e., additional information.

FIG. 43 is a figure showing an example of data content of the output setting information DB 124 when the output setting information DB 124 includes information in which output information is associated with a combination of elements.

FIG. 43 shows the output setting information DB 124 storing a data table TB4 in which, for each combination of elements, output information (for example, visible or invisible) is respectively associated with user-specifying identification information, i.e., a user name (for example, user A, B). More specifically, the output information (for example, visible or invisible) is associated with the user name, for each combination of four elements (for example, T1 weighted image, occipital lobe, high intensity area, lacunar infarction) respectively belonging to four items (imaging condition, section, basic observation text, diagnosis).

With this configuration, a setting of permission/prohibition of visual output is set for each combination of elements. Therefore, the visual output condition can be customized, such as permission/prohibition of visual output of additional information better reflecting the knowledge of each user.

Further, in the above embodiment, the information processing system 1 includes the plurality of servers 100 and 200 and the plurality of terminals 300 to 600, but the present invention is not limited thereto.

For example, the information processing system may be constituted by only one terminal, in which users may be recognized on the basis of IDs and passwords input from the one terminal, and display may be made in accordance with the output setting information relating to each user.

Further, for example, the functional element of the information processing system 1 may be achieved by executing one program in a control unit constituted of a CPU and the like of one apparatus. Alternatively, it may be achieved by executing the programs respectively in each control unit constituted of CPUs and the like of a plurality of apparatuses, so that the plurality of apparatuses cooperate with each other to achieve the functional element of the information processing system 1 according to the above embodiment.

Further, in the above embodiment, the output setting information is changed for each user, but the present invention is not limited thereto. For example, the output setting information may be collectively changed with respect to a user group including a plurality of users and a terminal group including a plurality of terminals. In order to achieve this embodiment, for example, the output setting information may be set with respect to the identification information group assembling a plurality of pieces of identification information specifying users and the identification information group assembling a plurality of pieces of identification information specifying terminals.

Further, in the above embodiment, the data generation unit 112c only distinguishes the items of elements that are given by the teacher data in advance. However, a machine learning using a so-called SVM (Support Vector Machine) may be used to also distinguish items of elements that are not given by the teacher data in advance.

For example, the machine learning function of the data generation unit 112c may divide learning corpus into morphemes through morphological analysis, and may learn, for each morpheme, patterns (appearing patterns) according to which morphemes belonging to a certain item appear by using information of morpheme itself, a part of speech of morpheme, conjugation of morpheme, and prior and subsequent morphemes (for example, two prior and subsequent morphemes) and recognize, according to the appearing pattern, classification items of elements that are not given in advance.

Further, in the above embodiment, the template Tp3 does not visually show the relationships of elements between items, but the present invention is not limited thereto. The relationships between elements associated by the partial related information may be given as visually disguisable elements (related display elements, for example, solid lines) between items arranged adjacent to each other.

Further, in the above embodiment, MR, CR, and CT are mentioned as modality, but the present invention is not limited thereto, and other image diagnosis apparatuses relating to an endoscope and an ultrasonic examination and the like may be included in the modality.

Further, in the above embodiment, the system for generating an interpretation report upon taking an image obtained using radiation has been described, but the present invention is not limited thereto. For example, the present invention can also be applied to a system for generating other medical reports such as a nursing report and an incident report. Further, for example, the present invention may also be applied to generation of reports in fields other than the medical field such as sales report. Still further, the present invention can also be applied to fields other than the reports.

Further, in the above embodiment, the system for supporting operation of generating an interpretation report upon taking an image obtained using radiation has been described, but the present invention is not limited thereto. For example, the present invention can also be applied to other uses such as support in image diagnosis.

Specifically, when terms (specified terms) are respectively specified for four items in the input support template Tp3 shown in FIG. 17, the information search unit 114c may reference the number of times of combinations as shown in FIG. 6 in the combination information DB 123 every time a term belonging to each item is specified. In the input support template Tp3, a combination of alternatives in which the number of times the alternatives (terms) including all the specified terms are combined is equal to or more than a predetermined number (for example, 10) may be displayed in such a manner that one or more alternatives other than the specified terms are displayed in a distinguishable manner, such as in a color different from that of the other alternatives.

For example, when "T2 weighted image" is specified with respect to the item "imaging condition", "cerebellum" is specified with respect to the item "section", and "low intensity area" is specified with respect to the item "basic observation text", the information search unit 114c recognizes the combination of alternatives, "T2 weighted image-cerebellum-low intensity area-cerebral infarction", combined for a predetermined number of times or more. In the input support template Tp3, the alternative "cerebral infarction" belonging to the item "diagnosis" may be displayed in a manner distinguishable from the other alternatives. With this configuration, when alternatives are specified with respect to the imaging condition, the section, and the basic observation text, a diagnosis result is suggested. Therefore, generation of a report by a radiologist and diagnosis by an attending doctor are supported.

Further, the present invention can be generally applied to cases where the following information is provided: information about behavior guideline of future treatment used in various meetings and informed consent in medical scenes; and information about behavior guideline of countermeasures against complaints in sales scenes. In such cases, information about behavior guideline can be easily provided according to circumstances.

For example, in addition to the four items, "imaging condition", "section", "basic observation text", and "diagnosis" of the above embodiment, other items may be added such as "treatment", "medication", "surgical operation", and "development". When terms (specified terms) are specified with respect to each item, the information search unit 114c may reference the number of times of combinations in the combination information DB 123 every time a term belonging to each item is specified. In the input support template Tp3, a combination of alternatives in which the number of times the alternatives (terms) including all the specified terms are combined is equal to or more than a predetermined number (for example, 10) may be displayed in such a manner that one or more alternatives other than the specified terms are displayed in a distinguishable manner, such as in a color different from that of the other alternatives. With this configuration, for example, when the contents of "treatment", "medication", and "surgical operation" that may be performed in response to the diagnosis result in medical scenes are specified, the information about "development" can be obtained. The information thus provided supports making a decision in scenes of various meetings and informed consent.

Further, in the above embodiment, the system for supporting operation of generating an interpretation report upon taking an image obtained using radiation has been described. Accordingly, the plurality of items was "imaging condition" "section" "basic observation text", "diagnosis" and the like, but the present invention is not limited thereto. For example, in order to support generating a report relating to other examination results such as biochemical examination, the plurality of items may include other examination items such as "hemoglobin" and "γ-GTP".

Further, in the above embodiment, the information processing system 1 for managing and processing medical examination information in a hospital has been described as an example. Accordingly, the input support server 100, the PACS server 200, the terminals 300 to 600 are connected to the network circuit LN such as LAN in such a manner as to be able to transmit and receive data to/from each other, but the present invention is not limited thereto. For example, the terminal 300 to 600 may be installed in each of private hospitals, and may be connected to the input support server 100 via the Internet in such a manner as to be able to transmit and receive data to/from each other. It should be noted that, in this configuration, the PACS server 200 is not used. For example, each of the terminals 300 to 600 may have the same function as the PACS server 200. Alternatively, a server having the same function as the PACS server 200 may be installed in each hospital.

Further, in the above embodiment, the contents of the related information DB 122 and the combination information DB 123 are updated in response to input of a report, but the present invention is not limited thereto. For example, a terminal may input information about combinations of a plurality of terms respectively belonging to a plurality of items to the input support server 100 via a network circuit such as a LAN and the Internet, so that the contents of the related information DB 122 and the combination information DB 123 are updated. In this configuration, experts can have much expert knowledge reflected in the related information DB 122 and the combination information DB 123, and the effectively-usable knowledge of the past can be easily enriched.

Figure 44:
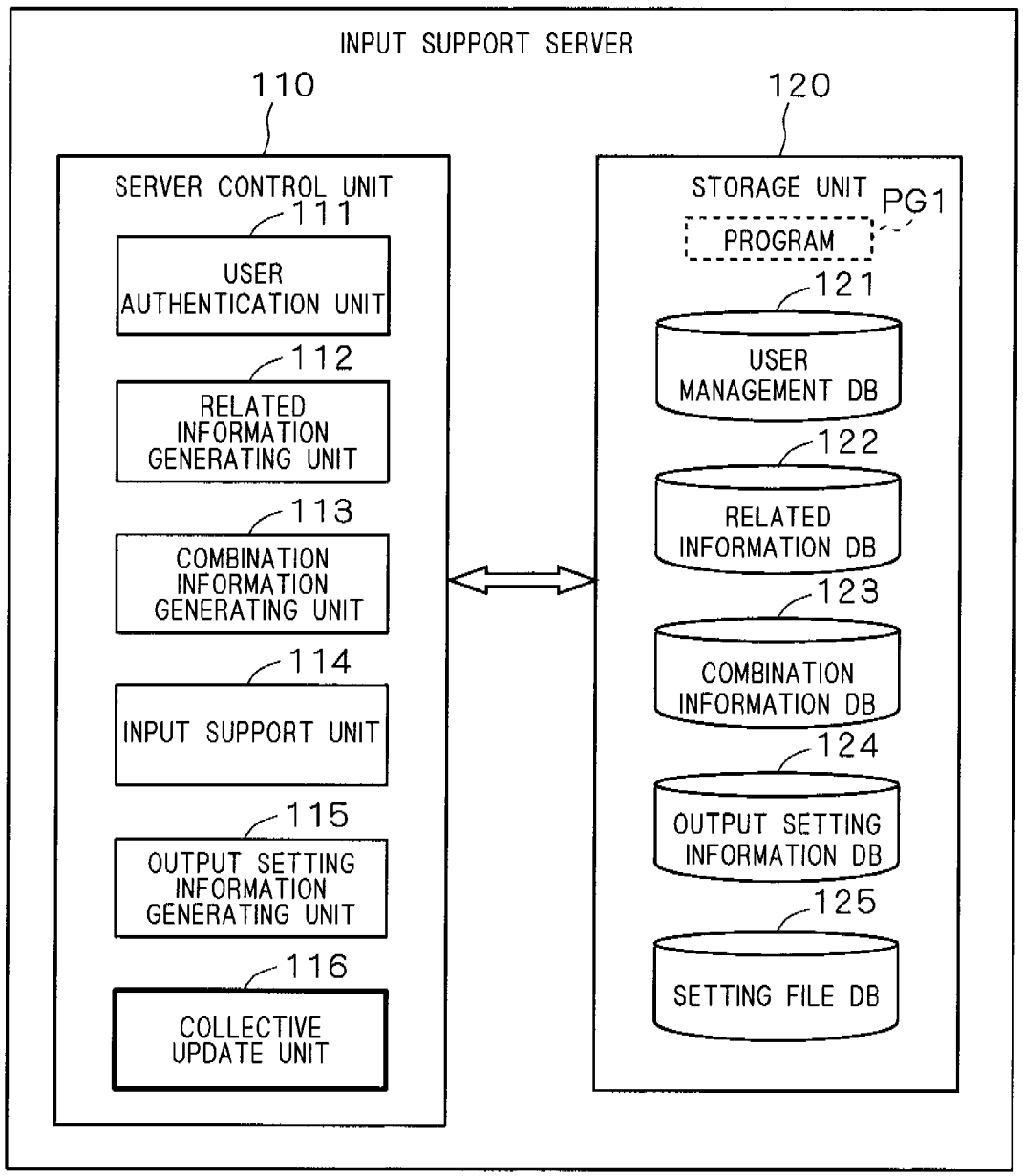
FIG. 44 is a block diagram showing the main functional elements of an input support server according to a variation.

Further, for example, the contents of the related information DB 122 and the combination information DB 123 may be collectively upgraded in the input support server 100. FIG. 44 is a block diagram showing the main functional elements of the input support server 100 according to this variation. FIG. 44 shows the block diagram arranged with a collective update unit 116 in addition to the functions of the server control unit 110 shown in the block diagram of FIG. 2. With this configuration, for example, information content accumulating a plurality of other elements different from information content of the original related information DB 122 and the combination information DB 123 is input from a particular management terminal to the input support server 100. The collective update unit 116 collectively updates the information content of the related information DB 122 and the combination information DB 123 to the information content accumulating the plurality of other elements. However, the output setting information 124 is stored in the storage unit 120 separately from the related information DB 122 and the combination information DB 123. Therefore, even when the information content of the related information DB 122 and the combination information DB 123 is collectively updated, the content of the output setting information 124 is preferably maintained. According to this configuration, it is possible to effectively use the setting content customized by a user before the collective update of the information content of the related information DB 122 and the combination information DB 123. Further, it is not necessary for a user to reconfigure the customized setting content with respect to the range of information referenced from the database, and the user is not forced to perform cumbersome operation arising from the customization.

The invention claimed is:

1. A database system comprising:
a first storage for storing accumulated element information in which a plurality of elements are accumulated;
an additional writing portion configured to write additional information to the accumulated element information, in response to input by a first user and/or client of information relating to at least one or more of the accumulated elements;
a second storage for storing output setting information in which, in response to the writing of the additional information by the additional writing portion, a second user and/or client, that is different from the first user and/or client, is associated with a display setting of the additional information, and information of the display setting of the additional information is associated with each user and/or client so that in the output setting information each element and/or combination of elements of the plurality of elements is set to visible or to invisible on a user and/or client basis;
a changing portion configured to change the display setting associated with the second user and/or in the output setting information, in response to a customization operation performed by the second user and/or client to customize the display setting by referencing the additional information input by the first user and/or client and setting to visible or to invisible at least one element and/or combination of elements of the plurality of elements in the additional information input by the first user and/or client;
an extracting portion configured to extract, from the accumulated element information, at least a portion of the accumulated element information in accordance with an input of an extraction condition by the second user and/or client; and
a display control unit configured to cause a display to display, when the second user and/or client is input after the customization operation is performed, the portion of information extracted from the accumulated element information by the extracting portion, in accordance with the display setting changed by the changing portion in response to the customization operation, so that the display control unit controls display or non-display of each element and/or combination of elements of the portion of the accumulated element information extracted from the accumulated element information on a user and/or client basis in accordance with the customization operation of the second user and/or client, wherein the accumulated element information accumulates elements into a plurality of groups of related elements, and each group is structured so that the related elements therein respectively belong to one classification of a plurality of classifications; and the display includes a graphical user interface which displays on a screen at least a part of the accumulated element information so that the related elements in each group displayed are displayed according to a respective classification and are selectable by a user, and the graphical user interface including a portion on the screen for receiving a selected element from each of the displayed groups in sequence so that the sequentially selected elements form a readable text model in which each selected element forms part of a legible sentence of words.

2. A database system comprising a server, a first terminal, and a second terminal,
wherein the server includes:
a first storage for storing accumulated element information in which a plurality of elements are accumulated;
an additional writing portion configured to write additional information to the accumulated element information, in response to input by a first terminal of information relating to at least one or more of the accumulated elements by the first terminal;
a second storage for storing output setting information in which, in response to the writing of the additional information by the additional writing portion, an identification information specifying a second terminal is associated with a display setting of the additional information, and information of the display setting of the additional information is associated with each terminal so that in the output setting information each element and/or combination of elements of the plurality of elements is set to visible or to invisible on a terminal by terminal basis;
a changing portion configured to change the display setting associated with identification information specifying the second terminal in the output setting information, in response to a customization request from the second terminal to customize the display setting by referencing the additional information input by the first terminal and setting to visible or to invisible at least one element and/or combination of elements of the plurality of elements in the additional information input by the first terminal; and
an extracting portion configured to extract, from the accumulated element information, at least a portion of the accumulated element information in accordance with an input of an extraction condition by the second terminal,
wherein the second terminal includes:
a display control unit configured to cause a display to display the portion of information extracted from the accumulated element information by the extracting portion in accordance with the display setting changed by the changing portion so that the display control unit controls display or non-display of each element and/or combination of elements of the portion of the accumulated element information extracted from the accumulated element information on a terminal by terminal basis in accordance with the customization operation of the second terminal, wherein the display is a screen showing the portion of information according to the display setting associated with the identification information specifying the second terminal in the output setting information, and wherein the accumulated element information accumulates elements into a plurality of groups of related elements, and each group is structured so that the related elements therein respectively belong to one classification of a plurality of classifications; and the display includes a graphical user interface which displays on a screen at least a part of the accumulated element information so that the related elements in each group displayed are displayed according to a respective classification and are selectable by a user, and the graphical user interface including a portion on the screen for receiving a selected element from each of the displayed groups in sequence so that the sequentially selected elements form a readable text model in which each selected element forms part of a legible sentence of words.

3. A database system comprising a server, a first terminal, and a second terminal, wherein the server includes:
- a first storage for storing accumulated element information in which a plurality of elements are accumulated;
- an additional writing portion configured to write additional information to the accumulated element information, in response to input by a first terminal of information relating to at least one or more of the accumulated elements by the first terminal; and
- an extracting portion configured to extract, from the accumulated element information, at least a portion of the accumulated element information in accordance with an input of an extraction condition by a second terminal, wherein the second terminal includes:
- a second storage for storing output setting information in which a user and/or client identification information is associated with a display setting of the additional information, in response to the writing of the additional information by the additional writing portion, and information of the display setting of the additional information is associated with each terminal so that in the output setting information each element and/or combination of elements of the plurality of elements is set to visible or to invisible on a terminal by terminal basis;
- a changing portion configured to change the display setting included in the output setting information, in response to a customization operation by the second terminal to customize the display setting by referencing the additional information input by the first terminal and setting to visible or to invisible at least one element and/or combination of elements of the plurality of elements in the additional information input by the first terminal; and
- a display control unit configured to cause a display to display the portion of information extracted from the accumulated element information by the extracting portion in accordance with the display setting changed by the changing portion so that the display control unit controls display or non-display of each element and/or combination of elements of the portion of the accumulated element information extracted from the accumulated element information on a terminal by terminal basis in accordance with the customization operation of the second terminal, wherein the display is a screen showing the portion of information according to the display setting included in the output setting information, and wherein the accumulated element information accumulates elements into a plurality of groups of related elements, and each group is structured so that the related elements therein respectively belong to one classification of a plurality of classifications; and the display includes a graphical user interface which displays on a screen at least a part of the accumulated element information so that the related elements in each group displayed are displayed according to a respective classification and are selectable by a user, and the graphical user interface including a portion on the screen for receiving a selected element from each of the displayed groups in sequence so that the sequentially selected elements form a readable text model in which each selected element forms part of a legible sentence of words.

4. The database system according to claim 1, wherein the display setting includes information for permitting visual output of the portion of information extracted by the extracting portion and information for prohibiting visual output of other accumulated element information.

5. The database system according to claim 2, wherein the display setting includes information for permitting visual output of the portion of information extracted by the extracting portion and information for prohibiting visual output of other accumulated element information.

6. The database system according to claim 3, wherein the display setting includes an information for permitting visual output of the portion of information extracted by the extracting portion and an information for prohibiting visual output of other accumulated element information.

7. The database system according to claim 4, wherein the display visually outputs the additional information associated with the information for prohibiting visual output in the output setting information, in response to particular operation performed by the user.

8. The database system according to claim 5, wherein the display visually outputs the additional information associated with the information for prohibiting visual output in the output setting information, in response to particular operation performed by the user.

9. The database system according to claim 6, wherein the display visually outputs the additional information associated with the information for prohibiting visual output in the output setting information, in response to particular operation performed by the user.

10. The database system according to claim 7, wherein the changing portion changes, with the additional information associated with the information for prohibiting visual output in the output setting information being visually output by the display, the information for prohibiting visual output associated with respect to the additional information to the information for permitting visual output, in response to predetermined operation performed by the user.

11. The database system according to claim 8, wherein the changing portion changes, with the additional information associated with the information for prohibiting visual output in the output setting information being visually output by the display, the information for prohibiting visual output associated with respect to the additional information to the information for permitting visual output, in response to predetermined operation performed by the user.

12. The database system according to claim 9, wherein the changing portion changes, with the additional information associated with the information for prohibiting visual output in the output setting information being visually output by the display, the information for prohibiting visual output associated with respect to the additional information to the information for permitting visual output, in response to predetermined operation performed by the user.

13. The database system according to claim 7, wherein the display visually outputs the additional information together with a display element indicating that the additional information has been added.

14. The database system according to claim 8, wherein the display visually outputs the additional information together with a display element indicating that the additional information has been added.

15. The database system according to claim 9, wherein the display visually outputs the additional information together with a display element indicating that the additional information has been added.

16. The database system according to claim 7, wherein display setting includes information for prohibiting visual output with respect to the particular operation.

17. The database system according to claim 8, wherein the display setting includes information for prohibiting visual output with respect to the particular operation.

18. The database system according to claim 9, wherein the display setting includes information for prohibiting visual output with respect to the particular operation.

19. The database system according to claim 4, wherein the output setting information includes information in which permitting visual output of the additional information is associated with the first user and/or client; and information in which prohibiting visual output of the additional information is associated with the second user and/or client, in response to the writing of the additional information by the additional writing portion.

20. The database system according to claim 5, wherein the output setting information includes information in which permitting visual output of the additional information is associated with the identification information for specifying the first terminal; and information in which prohibiting visual output of the additional information is associated with the identification information for specifying the second terminal, in response to the writing of the additional information by the additional writing portion.

21. The database system according to claim 6, wherein the second storage stores the information for prohibiting visual output of the additional information, in response to the writing of the additional information by the additional writing portion, wherein the first terminal stores in a predetermined storage unit the information for permitting visual output of the additional information, in response to the writing of the additional information by the additional writing portion.

22. The database system according to claim 1, wherein the additional information includes one or more elements.

23. The database system according to claim 2, wherein the additional information includes one or more elements.

24. The database system according to claim 3, wherein the additional information includes one or more elements.

25. The database system according to claim 1, wherein the additional information includes combination information representing a combination of elements.

26. The database system according to claim 2, wherein the additional information includes combination information representing a combination of elements.

27. The database system according to claim 3, wherein the additional information includes combination information representing a combination of elements.

28. The database system according to claim 1, wherein the additional information includes one or more additional elements,
wherein the display visually outputs, when the changing portion changes the display setting of the additional element, a display element for requesting change of the display setting of one or more elements, different from the additional element, combined with the additional element in the combination information.

29. The database system according to claim 2, wherein the additional information includes one or more additional elements,
wherein the display visually outputs, when the changing portion changes the display setting of the additional element, a display element for requesting change of the display setting of one or more elements, different from the additional element, combined with the additional element in the combination information.

30. The database system according to claim 3, wherein the additional information includes one or more additional elements,
wherein the display visually outputs, when the changing portion changes the display setting of the additional element, a display element for requesting change of the display setting of one or more elements, different from the additional element, combined with the additional element in the combination information.

31. The database system according to claim 28, wherein the display visually outputs, when the changing portion changes the information relating to the visual output of the additional element, and where change of the display setting is not specified with respect to one or more elements, different from the additional element, combined with the additional element in the combination information, a display element representing a predetermined warning.

32. The database system according to claim 29, wherein the display visually outputs, when the changing portion changes the information relating to the visual output of the additional element, and where change of the display setting is not specified with respect to one or more elements, different from the additional element, combined with the additional element in the combination information, a display element representing a predetermined warning.

33. The database system according to claim 30, wherein the display visually outputs, when the changing portion changes the information relating to the visual output of the additional element, and where change of the display setting is not specified with respect to one or more elements, different from the additional element, combined with the additional element in the combination information, a display element representing a predetermined warning.

34. The database system according to claim 1, wherein the additional information includes one or more additional elements,
wherein the changing portion changes, when changing the information relating to the visual output of the additional element, the display setting of the one or more elements, different from the additional element, combined with the additional element in the combination information.

35. The database system according to claim 2, wherein the additional information includes one or more additional elements,
wherein the changing portion changes, when changing the information relating to the visual output of the additional element, the display setting of the one or more elements, different from the additional element, combined with the additional element in the combination information.

36. The database system according to claim 3, wherein the additional information includes one or more additional elements,
> wherein the changing portion changes, when changing the information relating to the visual output of the additional element, the display setting of the one or more elements, different from the additional element, combined with the additional element in the combination information.

37. The database system according to claim 1, wherein the display visually outputs a display element indicating that the additional information has been added, in response to the writing of the additional information by the additional writing portion.

38. The database system according to claim 2, wherein the display visually outputs a display element indicating that the additional information has been added, in response to the writing of the additional information by the additional writing portion.

39. The database system according to claim 3, wherein the display visually outputs a display element indicating that the additional information has been added, in response to the writing of the additional information by the additional writing portion.

40. The database system according to claim 1, wherein the display visually outputs the output setting information, in response to predetermined operation performed by the user.

41. The database system according to claim 2, wherein the display visually outputs the output setting information, in response to predetermined operation performed by the user.

42. The database system according to claim 3, wherein the display visually outputs the output setting information, in response to predetermined operation performed by the user.

43. The database system according to claim 40, wherein the display visually outputs the additional information in the output setting information, together with a display element indicating that the additional information has been added, in response to the writing of the additional information by the additional writing portion.

44. The database system according to claim 41, wherein the display visually outputs the additional information in the output setting information, together with a display element indicating that the additional information has been added, in response to the writing of the additional information by the additional writing portion.

45. The database system according to claim 42, wherein the display visually outputs the additional information in the output setting information, together with a display element indicating that the additional information has been added, in response to the writing of the additional information by the additional writing portion.

46. The database system according to claim 1, wherein the information relating to the visual output includes information that switches between an information for permitting visual output and information for prohibiting visual output, in accordance with information representing a frequency of use of the additional information.

47. The database system according to claim 2, wherein the information relating to the visual output includes information that switches between an information for permitting visual output and information for prohibiting visual output, in accordance with information representing a frequency of use of the additional information.

48. The database system according to claim 3, wherein the information relating to the visual output includes information that switches between an information for permitting visual output and information for prohibiting visual output, in accordance with information representing a frequency of use of the additional information.

49. The database system according to claim 1, wherein the display setting includes information that switches between the information for permitting visual output and the information for prohibiting visual output, in accordance with information representing a frequency of use of the additional information with respect to the second user and/or client or a predetermined group including the second user and/or client.

50. The database system according to claim 2, wherein the display setting includes information that switches between the information for permitting visual output and the information for prohibiting visual output, in accordance with information representing a frequency of use of the additional information with respect to the second terminal or a predetermined terminal group including the second terminal.

51. The database system according to claim 3, wherein the display setting includes information that switches between the information for permitting visual output and the information for prohibiting visual output, in accordance with information representing a frequency of use of the additional information with respect to the second terminal or a predetermined terminal group including the second terminal.

52. The database system according to claim 1 further comprising a collective update portion configured to collectively update the accumulated element information stored in the first storage to an accumulated element information in which a plurality of other elements are accumulated,
> wherein the second storage maintains the output setting information when the collective update portion collectively updates the accumulated element information.

53. The database system according to claim 2 further comprising a collective update portion configured to collectively update the accumulated element information stored in the first storage to an accumulated element information in which a plurality of other elements are accumulated,
> wherein the second storage maintains the output setting information when the collective update portion collectively updates the accumulated element information.

54. The database system according to claim 3 further comprising a collective update portion configured to collectively update the accumulated element information stored in the first storage to an accumulated element information in which a plurality of other elements are accumulated,
> wherein the second storage maintains the output setting information when the collective update portion collectively updates the accumulated element information.

55. A non-transitory computer recording medium storing a computer-readable program, the program controlling an information processing system to operate as a database system, and the database system comprising:
> a first storage for storing accumulated element information in which a plurality of elements are accumulated;
> an additional writing portion configured to write additional information to the accumulated element information, in response to input by a first user and/or client of information relating to at least one or more of the accumulated elements;
> a second storage for storing output setting information in which, in response to the writing of the additional information by the additional writing portion, a second user and/or client, that is different from the first user and/or client, is associated with a display setting of the additional information, and information of the display setting of the additional information is associated with each user and/or client so that in the output setting information each element and/or combination of elements of the plurality of elements is set to visible or to invisible on a user and/or client basis;

a changing portion configured to change the display setting associated with the second user and/or client in the output setting information, in response to a customization operation performed by the second user and/or client to customize the display setting by referencing the additional information input by the first user and/or client and setting to visible or to invisible at least one element and/or combination of elements of the plurality of elements in the additional information input by the first user and/or client;

an extracting portion configured to extract, from the accumulated element information, at least a portion of the accumulated element information in accordance with an input of an extraction condition by the second user and/or client; and a display control unit configured to cause a display to display, when the second user and/or client is input after the customization operation is performed, the portion of information extracted from the accumulated element information by the extracting portion, in accordance with the display setting changed by the changing portion in response to the customization operation, so that the display control unit controls display or non-display of each element and/or combination of elements of the portion of the accumulated element information extracted from the accumulated element information on a user and/or client basis in accordance with the customization operation of the second user and/or client, wherein the accumulated element information accumulates elements into a plurality of groups of related elements, and each group is structured so that the related elements therein respectively belong to one classification of a plurality of classifications; and the display includes a graphical user interface which displays on a screen at least a part of the accumulated element information so that the related elements in each group displayed are displayed according to a respective classification and are selectable by a user, and the graphical user interface including a portion on the screen for receiving a selected element from each of the displayed groups in sequence so that the sequentially selected elements form a readable text model in which each selected element forms part of a legible sentence of words.

56. A non-transitory computer readable recording medium storing a computer-readable program, the program controlling an information processing system to operate as a database system, and the database system comprising a server, a first terminal, and a second terminal, wherein the server includes:
a first storage for storing accumulated element information in which a plurality of elements are accumulated;
an additional writing portion configured to write additional information to the accumulated element information, in response to input by a first terminal of information relating to at least one or more of the accumulated elements by the first terminal;
a second storage for storing output setting information in which, in response to the writing of the additional information by the additional writing portion, an identification information specifying a second terminal is associated with a display setting of the additional information, and information of the display setting of the additional information is associated with each terminal so that in the output setting information each element and/or combination of elements of the plurality of elements is set to visible or to invisible on a terminal by terminal basis;

a changing portion configured to change the display setting associated with identification information specifying the second terminal in the output setting information, in response to a customization request from the second terminal to customize the display setting by referencing the additional information input by the first terminal and setting to visible or to invisible at least one element and/or combination of elements of the plurality of elements in the additional information input by the first terminal; and an extracting portion configured to extract, from the accumulated element information, at least a portion of the accumulated element information in accordance with an input of an extraction condition by the second terminal, wherein the second terminal includes:
a display control unit configured to cause a display to display the portion of information extracted from the accumulated element information by the extracting portion in accordance with the display setting changed by the changing portion so that the display control unit controls display or non-display of each element and/or combination of elements of the portion of the accumulated element information extracted from the accumulated element information on a terminal by terminal basis in accordance with the customization operation of the second terminal, wherein the display is a screen showing the portion of information according to the display setting associated with the identification information specifying the second terminal in the output setting information, and wherein the accumulated element information accumulates elements into a plurality of groups of related elements, and each group is structured so that the related elements therein respectively belong to one classification of a plurality of classifications; and the display includes a graphical user interface which displays on a screen at least a part of the accumulated element information so that the related elements in each group displayed are displayed according to a respective classification and are selectable by a user, and the graphical user interface including a portion on the screen for receiving a selected element from each of the displayed groups in sequence so that the sequentially selected elements form a readable text model in which each selected element forms part of a legible sentence of words.

57. A non-transitory computer readable recording medium storing a computer-readable program, the program controlling an information processing system to operate as a database system, and the database system comprising a server, a first terminal, and a second terminal, wherein the server includes:
a first storage for storing accumulated element information in which a plurality of elements are accumulated;
an additional writing portion configured to write additional information to the accumulated element information, in response to input by a first terminal of information relating to at least one or more of the accumulated elements by the first terminal; and
an extracting portion configured to extract, from the accumulated element information, at least a portion of the accumulated element information in accordance with an input of an extraction condition by a second terminal, and to customize the extracted information according to a customization operation performed by the second terminal, wherein the second terminal includes:

a second storage for storing output setting information in which a user and/or client identification information is associated with a display setting of the additional information, in response to the writing of the additional information by the additional writing portion, and information of the display setting of the additional information is associated with each terminal so that in the output setting information each element and/or combination of elements of the plurality of elements is set to visible or to invisible on a terminal by terminal basis;

a changing portion configured to change the display setting included in the output setting information, in response to a customization operation by the second terminal to customize the display setting by referencing the additional information input by the first terminal and setting to visible or to invisible at least one element and/or combination of elements of the plurality of elements in the additional information input by the first terminal; and a display control unit configured to cause a display to display the portion of information extracted from the accumulated element information by the extracting portion in accordance with the display setting changed by the changing portion so that the display control unit controls display or non-display of each element and/or combination of elements of the portion of the accumulated element information extracted from the accumulated element information on a terminal by terminal basis in accordance with the customization operation of the second terminal, wherein the display is a screen showing the portion of information according to the display setting included in the output setting information, and wherein the accumulated element information accumulates elements into a plurality of groups of related elements, and each group is structured so that the related elements therein respectively belong to one classification of a plurality of classifications; and the display includes a graphical user interface which displays on a screen at least a part of the accumulated element information so that the related elements in each group displayed are displayed according to a respective classification and are selectable by a user, and the graphical user interface including a portion on the screen for receiving a selected element from each of the displayed groups in sequence so that the sequentially selected elements form a readable text model in which each selected element forms part of a legible sentence of words.

* * * * *